United States Patent
Jia et al.

(10) Patent No.: US 11,258,533 B2
(45) Date of Patent: Feb. 22, 2022

(54) JOINT TRANSMISSION METHOD AND APPARATUS

(71) Applicant: HUAWEI TECHNOLOGIES CO., LTD., Guangdong (CN)

(72) Inventors: Jia Jia, Shenzhen (CN); Guogang Huang, Shenzhen (CN); Jung Hoon Suh, Kanata (CA); Jian Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/130,618

(22) Filed: Dec. 22, 2020

(65) Prior Publication Data

US 2021/0111829 A1  Apr. 15, 2021

Related U.S. Application Data

(63) Continuation of application No. PCT/CN2019/089683, filed on May 31, 2019.

(30) Foreign Application Priority Data

Jun. 27, 2018 (CN) .......................... 201810682338.8

(51) Int. Cl.
*H04L 1/00* (2006.01)
*H04W 76/11* (2018.01)
*H04L 27/00* (2006.01)

(52) U.S. Cl.
CPC ............ *H04L 1/0004* (2013.01); *H04L 1/001* (2013.01); *H04L 27/0008* (2013.01); *H04W 76/11* (2018.02)

(58) Field of Classification Search
None
See application file for complete search history.

(56) References Cited

U.S. PATENT DOCUMENTS

2016/0065401 A1   3/2016   Jia et al.
2016/0165524 A1   6/2016   Kim et al.
(Continued)

FOREIGN PATENT DOCUMENTS

CN   102843730 A   12/2012
CN   104335516 A    2/2015
(Continued)

OTHER PUBLICATIONS

PCT International Search Report and Written Opinion issued in International Application No. PCT/CN2019/089683 dated Aug. 14, 2019, 15 pages (with English translation).

*Primary Examiner* — Christine T Duong
(74) *Attorney, Agent, or Firm* — Fish & Richardson P.C.

(57) ABSTRACT

Methods, apparatus, and systems for joint transmission are provided. In one aspect, a joint transmission method includes: sending, by a first AP, a first PPDU to a first STA and a second STA, and sending, by a second AP, a second PPDU to the first STA. A sending time of sending the first PPDU is same as a sending time of sending the second PPDU. The first PPDU includes a first preamble field and a first data field, and the second PPDU includes a second preamble field and a second data field. The first preamble field is same as the second preamble field. The first data field carries first data information sent to the first STA and second data information sent to the second STA, and the second data field carries the first data information.

20 Claims, 26 Drawing Sheets

(56) References Cited

U.S. PATENT DOCUMENTS

2016/0204969 A1 7/2016 Zhu et al.
2019/0182095 A1* 6/2019 Suh ..................... H04L 1/0004

FOREIGN PATENT DOCUMENTS

CN 106788622 A 5/2017
CN 108141889 A 6/2018

* cited by examiner

JOINT TRANSMISSION METHOD AND APPARATUS

CROSS-REFERENCE TO RELATED APPLICATIONS

This application is a continuation of International Application No. PCT/CN2019/089683, filed on May 31, 2019, which claims priority to Chinese Patent Application No. 201810682338.8, filed on Jun. 27, 2018. The disclosures of the aforementioned applications are hereby incorporated by reference in their entireties.

TECHNICAL FIELD

This application relates to the field of wireless communications technologies, and in particular, to a joint transmission method and an apparatus.

BACKGROUND

In the existing semi-orthogonal multiple access (SOMA) technology, when an access point (AP) sends data to a plurality of stations (STAs), bit data of different STAs is allocated to bit positions with different reliability for orderly and reversible fusion, and then constellation point mapping is performed to modulate the data into higher-order symbols for a subsequent sending process. At a receiving end, the STAs receive the same modulation symbol at the same time and frequency spectrum and extract the bit data sent to themselves based on their own demodulation signaling. From the perspective of power domain, the SOMA technology can be regarded as a combination of two sets of higher-order modulation at a specific power ratio. When the AP allocates a most reliable bit to a specific STA, it is equivalent to using a larger proportion of the transmit power to send data to the STA. When the AP allocates a least reliable bit to a specific STA, it is equivalent to using a smaller proportion of the transmit power to send data to the STA.

Considering that STAs with a high signal-to-noise ratio can still ensure better reception quality when receiving low-power transmitted signals, the AP can usually allocate higher transmit power to STAs with a low signal-to-noise ratio, and allocate lower transmit power to STAs with a high signal-to-noise ratio, so as to improve the received signal quality of the STAs with a low signal-to-noise ratio. However, due to a distance or a low signal-to-noise ratio, even if a larger proportion of the transmit power is allocated to a STA with a low signal-to-noise ratio for data transmission, it is still possible that the received signal quality of the STA is poor.

SUMMARY

This application provides a joint transmission method and apparatus, so as to improve a received signal quality of a station when an access point transmits data to the station.

According to a first aspect, an embodiment of this application provides a joint transmission method, where the method includes:

a first access point (AP) sends a first physical layer protocol data unit (PPDU) to a first station (STA) and a second STA, where a sending time of the first PPDU is the same as a sending time of sending a second PPDU by the second AP; the first PPDU includes a first preamble field and a first data field; and the second PPDU includes a second preamble field and a second data field;

the first preamble field includes semi-orthogonal multiple access (SOMA) signaling information required by the first STA to parse the first data field and the second data field, and SOMA signaling information required by the second STA to parse the first data field, and the first preamble field is the same as the second preamble field; and the first data field carries first data information sent to the first STA and second data information sent to the second STA, the first data field is obtained by the first AP by performing SOMA modulation on the first data information and the second data information, and a bit carrying the first data information and a bit carrying the second data information in the first data field have different reliability; the second data field carries the first data information; and both the first STA and the second STA are STAs associated with the first AP.

In the embodiment of this application, because both the first PPDU and the second PPDU carry the first data information sent to the first STA, and the first PPDU and the second PPDU have the same preamble field and sending time, the first AP and the second AP can use the same preamble field to send the first data information to the first STA at the same sending time, thereby increasing signal transmit power of the first data information, avoiding possible interference during joint data transmission by a plurality of APs, and improving signal reception quality of the first STA.

In addition, in the embodiments of this application, the first AP can use SOMA modulation to send data to the first STA and the second STA in parallel, and the bit carrying the first data information and the bit carrying the second data information in the first data field have different reliability. Correspondingly, the first preamble field includes the SOMA signaling information required by the first STA and the second STA to parse the first data field, so that both the first STA and the second STA can obtain, through correct parsing, the data information sent to themselves, thereby improving utilization efficiency of spectrum resources and increasing overall network throughput.

In a possible design, the first preamble field and the second preamble field include SOMA signaling, and the SOMA signaling is used to carry the SOMA signaling information required by the first STA to parse the first data field and the second data field, and the SOMA signaling information required by the second STA to parse the first data field; and the SOMA signaling includes a common information field and a user-specific field; the user-specific field includes a user-specific subfield corresponding to the first STA and a user-specific subfield corresponding to the second STA; any user-specific subfield includes a station identifier subfield, a bit modulation and coding scheme (MCS) subfield, and a bit assignment subfield.

In the embodiments of this application, in the user specific subfield corresponding to the first STA, the station identifier subfield is used to indicate an identifier of the first STA, the bit MCS is used to indicate a bit MCS of the bit carrying the first data information, and the bit assignment subfield is used to indicate reliability of the bit carrying the first data information;

in the user specific subfield corresponding to the second STA, the station identifier subfield is used to indicate an identifier of the second STA, the bit MCS is used to indicate a bit MCS of the bit carrying the second data information, and the bit assignment subfield is used to indicate reliability of the bit carrying the second data information. In a possible design, the common information field includes: a symbol MCS subfield and an SOMA indication subfield; the symbol MCS subfield is used to indicate a symbol MCS used by the first data field and/or the second data field; the SOMA indication subfield is used to indicate whether the first data field and the second data field use SOMA modulation.

In a possible design, the bit carrying the first data information in the first data field has the same reliability as the bit carrying the first data information in the second data field;

a bit modulation and coding scheme MCS of the bit carrying the first data information in the first data field is the same as a bit MCS of the bit carrying the first data information in the second data field.

In the embodiment of this application, the bits carrying the first data information in the first data field and the second data field may have the same reliability and bit MCS. For example, if a signal-to-noise ratio of the first STA is poor, the bits carrying the first data information in both the first data field and the second data field may be bit positions with high reliability, so that signal transmit power of the first data information can be effectively increased. In addition, because the bits carrying the first data information use the same bit MCS for symbol modulation, the first STA can receive two copies of the same symbol data, thereby avoiding extra interference caused by inconsistent sent content when the first AP and the second AP jointly send data, and further improving the signal reception quality of the first STA.

In a possible design, before the first AP sends the first PPDU to the first STA and the second STA, the method further includes:

the first AP sends first indication information to the second AP, where the first indication information includes SOMA signaling information required by the first STA and the second STA to parse the first data field;

the first AP receives second indication information sent by the second AP, where the second indication information includes SOMA signaling information required by the third STA to parse the second data field, the second data field carries third data information sent to the third STA, and the third STA is a STA associated with the second AP; and the first AP generates the first PPDU based on the first indication information and the second indication information, where the first preamble field further includes SOMA signaling information required by the third STA to parse the second data field.

In the embodiment of this application, on the basis that the first AP can use SOMA modulation to send data to the first STA and the second STA in parallel, the second AP can also use SOMA modulation to send data to the first STA and the third STA in parallel, thereby further improving the utilization efficiency of spectrum resources and increasing the overall network throughput. Therefore, to ensure that any STA receiving a first data packet and/or a second data packet can obtain, through correct parsing, the data information sent to the STA, in the embodiment of this application, the first preamble field and the second preamble field each may include: the SOMA signaling information required by the first STA and the second STA to parse the first data field, and the SOMA signaling information required by the third STA to parse the second data field.

In this way, by sending the first indication information and receiving the second indication information sent by the second AP, the first AP can exchange with the second AP about the SOMA signaling required by the receiving STAs of both parties to parse corresponding data fields, so that the first AP can generate the same preamble field as the second AP.

In a possible design, the SOMA signaling is further used to carry SOMA signaling information required by the third STA to parse the second data field; the user specific field further includes the user specific subfield corresponding to the third STA;

in the user specific subfield corresponding to the third STA, the station identifier subfield is used to indicate an identifier of the third STA, the bit MCS is used to indicate a bit MCS of the bit carrying the third data information, and the bit assignment subfield is used to indicate reliability of the bit carrying the third data information.

In a possible design, the symbol MCS of the first data field is the same as the symbol MCS of the second data field.

In a possible design, before the first AP sends the first PPDU to the first STA and the second STA, the method includes:

the first AP sends first indication information to the second AP, where the first indication information includes SOMA signaling information required by the first STA and the second STA to parse the first data field; and the first AP generates the first PPDU based on the first indication information.

The embodiment of this application may also be that the first AP uses SOMA modulation to send data to the first STA and the second STA in parallel, whereas the second AP sends data to the first STA only without performing parallel transmission, for example, in scenarios in which the second AP causes interference to the second STA or the second AP does not have an associated station available for parallel transmission. In this case, the first AP may send the first indication information to the second AP, so that the second AP can also generate a corresponding PPDU based on the first indication information, and the first PPDU and the second PPDU have the same preamble field.

In a possible design, the first data field further includes at least one data segment, and the first preamble field further includes length information of the at least one data segment and a symbol MCS of the at least one data segment.

In the embodiment of this application, when generating the first PPDU, the first AP can further perform segmentation processing on the first data field, so that the first data field of the first PPDU generated by the first AP may include at least one data segment. Correspondingly, the first preamble field includes the length information of the at least one data segment and the symbol MCS of the at least one data segment, so that the first STA and the second STA can obtain, through correct parsing after receiving the first PPDU, data information that is carried in each data segment and that is sent to the first STA and the second STA.

Because the first AP can use SOMA modulation to send data to the first STA and the second STA in parallel, the first data field carries both the first data information and the second data information. Therefore, in the embodiment of this application, the first AP performs segmentation processing on the first data field when generating the PPDU. This can effectively reduce padding redundancy caused by inconsistent lengths of the first data information and the second data information and avoid resource overheads caused by excessive padding.

In a possible design, the first indication information may further include length information of at least one data segment in the first data field, and a symbol MCS of the at least one data segment.

Because the first AP sends the first indication information to the second AP, in the embodiment of this application, after receiving the first indication information, the second AP can perform segmentation on the second data field based on the length information of the at least one data field indicated in the first indication information, and the symbol MCS of the at least one data segment. In this way, the first AP and the second AP use the same segmentation method when generating PPDUs. The first STA can receive the same data segment from the first AP and the second AP, and modulation symbols in the corresponding data segments are also the same. This avoids extra interference caused by inconsistent sent content.

In a possible design, before the first AP generates the first PPDU, the method further includes:

the first AP sends a transmission assistance request, where the transmission assistance request includes the identifier of the first STA, the identifier of the second STA, and third indication information; the third indication information is used to indicate that the first STA needs to be assisted; and the first AP receives the transmission assistance response sent by the second AP, and sends the first data information to the second AP.

It can be learned that, in the embodiment of this application, the first AP can send a transmission assistance request, and the transmission assistance request indicates identifiers of STAs for which the first AP performs parallel transmission, and information about a STA that needs assistance. In other words, the transmission assistance request includes the identifier of the first STA, the identifier of the second AP, and the third indication information used to indicate that the first STA needs assistance. In this way, after receiving the transmission assistance request, the second AP can determine, based on the transmission assistance request, whether it can provide transmission assistance, and can reply with a transmission assistance response to participate in joint transmission.

In a possible design, the transmission assistance request further includes fourth indication information, where the fourth indication information is used to indicate an air interface transmission coverage area of the first AP.

In the embodiment of this application, the transmission assistance request may further include the fourth indication information for indicating the air interface transmission coverage area of the first AP, so that the second AP can determine a third STA for the parallel transmission based on the air interface transmission coverage area of the first AP, thereby improving the utilization efficiency of spectrum resources and increasing the overall network throughput.

According to a second aspect, an embodiment of this application provides another joint transmission method, where the method includes:

a second access point AP sends a second physical layer protocol data unit PPDU to a first station STA; a sending time of the second PPDU is the same as a sending time of sending a first PPDU by the first AP; the second PPDU includes a second preamble field and a second data field; the first PPDU includes a first preamble field and a first data field;

the second preamble field includes semi-orthogonal multiple access SOMA signaling information required by the first STA to parse the first data field and the second data field, and the SOMA signaling information required by the second STA to parse the first data field, where the first preamble field is the same as the second preamble field; and the second data field carries first data information sent to the first STA; the first data field carries the first data information, and second data information sent to the second STA, the first data field is obtained by the first AP by performing SOMA modulation on the first data information and the second data information, and a bit carrying the first data information and a bit carrying the second data information in the first data field have different reliability; and both the first STA and the second STA are STAs associated with the first AP.

In the embodiment of this application, because both the first PPDU and the second PPDU carry the first data information sent to the first STA, and the first PPDU and the second PPDU have the same preamble field and sending time, the first AP and the second AP can use the same preamble field to send the first data information to the first STA at the same sending time, thereby increasing signal transmit power of the first data information, avoiding possible interference during joint data transmission by a plurality of APs, and improving signal reception quality of the first STA.

In addition, in the embodiments of this application, the first AP can use SOMA modulation to send data to the first STA and the second STA in parallel, and the bit carrying the first data information and the bit carrying the second data information in the first data field have different reliability. Correspondingly, the first preamble field includes the SOMA signaling information required by the first STA and the second STA to parse the first data field, so that both the first STA and the second STA can obtain, through correct parsing, the data information sent to themselves, thereby improving utilization efficiency of spectrum resources and increasing overall network throughput.

In a possible design, the first preamble field and the second preamble field include SOMA signaling, and the SOMA signaling is used to carry the SOMA signaling information required by the first STA to parse the first data field and the second data field, and the SOMA signaling information required by the second STA to parse the first data field; and the SOMA signaling includes a common information field and a user specific field; the user specific field includes a user specific subfield corresponding to the first STA and a user specific subfield corresponding to the second STA; any user specific subfield includes a station identifier subfield, a bit MCS subfield, and a bit assignment subfield.

In the embodiments of this application, in the user specific subfield corresponding to the first STA, the station identifier subfield is used to indicate an identifier of the first STA, the bit MCS is used to indicate a bit MCS of the bit carrying the first data information, and the bit assignment subfield is used to indicate reliability of the bit carrying the first data information;

in the user specific subfield corresponding to the second STA, the station identifier subfield is used to indicate an identifier of the second STA, the bit MCS is used to indicate a bit MCS of the bit carrying the second data information, and the bit assignment subfield is used to indicate reliability of the bit carrying the second data information. In a possible design, the common information field includes: a symbol MCS subfield and an SOMA indication subfield; the symbol MCS subfield is used to indicate a symbol MCS used by the first data field and/or the second data field; the SOMA indication subfield is used to indicate whether the first data field and the second data field use SOMA modulation.

In a possible design, the bit carrying the first data information in the first data field has the same reliability as the bit carrying the first data information in the second data field;

a bit modulation and coding scheme MCS of the bit carrying the first data information in the first data field is the same as a bit MCS of the bit carrying the first data information in the second data field.

In the embodiment of this application, the bits carrying the first data information in the first data field and the second data field may have the same reliability and bit MCS. For example, if a signal-to-noise ratio of the first STA is poor, the bits carrying the first data information in both the first data field and the second data field may be bit positions with high reliability, so that signal transmit power of the first data information can be effectively increased. In addition, because the bits carrying the first data information use the same bit MCS for symbol modulation, the first STA can receive two copies of the same symbol data, thereby avoiding extra interference caused by inconsistent sent content when the first AP and the second AP jointly send data, and further improving the signal reception quality of the first STA.

In a possible design, before the second AP sends the second PPDU to the first STA, the method includes:

the second AP receives first indication information sent by the first AP, where the first indication information includes SOMA signaling information required by the first STA and the second STA to parse the first data field; and the second AP sends second indication information to the first AP, where the second indication information includes SOMA signaling information required by the third STA to parse the second data field, the second data field further includes third data information sent to the third STA, and the third STA is a STA associated with the second AP; and the second AP generates the second PPDU based on the first indication information and the second indication information, where the second preamble field includes the SOMA signaling information required by the third STA to parse the second data field; the second data field is obtained by the second AP by performing SOMA modulation on the first data information and the third data information, and a bit carrying the first data information and a bit carrying the third data information in the second data field have different reliability.

That the second AP sends a second PPDU to the first STA includes:

the second AP sends the second PPDU to the first STA and the third STA.

In the embodiment of this application, on the basis that the first AP can use SOMA modulation to send data to the first STA and the second STA in parallel the second AP can also use SOMA modulation to send data to the first STA and the third STA in parallel, thereby further improving the utilization efficiency of spectrum resources and increasing the overall network throughput. Therefore, to ensure that any STA receiving a first data packet and/or a second data packet can obtain, through correct parsing, the data information sent to the STA, in the embodiment of this application, the first preamble field and the second preamble field each may include: the SOMA signaling information required by the first AP and the second AP to parse the first data field, and the SOMA signaling information required by the third STA to parse the second data field.

In this way, by receiving the first indication information sent by the first AP and sending the second indication information to the first AP, the second AP can exchange with the first AP about the SOMA signaling required by the receiving STAB of both parties to parse corresponding data fields, so that the first AP can generate the same preamble field as the second AP.

In a possible design, the SOMA signaling is further used to carry SOMA signaling information required by the third STA to parse the second data field; the user specific field further includes the user specific subfield corresponding to the third STA;

in the user specific subfield corresponding to the third STA, the station identifier subfield is used to indicate an identifier of the third STA, the bit MCS is used to indicate a bit MCS of the bit carrying the third data information, and the bit assignment subfield is used to indicate reliability of the bit carrying the third data information.

In a possible design, the symbol MCS of the second data field is the same as the symbol MCS of the first data field.

In a possible design, before the second AP sends the second PPDU to the first STA, the method further includes:

the second AP receives first indication information sent by the first AP where the first indication information includes SOMA signaling information required by the first STA and the second STA to parse the first data field; and the second AP generates the second PPDU based on the first indication information.

The embodiment of this application may also be that the first AP uses SOMA modulation to send data to the first STA and the second STA in parallel, whereas the second AP sends data to the first STA only without performing parallel transmission, for example, in scenarios in which the second AP causes interference to the second STA or the second AP does not have an associated station available for parallel transmission. In this way, the second AP can generate the second PPDU based on the first indication information, and because the second AP does not send data to another STA in parallel, the preamble field of the first PPDU is the same as the preamble field of the second PPDU.

In a possible design, the second data field further includes at least one data segment, and the second preamble field further includes length information of the at least one data segment and a symbol MCS of the at least one data segment.

In the embodiment of this application, when generating the second PPDU, the second AP can further perform segmentation processing on the second data field, so that the second data field of the second PPDU generated by the second AP may include at least one data segment. Correspondingly, the second preamble field includes the length information of the at least one data segment and the symbol MCS of the at least one data segment, so that the first STA can obtain, through correct parsing after receiving the second PPDU, data information that is carried in each data segment and that is sent to the first STA.

Therefore, if the second AP uses SOMA modulation to send data to the first STA and the third STA in parallel, that is, the second data field carries both the first data information and the third data information, in the embodiment of this application, the second AP performs segmentation processing on the second data field when generating the PPDU. This can effectively reduce padding redundancy caused by inconsistent lengths of the first data information and the third data information, and avoid resource overheads caused by excessive padding.

In a possible design, the first indication information may further include length information of at least one data segment in the first data field, and a symbol MCS of the at least one data segment; and that the second AP generates the second PPDU based on the first indication information further includes:

the second AP performs segmentation on the second data field based on the length information of the at least one data segment and the symbol MCS of the at least one data segment.

In the embodiment of this application, if the first AP performs segmentation processing on the first data field, the first AP notifies, through the first indication information, the second AP of the length information of at least one data segment in the first data field, and the symbol MCS of the at least one data segment. In this case, after receiving the first indication information, the second AP can perform segmentation on the second data field based on the length information of the at least one data field indicated in the first indication information, and the symbol MCS of the at least one data segment. In this way, the first AP and the second AP use the same segmentation method when generating PPDUs. The first STA can receive the same data segment from the first AP and the second AP, and modulation symbols in the corresponding data segments are also the same. This avoids extra interference caused by inconsistent sent content.

In a possible design, before the second AP generates the second PPDU, the method further includes:

the second AP receives a transmission assistance request sent by the first AP where the transmission assistance request includes the identifier of the first STA, the identifier of the second STA, and third indication information; the third indication information is used to indicate that the first STA needs to be assisted; and the second AP sends a transmission assistance response to the first AP based on the identifier of the first STA and the identifier of the second STA and receives the first data information sent by the first AP.

It can be learned that, in the embodiment of this application, the first AP can send a transmission assistance request, and the transmission assistance request indicates identifiers of STAs for which the first AP performs parallel transmission, and information about a STA that needs assistance. In other words, the transmission assistance request includes the identifier of the first STA, the identifier of the second AP, and the third indication information used to indicate that the first STA needs assistance. In this way, after receiving the transmission assistance request, the second AP can determine, based on the transmission assistance request, whether it can provide transmission assistance, and can reply with a transmission assistance response to participate in joint transmission.

In a possible design, the transmission assistance request further includes fourth indication information, where the fourth indication information is used to indicate an air interface transmission coverage area of the first AP.

Optionally, the method further includes:

the second AP determines the third STA based on the air interface transmission coverage area of the first AP.

In the embodiment of this application, the transmission assistance request may further include the fourth indication information for indicating the air interface transmission coverage area of the first AP. Therefore, if the second AP determines to send data to the first STA and another STA associated with the second AP in parallel, the second AP can determine a third STA for the parallel transmission based on the air interface transmission coverage area of the first AP, thereby improving the utilization efficiency of spectrum resources and increasing the overall network throughput.

According to a third aspect, an embodiment of this application further provides a joint transmission method, where the method includes:

a first access point AP sends a first physical layer protocol data unit PPDU to a first station STA and a second STA, where a sending time of the first PPDU is the same as a sending time of sending a second PPDU by the second AP; the first PPDU includes a first preamble field and a first data field, and the first data field includes N data segments; and the second PPDU includes a second preamble field and a second data field, the second data field includes N data segments, and N is greater than or equal to 1;

the first preamble field includes semi-orthogonal multiple access SOMA signaling information required by the first STA to parse the N data segments of the first data field and the N data segments of the second data field, and the SOMA signaling information required by the second STA to parse the N data segments of the first data field, where the first preamble field is the same as the second preamble field; and the N data segments of the first data field carry first data information sent to the first STA and second data information sent to the second STA; the first data field is obtained by the first AP by performing SOMA modulation on the first data information and the second data information, and a bit carrying the first data information and a bit carrying the second data information in the $i^{th}$ data segment of the first data field have different reliability; the N data segments of the second data field carry the first data information; both the first STA and the second STA are STAs associated with the first AP; i is greater than or equal to 1 and less than or equal to N.

In a possible design, the bit carrying the first data information in the $i^{th}$ data segment of the first data field has the same reliability as the bit carrying the first data information in the $i^{th}$ data segment of the second data field;

a bit modulation and coding scheme MCS of the bit carrying the first data information in the $i^{th}$ data segment of the first data field is the same as a bit MCS of the bit carrying the first data information in the $i^{th}$ data segment of the second data field.

In a possible design, the first preamble field and the second preamble field include N pieces of SOMA signaling, and the $i^{th}$ SOMA signaling is used to carry the SOMA signaling information required by the first STA to parse the $i^{th}$ data segment of the first data field and the $i^{th}$ data segment of the second data field, and the SOMA signaling information required by the second STA to parse the $i^{th}$ data segment of the first data field;

the $i^{th}$ SOMA signaling includes a common information field and a user specific field; the user specific field includes a user specific subfield corresponding to the first STA and a user specific subfield corresponding to the second STA;

the user specific subfield corresponding to the first STA includes: an identifier of the first STA, a bit MCS of the bit carrying the first data information in the $i^{th}$ data segment of the first data field, and reliability of the bit carrying the first data information in the $i^{th}$ data segment of the first data field;

the user specific subfield corresponding to the second STA includes: an identifier of the second STA, a bit MCS of the bit carrying the second data information in the $i^{th}$ data segment of the first data field, and reliability of the bit carrying the second data information in the $i^{th}$ data segment of the first data field.

In a possible design, the common information field includes: a symbol MCS field and a SOMA indication field; the symbol MCS field is used to indicate a symbol MCS used by the $i^{th}$ data segment of the first data field and/or the $i^{th}$ data segment of the second data field; the SOMA indication field is used to indicate whether the $i^{th}$ data segment of the first data field and the $i^{th}$ data segment of the second data field use SOMA modulation.

In a possible design, before the first AP sends the first PPDU to the first STA and the second STA, the method further includes:

the first AP sends first indication information to the second AP, where the first indication information includes SOMA signaling information required by the first STA and the second STA to parse the N data segments of the first data field, and length information and a symbol MCS of each of the N data segments of the first data field;

the first AP receives second indication information sent by the second AP, where the second indication information includes SOMA signaling information required by the third STA to parse the N data segments of the second data field, the second data field carries third data information sent to the third STA, and the third STA is a STA associated with the second AP; and the first AP generates the first PPDU based on the first indication information and the second indication information, where the first preamble field further includes SOMA signaling information required by the third STA to parse the N data segments of the second data field.

In a possible design, the symbol modulation and coding scheme MCS of the $i^{th}$ data segment of the first data field is the same as the symbol MCS of the $i^{th}$ data segment of the second data field.

In a possible design, the user specific field further includes the user specific subfield corresponding to the third STA;

the user specific subfield corresponding to the third STA includes: an identifier of the third STA, a bit MCS of the bit carrying the third data information in the $i^{th}$ data segment of the second data field, and reliability of the bit carrying the third data information in the $i^{th}$ data segment of the second data field.

In a possible design, before the first AP sends the first PPDU to the first STA and the second STA, the method includes:

the first AP sends first indication information to the second AP, where the first indication information includes SOMA signaling information required by the first STA and the second STA to parse the N data segments of the first data field, and length information and a symbol MCS of each of the N data segments of the first data field;

the first AP generates the first PPDU based on the first indication information.

In a possible design, before the first AP generates the first PPDU, the method further includes:

the first AP sends a transmission assistance request, where the transmission assistance request includes the identifier of the first STA, the identifier of the second STA, and third indication information; the third indication information is used to indicate that the first STA needs to be assisted; and the first AP receives the transmission assistance response sent by the second AP, and sends the first data information to the second AP.

In a possible design, the transmission assistance request further includes fourth indication information, where the fourth indication information is used to indicate an air interface transmission coverage area of the first AP.

According to a fourth aspect, an embodiment of this application further provides another joint transmission method, where the method includes:

a second access point AP sends a second physical layer protocol data unit PPDU to a first station STA, where a sending time of the second PPDU is the same as a sending time of sending a first PPDU by the first AP; the second PPDU includes a second preamble field and a second data field, and the second data field includes N data segments; and the first PPDU includes a first preamble field and a first data field, the first data field includes N data segments, and N is greater than or equal to 1;

the second preamble field includes semi-orthogonal multiple access SOMA signaling information required by the first STA to parse the N data segments of the first data field and the N data segments of the second data field, and the SOMA signaling information required by the second STA to parse the N data segments of the first data field, where the first preamble field is the same as the second preamble field; and the N data segments of the second data field carry first data information sent to the first STA; the N data segments of the first data field carry the first data information, and second data information sent to the second STA; the first data field is obtained by the first AP by performing SOMA modulation on the first data information and the second data information, and a bit carrying the first data information and a bit carrying the second data information in the $i^{th}$ data segment of the first data field have different reliability; both the first STA and the second STA are STAs associated with the first AP; i is greater than or equal to 1 and less than or equal to N.

In a possible design, the bit carrying the first data information in the $i^{th}$ data segment of the first data field has the same reliability as the bit carrying the first data information in the $i^{th}$ data segment of the second data field;

a bit modulation and coding scheme MCS of the bit carrying the first data information in the $i^{th}$ data segment of the first data field is the same as a bit MCS of the bit carrying the first data information in the $i^{th}$ data segment of the second data field.

In a possible design, the first preamble field and the second preamble field include N pieces of SOMA signaling, and the $i^{th}$ SOMA signaling is used to carry the SOMA signaling information required by the first STA to parse the $i^{th}$ data segment of the first data field and the $i^{th}$ data segment of the second data field, and the SOMA signaling information required by the second STA to parse the $i^{th}$ data segment of the first data field;

the $i^{th}$ SOMA signaling includes a common information field and a user specific field; the user specific field includes a user specific subfield corresponding to the first STA and a user specific subfield corresponding to the second STA;

the user specific subfield corresponding to the first STA includes: an identifier of the first STA, a bit MCS of the bit carrying the first data information in the $i^{th}$ data segment of the first data field, and reliability of the bit carrying the first data information in the $i^{th}$ data segment of the first data field;

the user specific subfield corresponding to the second STA includes: an identifier of the second STA, a bit MCS of the bit caring the second data information in the $i^{th}$ data segment of the first data field, and reliability of the bit carrying the second data information in the $i^{th}$ data segment of the first data field.

In a possible design, the common information field includes: a symbol MCS field and a SOMA indication field; the symbol MCS field is used to indicate a symbol MCS used by the $i^{th}$ data segment of the first data field and/or the $i^{th}$ data segment of the second data field; the SOMA indication field is used to indicate whether the $i^{th}$ data segment of the first data field and the $i^{th}$ data segment of the second data field use SOMA modulation.

In a possible design, before the second AP sends the second PPDU to the first STA, the method includes:

the second AP receives first indication information sent by the first AP, where the first indication information includes SOMA signaling information required by the first STA and the second STA to parse the N data segments of the first data field, and length information and a symbol MCS of each of the N data segments of the first data field;

the second AP sends second indication information to the first AP, where the second indication information includes SOMA signaling information required by the N data segments of the third STA to parse the second data field, the second data field further includes third data information sent to the third STA, and the third STA is a STA associated with the second AP; and the second AP generates the second PPDU based on the first indication information and the second indication information, where the second preamble field includes the SOMA signaling information required by the third STA to parse the N data segments of the second data field; the second data field is obtained by the second AP by performing SOMA modulation on the first data information and the third data information, and a bit carrying the first data information and a bit carrying the third data information in the $i^{th}$ data segment of the second data field have different reliability.

That the second AP sends a second PPDU to the first STA includes:

the second AP sends the second PPDU to the first STA and the third STA.

In a possible design, the user specific field further includes the user specific subfield corresponding to the third STA;

the user specific subfield corresponding to the third STA includes: an identifier of the third STA, a bit MCS of the bit carrying the third data information in the $i^{th}$ data segment of the second data field, and reliability of the bit carrying the third data information in the $i^{th}$ data segment of the second data field.

In a possible design, the symbol MCS of the $i^{th}$ data segment of the second data field is the same as the symbol MCS of the $i^{th}$ data segment of the first data field.

In a possible design, before the second AP sends the second PPDU to the first STA, the method further includes:

the second AP receives first indication information sent by the first AP, where the first indication information includes SOMA signaling information required by the first STA and the second STA to parse the N data segments of the first data field, and length information and a symbol MCS of each of the N data segments of the first data field;

the second AP generates the second PPDU based on the first indication information.

In a possible design, before the second AP generates the second PPDU, the method further includes:

the second AP receives a transmission assistance request sent by the first AP, where the transmission assistance request includes the identifier of the first STA, the identifier of the second STA, and third indication information; the third indication information is used to indicate that the first STA needs to be assisted; and the second AP sends a transmission assistance response to the first AP based on the identifier of the first STA and the identifier of the second STA, and receives the first data information sent by the first AP.

In a possible design, the transmission assistance request further includes fourth indication information, where the fourth indication information is used to indicate an air interface transmission coverage area of the first AP.

Optionally, the method further includes:

the second AP determines the third STA based on the air interface transmission coverage area of the first AP.

According to a fifth aspect, an embodiment of this application provides an apparatus applied to a first access point side. The apparatus may be a first access point device or a chip in the first access point. The apparatus implements a function of the first access point in either of the first aspect and the third aspect. The function may be implemented by hardware or may be implemented by hardware by executing corresponding software. The hardware or the software includes one or more units corresponding to the foregoing function.

In a possible implementation, when the apparatus is a first access point, the first access point includes a processor and a transceiver, and the processor is configured to support the first access point AP in performing a corresponding function in the foregoing method. The transceiver is configured to: support communication between the first access point AP and the second access point AP, and communication between the first access point AP and the station STA; and send information or an instruction used in the foregoing method to a second access point AP or station STA. Optionally, the first access point may further include a memory. The memory is configured to be coupled to the processor, and the memory stores a program instruction and data that are necessary for the first access point.

In a possible implementation, the apparatus includes: a processor, a baseband circuit, a radio frequency circuit, and an antenna. The processor is configured to control functions of various circuit components, and the baseband circuit is configured to generate various types of signaling and messages, for example, generate a first PPDU that includes SOMA signaling. The signaling and messages are processed by the radio frequency circuit, for example, analog conversion, filtering, amplification, and up-conversion, and then are sent by the antenna to the first STA. Optionally, the apparatus may further include a memory. The memory stores a program instruction and data that are necessary for the first access point.

In a possible implementation, when the apparatus is a chip in the first access point, the chip includes a processing module and a transceiver module. For example, the processing module may be a processor, and the processor is configured to generate various types of messages and signaling, and encapsulate the various types of messages according to a protocol and then process the messages, for example, coding, modulation, and amplification. The processor can be further configured to perform demodulation, decoding, and decapsulation to obtain signaling and messages. The transceiver module may be, for example, an input/output interface, a pin, or a circuit on the chip. The processing module can execute a computer executable instruction stored in a storage unit to support the first access point AP in performing a corresponding function in the foregoing method. Optionally, the storage unit may be a storage unit inside the chip, for example, a register or a buffer. The storage unit may be alternatively a storage unit located outside the chip and in the first access point AP, for example, a read-only memory (ROM), or a static storage device of another type that can store static information and an instruction, or a random access memory (RAM).

In a possible implementation, the apparatus may include a processor and a modem, and the processor can be configured to run an instruction or an operating system to control the functions of the first access point. The modem can encapsulate, encode, decode, modulate, demodulate, and equalize data according to a protocol to generate a radio frame, so as to support the first access point AP in performing a corresponding function in either of the first aspect and the third aspect.

In a possible implementation, the apparatus includes a processor, and the processor is configured to be coupled to a memory, read an instruction in the memory, and perform the method in either of the first aspect and the third aspect based on the instruction. The memory may be located inside or outside the processor.

Any one of the foregoing processors may be a general-purpose central processing unit (CPU), a microprocessor, an application-specific integrated circuit (ASIC), or one or more integrated circuits configured to control program execution in the joint transmission method according to the foregoing aspects.

According to a sixth aspect, this application provides an apparatus applied to a second access point side. The apparatus may be a second access point or a chip in the second device. The apparatus implements a function of the second access point in either of the second aspect and the fourth aspect. The function may be implemented by hardware or may be implemented by hardware by executing corresponding software. The hardware or the software includes one or more units corresponding to the foregoing function.

In a possible implementation, when the apparatus is a second access point, the second access point includes a processor and a transceiver, and the processor is configured to support the second access point AP in performing a corresponding function in the foregoing aspects. The transceiver is configured to support communication between the second access point AP and the first access point AP or station, so as to support the second access point in sending information or an instruction used in the foregoing method, for example, a second PPDU that includes SOMA signaling. Optionally, the second access point may further include a memory. The memory is configured to be coupled to the processor, and the memory stores a program instruction and data that are necessary for the second access point.

In a possible implementation, the apparatus includes: a processor, a baseband circuit, a radio frequency circuit, and an antenna. The processor is configured to control functions of various circuit components. The radiofrequency circuit can digitally convert, filter, amplify, and down-convert a physical layer protocol data unit that carries first indication information, where the physical layer protocol data unit is sent by the first access point and received through the antenna. The baseband circuit decodes and decapsulates the physical layer protocol data unit according to a protocol to obtain signaling information. Optionally, the apparatus further includes a memory. The memory stores a program instruction and data that are necessary for the second access point.

In a possible implementation, when the apparatus is a chip in the second access point, the chip includes a processing module and a transceiver module. For example, the processing module may be a processor, and the processor can be configured to perform processing such as filtering, demodulation, power amplification, and decoding on a data packet (for example, a data packet that includes the first indication information) that carries signaling or data information and that is received through the transceiver module. The transceiver module may be, for example, an input/output interface, a pin, or a circuit on the chip. The processing module can execute a computer executable instruction stored in a storage unit to support the second access point AP in performing a corresponding function in the foregoing aspects. Optionally, the storage unit may be a storage unit inside the chip, for example, a register or a buffer. The storage unit may be alternatively a storage unit located outside the chip and in the second access point AP, for example, a read-only memory (ROM), or a static storage device of another type that can store static information and an instruction, or a random access memory (RAM).

In a possible implementation, the apparatus includes a processor and a modem, and the processor can be configured to run an instruction or an operating system to control the functions of the second access point. The modem can encapsulate, encode, decode, modulate, demodulate, and equalize data according to a protocol to generate a downlink frame, so as to support the second access point AP in performing a corresponding function in the second aspect of the fourth aspect.

In a possible implementation, the apparatus includes a processor, and the processor is configured to be coupled to a memory, read an instruction in the memory, and perform the method in either of the second aspect and the fourth aspect based on the instruction. The memory may be located inside or outside the processor.

Any one of the foregoing processors may be a general-purpose central processing unit (CPU), a microprocessor, an application-specific integrated circuit (ASIC), or one or more integrated circuits configured to control program execution in the foregoing aspects.

According to a seventh aspect, this application provides a computer readable storage medium, where the computer readable storage medium stores an instruction, and the instruction can be executed by one or more processors on a processing circuit. When the instruction runs on a computer, the computer is enabled to perform the method in either of the first aspect and the third aspect or any possible implementation thereof.

According to an eighth aspect, this application provides a computer readable storage medium, where the computer readable storage medium stores an instruction, and the instruction can be executed by one or more processors on a processing circuit. When the instruction runs on a computer, the computer is enabled to perform the method in either of the second aspect and the fourth aspect or any possible implementation thereof.

According to a ninth aspect, a computer program product including an instruction is provided, where when the computer program product runs on a computer, the computer is enabled to perform the method in either of the first aspect and the third aspect or any possible implementation thereof.

According to a tenth aspect, a computer program product including an instruction is provided, where when the computer program product runs on a computer, the computer is enabled to perform the method in either of the second aspect and the fourth aspect or any possible implementation thereof.

According to an eleventh aspect, this application provides a chip system. The chip system includes a processor configured to support a first access point AP in implementing the functions in the first aspect and the third aspect, for example, generating or processing data and/or information in the foregoing aspects. In a possible design, the chip system further includes a memory, where the memory is configured to store a program instruction and data that are necessary for a data sending device. The chip system may include a chip, or may include a chip and other discrete components.

According to a twelfth aspect, this application provides a chip system. The chip system includes a processor configured to support a second access point AP in implementing the functions in the second aspect and the fourth aspect, for example, generating or processing data and/or information in the foregoing aspects. In a possible design, the chip system further includes a memory, where the memory is configured to store a program instruction and data that are necessary for a data sending device. The chip system may include a chip, or may include a chip and other discrete components.

According to a thirteenth aspect, an embodiment of this application provides a wireless communications system. The system includes at least one first access point, at least one-second access point, and at least one first STA used in the foregoing aspects.

DESCRIPTION OF EMBODIMENTS

To make the objectives, technical solutions, and advantages of this application clearer, the following further describes the embodiments of this application in detail with reference to the accompanying drawings. It should be noted that terms used in implementations of this application are merely used to explain specific embodiments of this application but are not intended to limit this application.

It should be understood that, in the following descriptions, terms such as "first" and "second" are merely used for a purpose of distinguishing for description, and should not be construed as indicating or implying relative importance, nor as indicating or implying a sequence.

It should be understood that, the technical solutions of the embodiments of this application may be applied to various communications systems, such as: a global system for mobile communication (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), universal mobile telecommunications system (UMTS), a worldwide interoperability for microwave access (WiMAX) communications system, and a future 5G communications system.

The technical solutions in the embodiments of this application may also be applied to a wireless local area network (WLAN) scenario, may be applied to IEEE 802.11 system standards, such as the IEEE 802.11ax standard, or its next or further next-generation standards, and may be applied to wireless local area network systems including but not limited to an Internet of things (IoT) network or a Vehicle to X (V2X) network.

Figure 1:
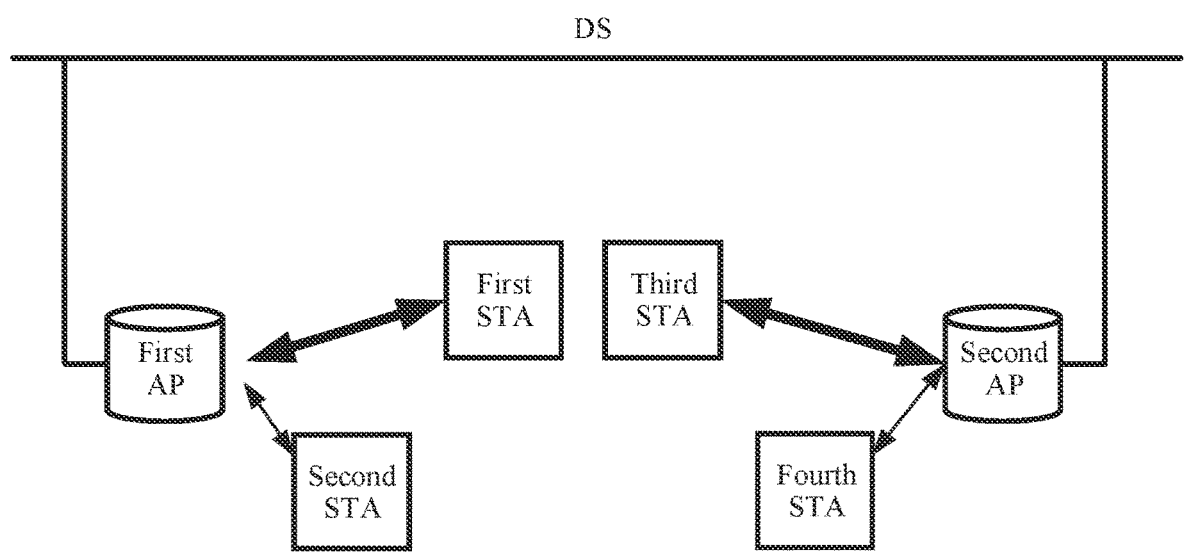
FIG. 1 is a diagram of a network architecture of a wireless local area network to which an embodiment of this application is applicable.

For ease of description, the embodiments of this application use an example application scenario shown in FIG. 1 as an example for description. FIG. 1 is an example of a network architectural diagram of a WLAN to which an embodiment of this application is applicable. The WLAN includes a plurality of APs and STAs associated with the APs. The APs can communicate with each other through a distributed system (DS), and any AP can schedule radio resources for a STA associated with the AP and transmit data for the STA on the scheduled radio resources.

For the sake of simplicity, only the first AP and the second AP, the first and second STAs associated with the first AP, and the third and fourth STAs associated with the second AP are shown in FIG. 1. The first AP is used as an example. The first AP can transmit data for the first STA, including sending downlink data to the first STA and receiving uplink data sent by the first STA. Therefore, in FIG. 1, two-way arrows are used to indicate two-way data transmission between the AP and the associated STA. Quantities of access points APs and stations STAs in the foregoing WLAN system are only examples and do not constitute a limitation on the embodiments of this application.

The STAs used in this application may be user terminals, user apparatuses, access apparatuses, subscriber stations, subscriber units, mobile stations, user agents, user equipment, or other names with wireless communication functions. The user terminals may include handheld devices, vehicle-mounted devices, wearable devices, and computing devices with wireless communication functions, or other processing devices connected to wireless modems, as well as various forms of user equipment (UE), mobile stations (MS), terminals, terminal equipment, portable communications devices, handsets, portable computing devices, entertainment devices, gaming devices or systems, global positioning system devices, any other appropriate devices configured to perform network communication through wireless media, or the like. Herein, for ease of description, the devices described above are collectively referred to as a station or STA.

The first AP and the second AP used in this application are apparatuses that are deployed in a wireless communications network to provide wireless communication functions for their associated stations, and the access point AP can serve as a hub of the communications system. The access point AP may be a base station, a router, a gateway, a repeater, a communications server, a switch, a bridge, or the like. The base station may include various forms of macro base stations, micro base stations, relay stations, or the like. Herein, for ease of description, the devices described above are collectively referred to as an access point AP.

The methods provided in the embodiments of this application relate to a baseband modulation mode of a WLAN module in these devices, and can be specifically applied to a scenario in which an AP uses SOMA modulation to send downlink data in parallel to a plurality of associated STAs. It can be understood that although specific embodiments of this application are described by using an example in which one AP simultaneously sends downlink data to two associated STAs, the joint transmission method provided in the embodiments of this application is still applied to a scenario in which the AP simultaneously sends downlink data to more associated STAs.

To facilitate a better understanding of the embodiments of this application, the following briefly describes basic concepts and principles used in the SOMA technology.

SOMA is short for semi-orthogonal multiple access, and is a new type of multi-user access technology. The SOMA technology specifically means that when an AP sends downlink data to a plurality of STAs associated with the AP, bit data of a plurality of STAs is fused in a specific manner at the symbol modulation stage, and then mapped into higher-order modulation symbols, which are simultaneously sent on the same spectrum resource. At a receiving end, various STAs can receive the same modulation symbol at the same time and on the same spectrum resource, and extract bit data sent to themselves from the received modulation symbol based on SOMA signaling indicated by the AP.

Figure 2:
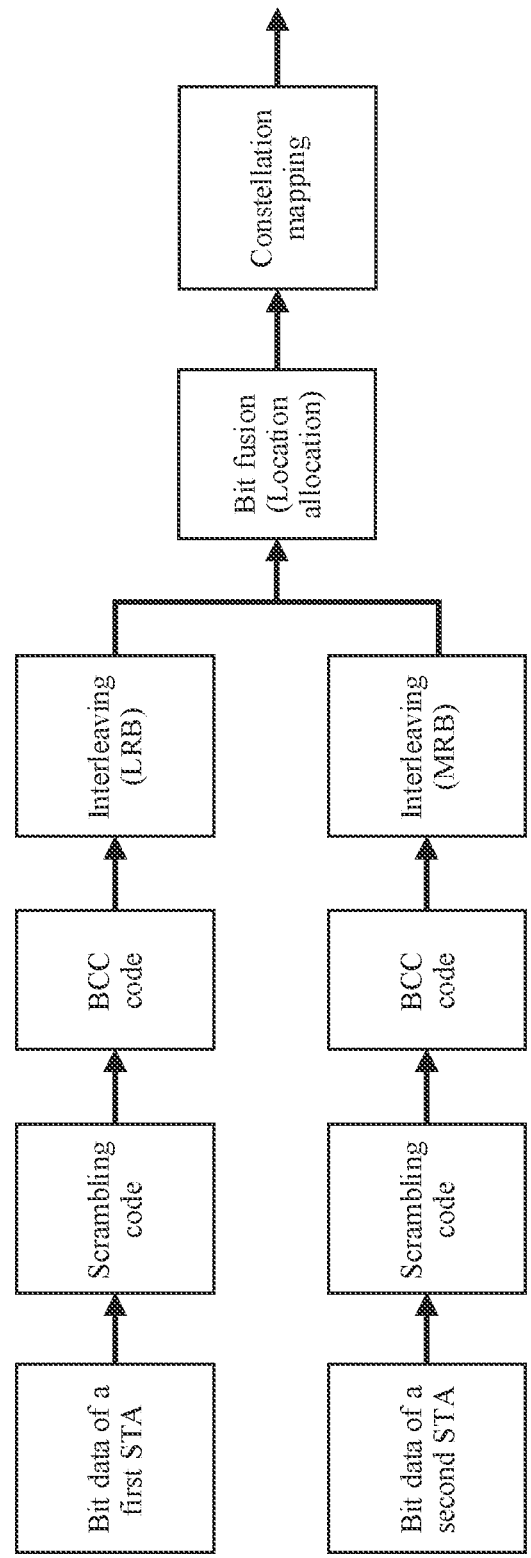
FIG. 2 is a schematic diagram of an SOMA downstream modulation process according to an embodiment of this application.

FIG. 2 shows an example of a typical SOMA downlink modulation process. As shown in FIG. 2, bit data allocated by a first AP to a first STA and a second STA is processed through scrambling, binary convolutional coding (BCC), and interleaving, and then is allocated to bit positions of most reliable bit (MRB) and least reliable bit (LRB). Then, the bit data is mapped into higher-order modulation symbols based on a constellation map corresponding to a specific modulation mode shown in FIG. 3 and enters a subsequent sending process.

Figure 3:
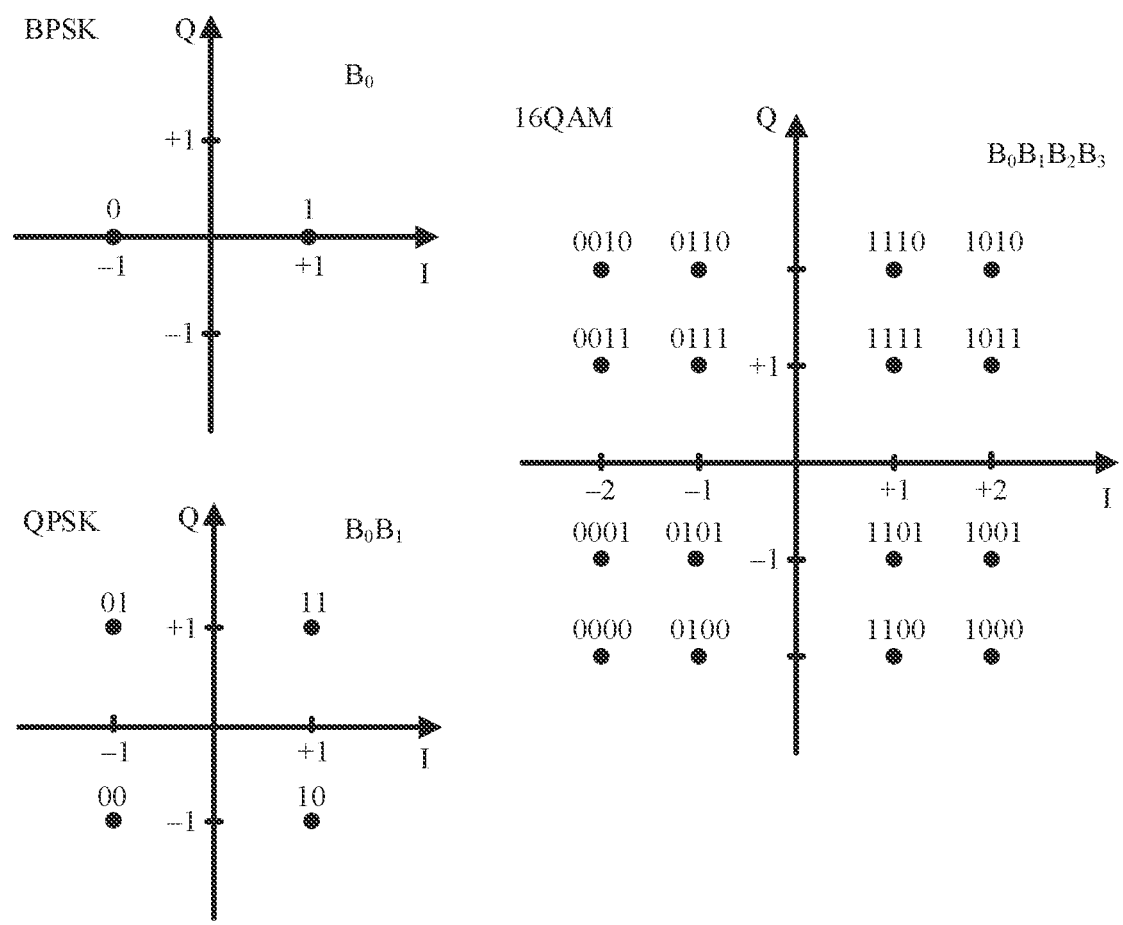
FIG. 3 is a diagram of a constellation mapping relationship according to an embodiment of this application.

At the receiving end, the first STA and the second STA can convert the higher-order modulation symbols sent by the first AP into a bit group based on the constellation map shown in FIG. 3, and then extract bit data sent to themselves from the bit group based on the SOMA signaling information indicated by the first AP for themselves, so as to complete the receiving process.

Figure 4:
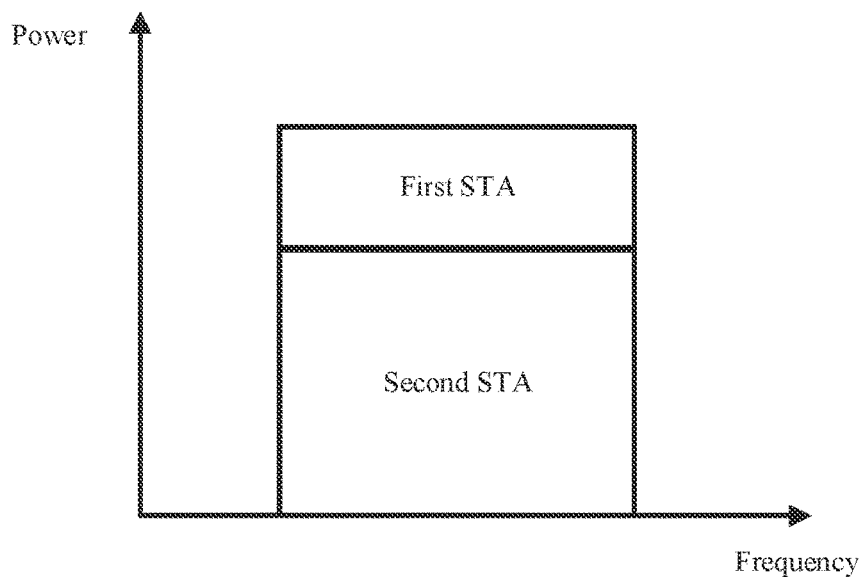
FIG. 4 is a diagram of spectrum and resource allocation for SOMA modulation according to an embodiment of this application.

FIG. 4 shows an example of a spectrum and resource allocation diagram for SOMA modulation. As shown in FIG. 4, the bit data sent to the first STA and the second STA is carried on the same spectrum resource for simultaneous transmission. However, because the bits allocated to the first STA and the second STA have different reliability, power resources allocated to the first STA and the second STA are different. The STA allocated to the MRB position corresponds to large transmit power, and the STA allocated to the LRB position corresponds to small transmit power.

In the embodiments of this application, the first AP is an AP that uses SOMA modulation and sends data to the first STA and the second STA in parallel. The first STA and the second STA are both STAs associated with the first AP, but the first STA and the second STA have different signal-to-noise ratios or channel quality. The first STA is a STA with a lower signal-to-noise ratio or lower channel quality in the two STAs. Generally, a distance between the STA and the AP may be an important factor affecting the signal-to-noise ratio or channel quality of the STA. Therefore, in a possible implementation, the first STA can also be understood as a STA farther from the first AP in the two STAs.

The second AP is an AP that is not associated with the first STA but can communicate with the first STA. It can be understood that, in a scenario in which no multi-AP joint transmission is performed, each AP serves only STAs associated with the AP Because the first STA is not associated with the second AP, the second AP does not send downlink data to the first STA, but the first STA is located within an air interface transmission coverage area of the second AP, and the second AP can perceive, through an air interface, uplink data sent by the first STA. Generally, it can be considered that the first STA is closer to the first AP associated with the first STA, and therefore the first STA is farther away from the second AP.

To improve communication quality of the first STA, an embodiment of this application provides a joint transmission method, in which a second AP is configured to jointly transmit downlink data to the first STA together with the first AP. The following describes the method provided in this application with reference to specific embodiments.

Embodiment 1

Based on the network architecture of the WLAN described above, FIG. 5 shows an example of a joint transmission method according to an embodiment of this application. The method may include the following steps.

Step S501: A first AP sends a first physical layer protocol data unit (PPDU) to a first STA and a second STA.

Step S502: The second AP sends a second PPDU to the first STA, where a sending time of the first PPDU is the same as a sending time of the second PPDU.

In the embodiment of this application, the PPDU generated by the first AP is referred to as the first PPDU, and the PPDU generated by the second AP is referred to as the second PPDU. The first PPDU and the second PPDU have the same format, and each includes a preamble field and a data field. The preamble field is used to carry signaling information related to a STA receiving the PPDU, and the data field is used to carry data information sent to the STA.

Specifically, the preamble field in the first PPDU is a first preamble field, and the data field in the first PPDU is a first data field; the preamble field in the second PPDU is a second preamble field, and the data field in the second PPDU is a second data field. The first preamble field is the same as the second preamble field, and each includes SOMA signaling information required by the first STA to parse the first data field and the second data field, and SOMA signaling information required by the second STA to parse the first data field.

As described above, the first AP can send data to the first STA and the second STA in parallel, and therefore the first data field carries first data information sent to the first STA and second data information sent to the second STA. In the embodiment of this application, the first data field is obtained by the first AP by performing SOMA modulation on the first data information and the second data information, and a bit carrying the first data information and a bit carrying the second data information in the first data field have different reliability.

In a possible implementation, considering that the first STA is the STA farther from the first AP in the two STAs for parallel transmission, in the embodiment of this application, the first AP may allocate an MRB to the first STA and allocate an LRB to the second STA when performing SOMA modulation. To be specific, each modulation symbol uses the MRB to carry the first data information and uses the LRB to carry the second data information. For example, if the first AP uses 16 QAM for SOMA modulation, the first AP can allocate B0 and B2 in each modulation symbol to the first STA, and B1 and B3 to the second STA.

To improve signal reception quality of the first STA, the second data field may also carry the first data information sent to the first STA, and the second AP may send the second PPDU to the first STA when the first AP sends the first PPDU. It can also be understood that the time when the first AP sends the first PPDU is the same as the time when the second AP sends the second PPDU. This is intended to ensure that a time when the first STA receives the first PPDU is roughly the same as a time when the first STA receives the second PPDU.

It should be noted that, based on a working principle of a transceiver, the "simultaneous" used in this application means essential simultaneity and does not strictly require that there should be no difference between the sending time of the first PPDU and the sending time of the second PPDU, provided that the above overall processing is roughly the same in the time dimension. In addition, in the solution of the embodiment of this application, it is beneficial for a plurality of APs to simultaneously send the first PPDU and the second PPDU to the first STA. From the perspective of the station side, the first AP sends the first PPDU to the first STA "at the same time" when the second AP sends the second PPDU to the first STA. This ensures that the first STA receives the first PPDU and the second PPDU roughly "at the same time", and power of the first data information received by the first STA is "superimposed". This helps increase the possibility of successfully parsing the first data information by the first STA in comparison with the receiving of only the first PPDU sent by the first AP. Therefore, it is beneficial for the first access point AP and the second access point AP to simultaneously send the PPDU carrying the first data information to the first STA.

It can be learned that the second AP sends the second PPDU while the first AP sends the first PPDU, and both the first data field and the second data field carry the first data information, which means that the first STA can receive the first PPDU and the second PPDU at the same time, and obtain, through parsing, two copies of the same first data information from the data fields of the two PPDUs. In this way, according to the joint transmission method provided in the embodiments of this application, signal transmit power of the first data information can be effectively increased, and co-channel interference caused by asynchronous information transmission when a plurality of APs jointly send data to the first STA can be avoided, thereby improving the received signal-to-noise ratio of the first STA.

In the embodiment of this application, after receiving the PPDU sent by the AP, a STA can parse and extract, based on the SOMA signaling information indicated by the AP in the preamble field of the PPDU, the data information sent by the AP to the STA in the data field, and does not parse the data information sent to another STA. In this way, although the first AP further carries, in the first data field, the second data information sent to the second STA, from the perspective of the first STA, the data information carried in the data fields of the first PPDU and the second PPDU is still consistent.

Further, in the embodiment of this application, the first preamble field is the same as the second preamble field, and each includes SOMA signaling information required by the first STA to parse the first data field and the second data field, and SOMA signaling information required by the second STA to parse the first data field.

It can be learned that the first AP and the second AP can use the same preamble field to send PPDUs to the first STA at the same sending time, and from the perspective of the first STA, the preamble fields of the two PPDUs are consistent, and each carry the first data information. This can effectively avoid co-channel interference caused by inconsistent sent information when a plurality of APs jointly send data to the first STA, thereby improving the received signal-to-noise ratio of the first STA.

In a possible design, the first preamble field and the second preamble field include SOMA signaling, and the SOMA signaling is used to carry the SOMA signaling information required by the first STA to parse the first data field and the second data field, and the SOMA signaling information required by the second STA to parse the first data field; and specifically, the SOMA signaling includes a common information field and a user specific field; the user specific field includes a user specific subfield corresponding to the first STA and a user specific subfield corresponding to the second STA; any user specific subfield includes a station identifier subfield, a bit MCS subfield, and a bit assignment subfield.

In the embodiment of this application, in the user specific subfield corresponding to the first STA, the station identifier subfield is used to indicate an identifier of the first STA, the bit MCS is used to indicate a bit MCS of the bit carrying the first data information, and the bit assignment subfield is used to indicate reliability of the bit carrying the first data information;

in the user specific subfield corresponding to the second STA, the station identifier subfield is used to indicate an identifier of the second STA, the bit MCS is used to indicate a bit MCS of the bit carrying the second data information, and the bit assignment subfield is used to indicate reliability of the bit carrying the second data information.

In a possible design, the common information field includes: a symbol MCS subfield and a SOMA indication subfield; the symbol MCS subfield is used to indicate a symbol MCS used by the first data field and/or the second data field; the SOMA indication subfield is used to indicate whether the first data field and the second data field use SOMA modulation.

Optionally, in the embodiment of this application, the second AP may also choose whether to send data to another STA associated with the second AP in parallel while sending data to the first STA. In other words, the second AP can only assist the first AP in sending data to the first STA, or cannot only assist the first AP in sending data to the first STA, but also send data to another STA associated with the second AP in parallel, thereby improving the spectrum utilization efficiency, and further increasing the overall network throughput.

If the second AP decides to not only send data to the first STA, but also send data to a third STA associated with the second AP in parallel, the second data field carries the first data information, and third data information sent to the third STA. The second AP can perform SOMA modulation on the first data information and the third data information to obtain the second PPDU, while sending the second PPDU to the first STA and the third STA.

Figure 5:
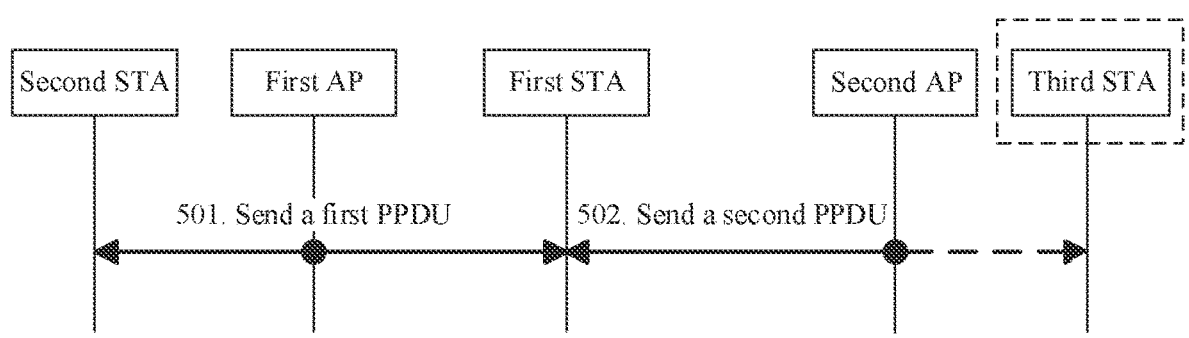
FIG. 5 is a schematic flowchart corresponding to a joint transmission method according to Embodiment 1 of this application.

As shown in FIG. 5, step S502 may be that the second AP sends a second PPDU to the first STA and the third STA. However, because the third STA and the action of sending the second PPDU to the third STA exist only when the second AP decides to perform parallel transmission, the dashed line arrow is used in FIG. 5 to identify the action of sending the second PPDU to the third STA, and a dashed line box is used to enclose the third STA, indicating that this action and the third STA are optional.

Correspondingly, in this case, to enable the third STA to obtain, through correct parsing, the third data information, the second preamble field further includes the SOMA signaling information required by the third STA to parse the second data field. When the first AP and the second AP perform joint transmission, the second preamble field needs to be the same as the first preamble field. Therefore, the first preamble field should also include the SOMA signaling information required by the third STA to parse the second data field.

Therefore, it can be understood that, when the first data field includes the first data information of the first STA and the second data information of the second STA, and the second data field includes the first data information of the first STA and the third data information of the third STA, the first preamble field and the second preamble field each includes: the SOMA signaling information required by the first STA to parse the first data field and the second data field, the SOMA signaling information required by the second STA to parse the first data field, and the SOMA signaling information required by the third STA to parse the second data field. When the first data field includes the first data information of the first STA and the second data information of the second STA, and the second data field includes the first data information of the first STA, the first preamble field and the second preamble field each includes SOMA signaling information required by the first STA to parse the first data field and the second data field, and SOMA signaling information required by the second STA to parse the first data field.

Correspondingly, the SOMA signaling is further used to carry SOMA signaling information required by the third STA to parse the second data field; the user specific field further includes the user specific subfield corresponding to the third STA;

in the user specific subfield corresponding to the third STA, the station identifier subfield is used to indicate an identifier of the third STA, the bit MCS is used to indicate a bit MCS of the bit carrying the third data information, and the bit assignment subfield is used to indicate reliability of the bit carrying the third data information.

Figure 6:
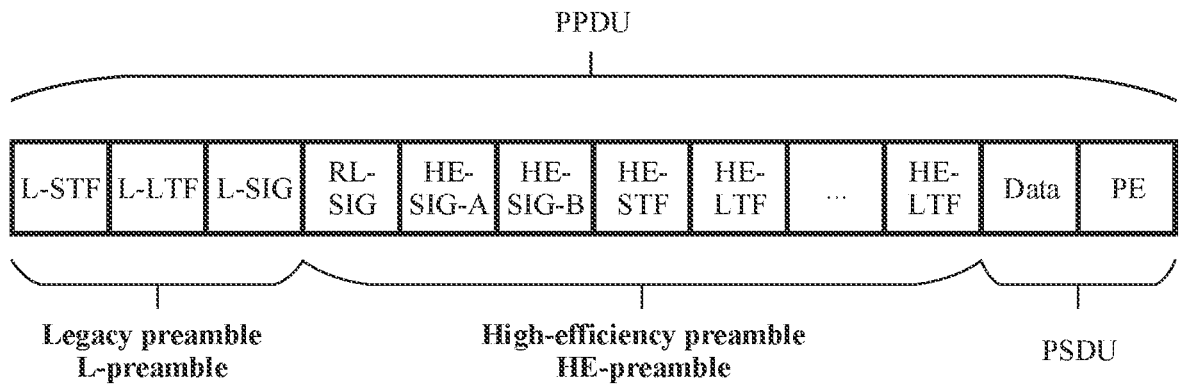
FIG. 6 is a schematic diagram of a frame structure of a PPDU according to an embodiment of this application.

In the embodiment of this application, any one of the foregoing PPDUs may be a PPDU defined based on the IEEE802.11 standard. FIG. 6 shows an example schematic diagram of a frame structure of a PPDU according to an embodiment of this application.

As shown in FIG. 6, the PPDU may include three parts: a legacy preamble (L-Preamble), a high efficiency preamble (HE-Preamble), and a physical layer convergence protocol service data unit (PSDU). The preamble field of any PPDU may include two parts: L-Preamble and HE-Preamble, and the data field may include a PSDU.

Specifically, the L-Preamble part may include fields such as a legacy short training field (L-STF), a legacy long training field (L-LTF), and legacy signaling (L-SIG).

The HE-Preamble part may include fields such as a repeated legacy signaling (RL-SIG), a high efficiency signaling A (HE-SIG-A), a high efficiency signaling B (HE-SIG-B), a high-efficiency short training field (HE-STF), and a high-efficiency long training field (HE-LTF).

The PSDU may include two parts: data payload (data) and packet extension (PE), and the data payload part is used to carry data information sent to the STA.

It can be learned from the foregoing description that, in the embodiment of this application, that the first preamble field is the same as the second preamble field, specifically means that the L-Preamble part in the first PPDU is the same as the L-Preamble part in the second PPDU, and the HE-Preamble part in the first PPDU is also the same as the HE-Preamble part in the second PPDU.

The SOMA signaling information (that is, SOMA signaling) required by each STA to parse the corresponding data field in the first preamble field described above may be located in a specific high efficiency signaling field in the HE-Preamble part of the frame structure of the PPDU, for example, the high efficiency signaling A or the high efficiency signaling B. Alternatively, in another possible design, the SOMA signaling information may also be located in a newly defined signaling field C in the HE-Preamble part based on the current PPDU frame format. The signaling field C may also be referred to as high efficiency signaling C (HE-SIG-C), a next-generation information field, a new signaling field, or another name, which is not specifically limited in the embodiment of this application. The signaling field C is not shown in FIG. 6, and may be located after the HE-SIG-B field shown in FIG. 6, or at another position in the HE-Preamble part of the PPD, which is not specifically limited in the embodiment of this application, either.

In the embodiment of this application, the SOMA signaling information required by any STA to parse the corresponding data field may include three aspects: a symbol modulation and coding scheme (MCS) of the corresponding data field, a bit position carrying data information sent to the STA in the corresponding data field, and a bit MCS of a bit carrying the data information sent to the STA in the corresponding data field. The bit position carrying the data information of the STA in the corresponding data field may be indicated by the reliability of the bit carrying the data information of the STA in each modulation symbol, for example, whether the bit carrying the specified data information of the STA is an MRB or an LRB.

For example, in the embodiment of this application, the SOMA signaling information required by the first STA to parse the first data field may be: the symbol MCS (such as 16 QAM) used in the first data field, the bit carrying the first data information is an MRB in each symbol, and the bit MCS of the bit carrying the first data information in the first data field is QPSK.

It can be learned that the SOMA signaling information can reflect the modulation mode used by the AP when performing symbol modulation. Regardless of which way the AP modulates and encodes the data sent to the STA, the STA can use the same way to reversely parse the corresponding data field and extract the data information sent by the AP to the STA.

In a possible design, the bit carrying the first data information in the first data field has the same reliability as the bit carrying the first data information in the second data field, and the bit carrying the first data information in the first data field has the same bit MCS as the bit carrying the first data information in the second data field.

In other words, because the first STA is far away from the first AP and the second AP, when the first AP needs to allocate an MRB to the first STA, the second AP also allocates an MRB to the first STA. This can significantly increase transmit power of the first data information, and increase a signal-to-noise ratio of the signal received by the first STA. The bit MCSs of the bits carrying data information in the two data fields are also the same, which may mean that from the perspective of the first STA, the modulation symbols in the two data fields are also the same. This can further avoid co-channel interference caused by inconsistent sent information when a plurality of APs perform joint transmission, thereby improving the signal reception quality of the first STA.

The following describes in detail negotiation between APs and the PPDU generation process in the joint transmission method provided in Embodiment 1 of this application separately based on two scenarios: the second AP sends data to an associated third STA in parallel when sending data to the first STA; and the second AP sends data to the first STA only.

Scenario 1: The second AP sends data to an associated third STA in parallel when sending data to the first STA.

Figure 7:
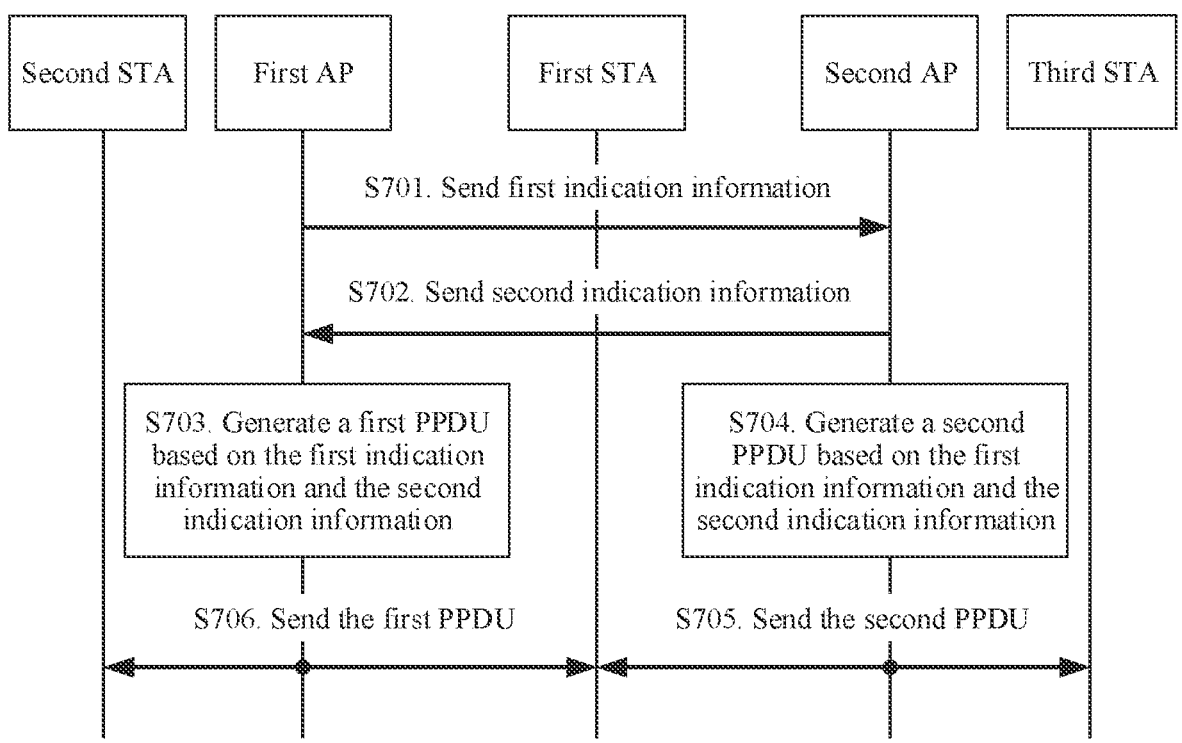
FIG. 7 is a schematic flowchart corresponding to a joint transmission method applicable to scenario 1 according to Embodiment 1 of this application.

FIG. 7 shows an example of a joint transmission method applicable to scenario 1 according to an embodiment of this application. As shown in FIG. 7, the method may include the following steps:

Step S701: A first AP sends first indication information to a second AP, where the first indication information includes SOMA signaling information required by a first STA and a second STA to parse a first data field; the first data field carries first data information sent to the first STA, and second data information sent to the second STA.

Step S702: The second AP sends second indication information to the first AP, where the second indication information includes SOMA signaling information required by the third STA to parse the second data field, the second data field carries third data information sent to a third STA, and the third STA is a STA associated with the second AP.

Step S703: The first AP receives the second indication information sent by the second AP, and generates a first PPDU based on the first indication information and the second indication information, where a first preamble field includes: the SOMA signaling information required by the first STA to parse the first data field and the second data field, the SOMA signaling information required by the second STA to parse the first data field, and the SOMA signaling information required by the third STA to parse the second data field.

Step S704: The second AP generates a second PPDU based on the first indication information and the second indication information, where a second preamble field is the same as the first preamble field.

Step S705: The second AP sends the second PPDU to the first STA and the third STA, where a sending time of the second AP for sending the second PPDU is the same as a sending time of the first AP for sending the first PPDU.

Step S706: The first AP sends the first PPDU to the first STA and the second STA.

To ensure that each STA participating in the joint transmission can correctly parse the data information sent to the STA, and the PPDUs generated by the first AP and the second AP have the same preamble field, in the embodiment of this application, before the first AP and the second AP generate the PPDUs, the method further includes the step in which the first AP and the second AP exchange the SOMA signaling information required by their respective receiving STAs to parse the data fields.

Specifically, in step S701, the first AP may send first indication information to the second AP, and inform, through the first indication information, the second AP of the SOMA signaling information required by each receiving STA of the first PPDU to parse the first data field. In the embodiment of this application, the first AP can send data to the associated first STA and second STA in parallel. Correspondingly, the first data field carries corresponding first data information and second data information. Therefore, the first indication information may include SOMA signaling information required by the first STA and the second STA to parse the first data field.

In step S702, after receiving the first indication information sent by the first AP, the second AP may obtain the SOMA signaling information required by the first STA and the second STA to parse the first data field. When determining that the second AP does not interfere with the second STA, the second AP determines, based on the SOMA signaling information required by the first STA to parse the first data field, the SOMA signaling information required by the third STA to parse the second data field, and adds at least the SOMA signaling information required by the third STA to parse the second data field to the second indication information and sends the second indication information to the first AP.

It can be learned that, after determining that the second AP does not interfere with the second STA, the second AP can determine that the second AP can assist the first AP in sending data to the first STA while sending data to another STA associated with the second AP in parallel. The third STA is another STA for which the second AP performs parallel transmission when sending data to the first STA, and the third STA may be a STA that is associated with the second AP, and that is not interfered by the first AP.

It can be understood that, in the embodiment of this application, after the second AP determines that the second AP does not interfere with the second STA, and before the second AP sends the second indication information to the first AP, the method may further include the step of determining the third STA and arranging the third data information to be sent to the third STA.

It should be noted that in the embodiment of this application, after receiving the first indication information, the second AP can determine, based on the SOMA signaling information that is required by the second STA to parse the first data field and that is included in the first indication information, that the first AP sends data to the second STA in parallel while sending data to the first STA, and then determine whether the second AP interferes with the second STA. Alternatively, in another possible design, before receiving the first indication information, the second AP can also learn through other means that the first AP further performs parallel transmission for the second STA in parallel while sending data to the first STA, and then determine whether the second AP interferes with the second STA. This is not specifically limited in the embodiment of this application.

In the embodiment of this application, the second indication information includes at least the SOMA signaling information required by the third STA to parse the second data field. In a possible design, considering that the first data field carries the first data information and the second data information, and the second data field carries the first data information and the third data information, the bit carrying the first data information in the first data field has the same reliability as the bit carrying the first data information in the second data field, and the bit carrying the first data information in the first data field has the same bit MCS as the bit carrying the first data information in the second data field. Therefore, in the embodiment of this application, the SOMA signaling information required by the first STA to parse the first data field is the same as the SOMA signaling information required by the first STA to parse the second data field. Furthermore, the second indication information may include only the SOMA signaling information required by the third STA to parse the second data field. This can effectively reduce a data amount in information exchange between the first AP and the second AP in the process of negotiating the preamble field, thereby improving the efficiency of joint transmission.

In another possible design, the second indication information may include SOMA signaling required by the first STA to parse the first data field, and SOMA signaling information required by the third STA to parse the second data field, to ensure consistency and accuracy of SOMA signaling information included in a preamble field of a subsequently generated PPDU. In step S703, the first AP can receive the second indication information sent by the second AP, and generate the first PPDU based on the first indication information and the second indication information. Specifically, the first AP can obtain, from the received second indication information, the SOMA signaling information required by the third STA to parse the second data field. Subsequently, a first preamble field is generated based on the SOMA signaling information required by the third STA to parse the second data field, and the SOMA signaling information that is required by the first STA to parse the first data field and that is included in the first indication information, and the SOMA signaling information that is required by the second STA to parse the first data field, and that is included in the first indication information. The first preamble field includes the SOMA signaling information required by the first STA to parse the first data field, the SOMA signaling information required by the second STA to parse the first data field, and the SOMA signaling information required by the third STA to parse the second data field.

Furthermore, the first PPDU is obtained based on the first preamble field and the first data field.

Because the first STA and the second STA are both STAs associated with the first AP, the first AP can allocate the first data information to the first STA and the second data information to the second STA before sending the first indication information, and determine a manner of performing SOMA modulation on the first data information and the second data information, for example, which symbol MCS is used to modulate the fused data information, which types of reliability of bits are used to carry the first data information and the second data information respectively, which bit MCSs are used to modulate the first data information and the second data information respectively, and so on. Therefore, the first AP can perform SOMA modulation on the first data information and the second data information before sending the first indication information, or before or after generating the first preamble field, to obtain the first data field. This is not specifically limited in the embodiment of this application.

Similarly, in step S704, the second AP may also generate a second PPDU based on the first indication information and the second indication information. Specifically, the second AP generates a second preamble field based on the SOMA signaling required by the third STA to parse the second data field, and the SOMA signaling information that is required by the first STA to parse the first data field and that is included in the first indication information, and the SOMA signaling information that is required by the second STA to parse the first data field and that is included in the first indication information. The second preamble field is the same as the first preamble field, and also includes the SOMA signaling information required by the first STA to parse the first data field, the SOMA signaling information required by the second STA to parse the first data field, and the SOMA signaling information required by the third STA to parse the second data field.

Furthermore, the second PPDU is obtained based on the second preamble field and the second data field.

In the embodiment of this application, the second data field is obtained by the second AP by performing SOMA modulation on the first data information and the third data information. In addition, after the second AP determines, based on the SOMA signaling information required by the first STA to parse the first data field, the SOMA signaling required by the third STA to parse the second data field, the second AP can perform SOMA modulation on the first data information and the third data information to generate the second data field. The second AP may simultaneously generate the second data field while generating the second preamble field, or may first generate the second preamble field and then generate the second data field, and vice versa.

It can be understood that, in this embodiment of this application, the third STA is a STA associated with the second AP, and the second AP can allocate the to-be-sent third data information to the third STA. However, the first STA is a STA associated with the first AP, not a STA associated with the second AP, and the second AP does not allocate the to-be-sent first data information to the first STA. Therefore, before the second AP generates the second data field, the embodiment of this application may further include the step in which the second AP receives the first data information sent by the first AP.

In a possible design, the first AP can send the first data information to the second AP while sending the first indication information, thereby simplifying the interaction process between APs and improving the efficiency of joint transmission; alternatively, the first AP can separately send the first indication information and the first data information. This is not specifically limited in the embodiment of this application.

It should be noted that, the execution sequence of step S703 and step S704 is not specifically limited in the embodiment of this application. The first AP and the second AP may simultaneously generate two PPDUs respectively based on the first indication information and the second indication information, or may not simultaneously generate the two PPDUs. For example, the first PPDU is first generated and the second PPDU is then generated, or the second PPDU is first generated and the first PPDU is then generated, provided that the first AP and the second AP can simultaneously send the PPDUs.

Figure 8A:
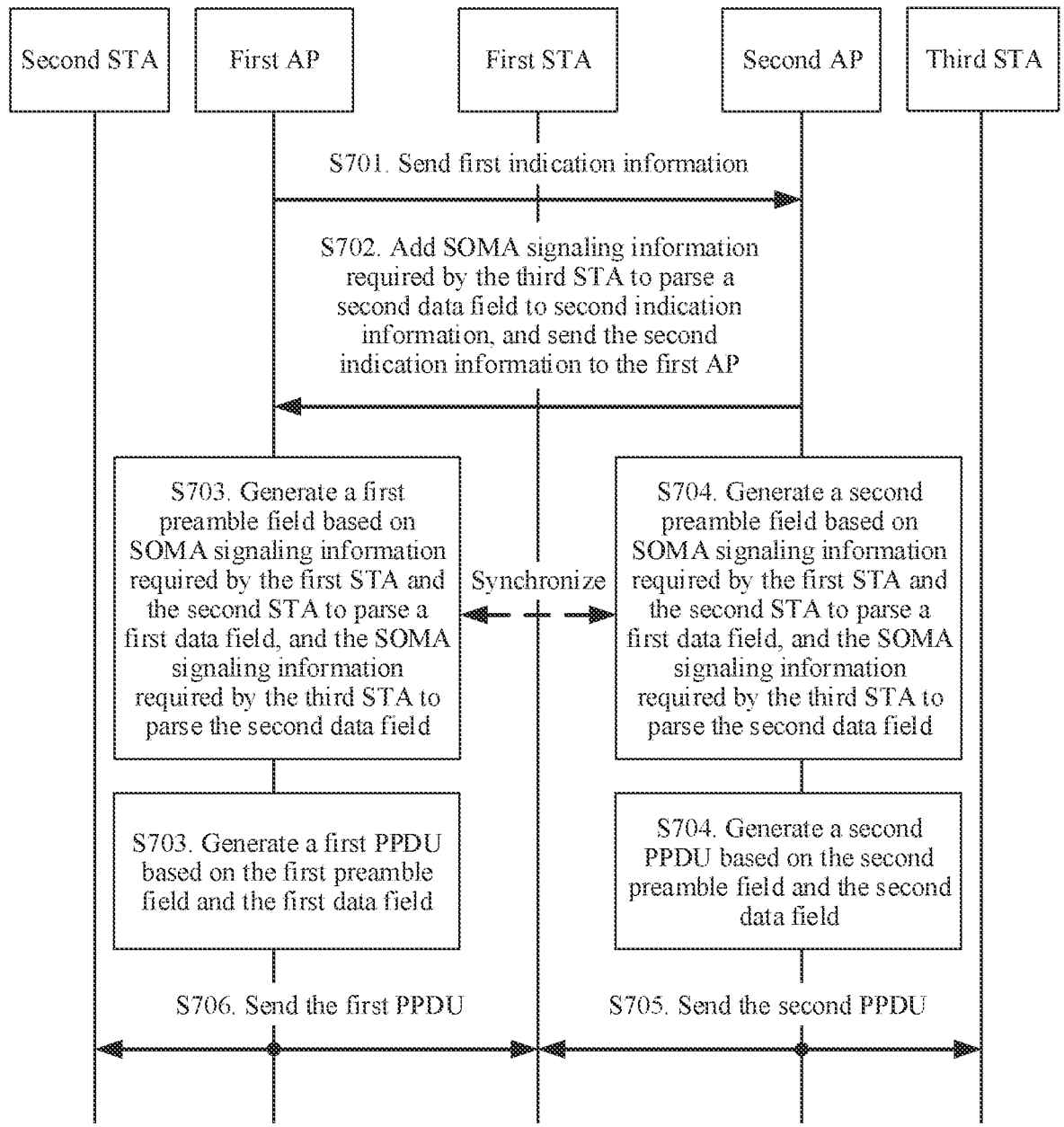
FIG. 8a, FIG. 8b, and FIG. 8c are respectively schematic flowcharts corresponding to three implementations for generating a PPDU in scenario 1 according to Embodiment 1 of this application.

Further, steps S703 and S704 are only one of the possible implementations for generating the PPDU according to the embodiment of this application. As shown in FIG. 8a, after the first AP and the second AP obtain, through interaction, the SOMA signaling required by the STAs receiving the PPDUs sent by the other party to parse the corresponding data field, the first AP and the second AP can synchronously generate the same preamble field and then generate corresponding PPDUs respectively through step S703 and step S704. Alternatively, one of the APs can directly generate the preamble field after learning the SOMA signaling required by the STA receiving the PPDU sent by the other party to parse the corresponding data field, and then send the preamble field to another AP. In this way, the same preamble field is obtained, and then corresponding data packets are respectively generated.

Figure 8B:
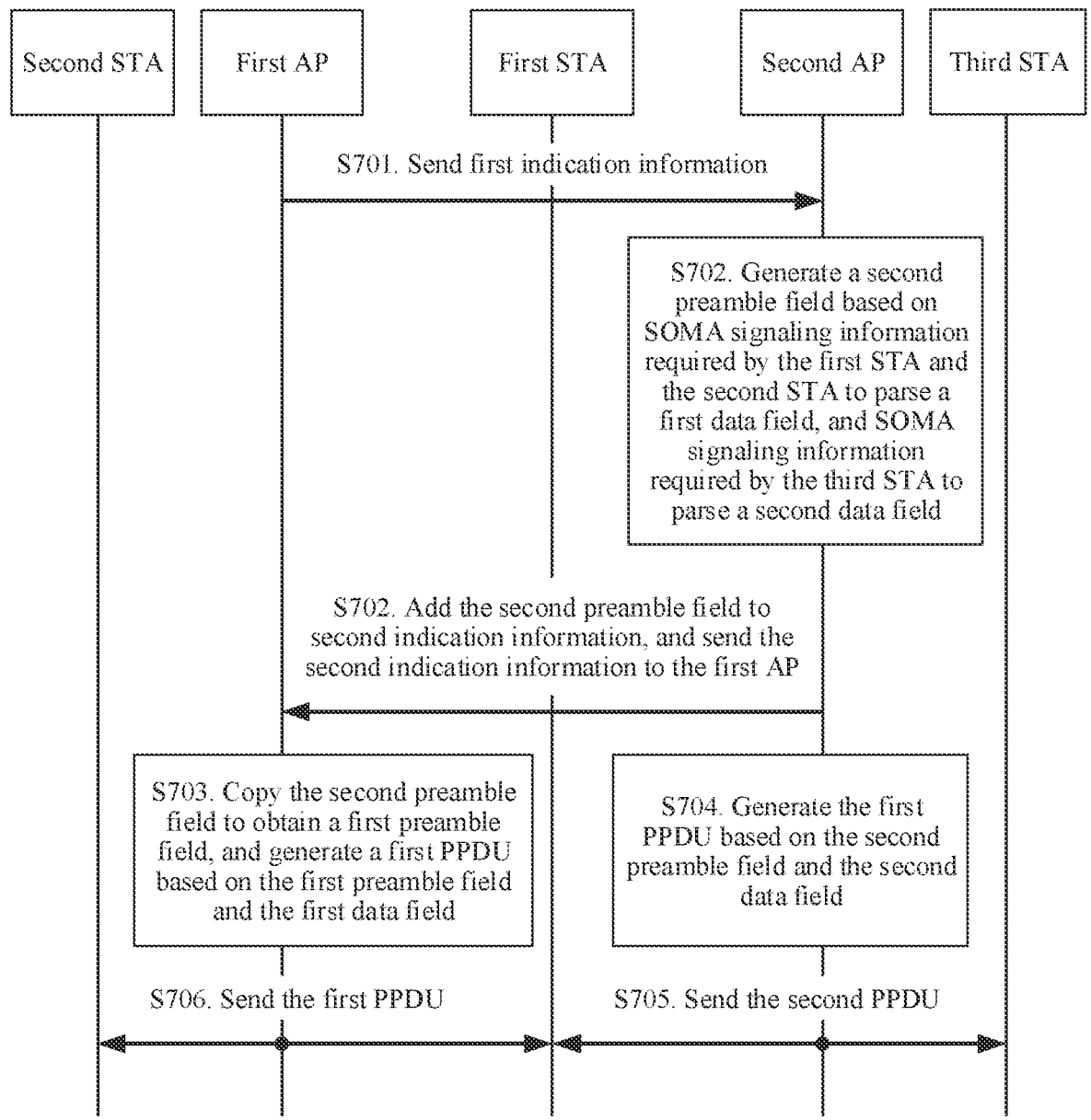

For example, in a possible design, as shown in FIG. 8b, after the second AP determines, based on the SOMA signaling information required by the first STA to parse the first data field, the SOMA signaling information required by the third STA to parse the second data field, the second AP can directly generate a second preamble field based on the SOMA signaling information required by the first STA and the second STA to parse the first data field, and the SOMA signaling information required by the third STA to parse the second data field, and add the second preamble field to the second indication information and send the second indication information to the first AP. In this way, the second indication information may include a complete second preamble field. After receiving the second indication information, the first AP can directly copy the second preamble field to obtain the first preamble field, and then generate the first PPDU based on the first preamble field and the first data field.

Figure 8C:
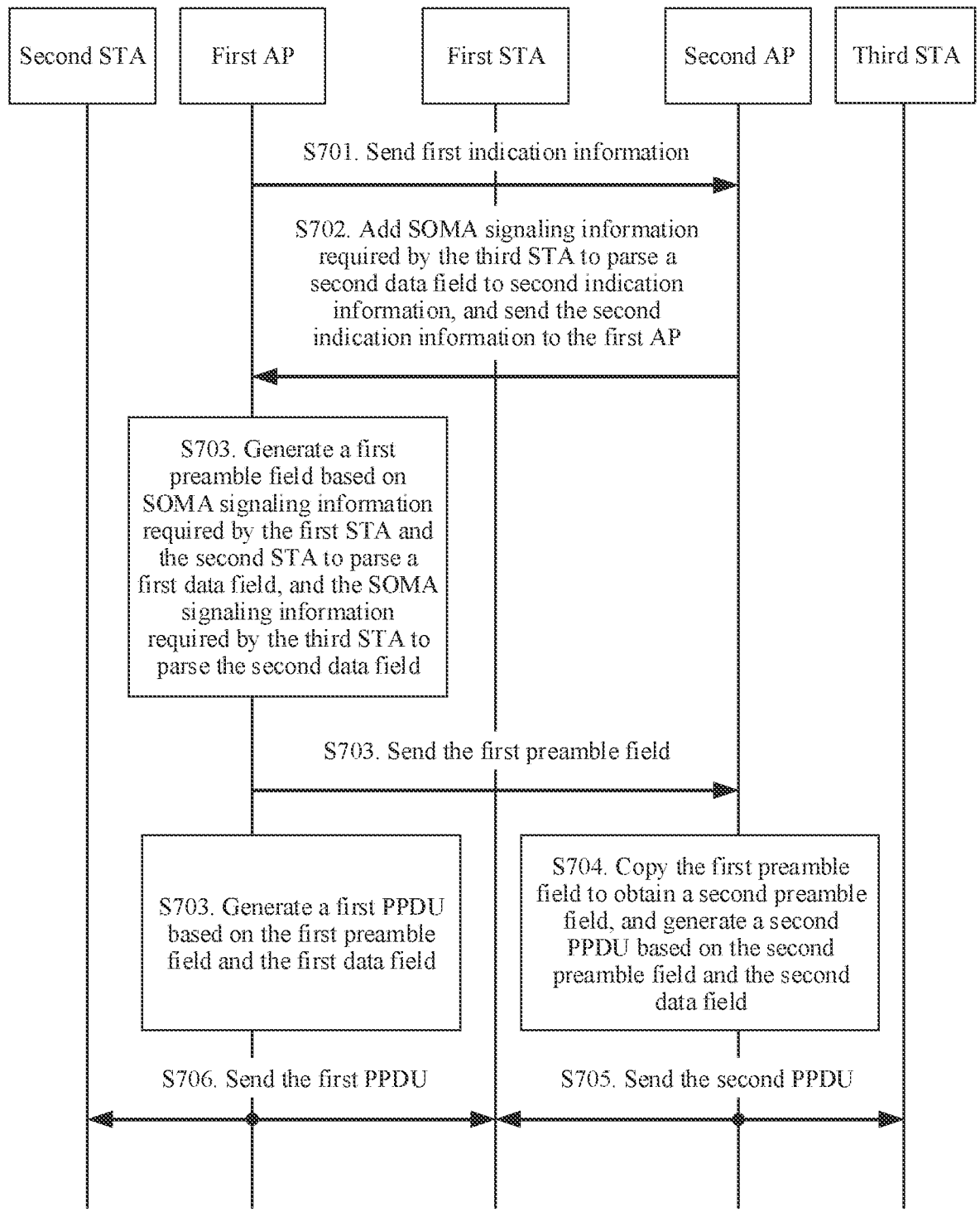

In another possible design, as shown in FIG. 8c, after determining, based on the SOMA signaling information required by the first STA to parse the first data field, the SOMA signaling information required by the third STA to parse the second data field, the second AP can add the SOMA signaling information required by the third STA to parse the second data field to the second indication information and send the second indication information to the first AP. After receiving the second indication information, the first AP can generate a first preamble field based on the SOMA signaling information required by the first STA and the second STA to parse the first data field, and the SOMA signaling information required by the third STA to parse the second data field, and then send the first preamble field to the second AP. After receiving the first preamble field, the second AP can directly copy the first preamble field to obtain the second preamble field, and generate the second PPDU based on the second preamble field and the second data field.

Based on the frame format of the PPDU described above, it can be seen that the preamble field of the PPDU includes not only the SOMA signaling information required by the STA to parse the corresponding data field, but also other content except the SOMA signaling information in the L-Preamble and the HE-Preamble. Therefore, to ensure that the second AP can generate a preamble field that is completely consistent with the preamble field of the first AP, in a possible design, the first indication information sent by the first AP in step S701 may be an initial preamble field generated by the first AP. The initial preamble field may be a preamble field of a PPDU sent when the first AP independently sends data to the first STA and the second STA, but does not perform joint transmission with another AP. The initial preamble field also includes two parts: L-Preamble and HE-Preamble, but differs from the first preamble field in that the HE-Preamble part in the initial preamble field includes only the SOMA signaling information required by the first STA and the second STA to parse the first data field, and does not include the SOMA signaling information required by the third STA to parse the second data field.

Therefore, in step S703, when generating the second PPDU, the second AP can combine the first indication information with the second indication information, or add the SOMA signaling information required by the third STA to parse the second data field to the first indication information, so as to obtain the second preamble field. Correspondingly, in step S704, when generating the first PPDU, the first AP can also combine the first indication information with the second indication information, or add the SOMA signaling information required by the third STA to parse the second data field to the first indication information, so as to obtain the first preamble field.

In the embodiment of this application, when generating corresponding PPDUs, the first AP and the second AP can add, to the SOMA signaling, the foregoing SOMA signaling information required by the first STA, the second STA, and the third STA to parse the first data field and/or the second data field, and integrate the SOMA signaling into the HE-Preamble of the PPDU.

In other words, in scenario 1, the SOMA signaling is used to carry the SOMA signaling information required by the first STA to parse the first data field and the second data field, the SOMA signaling information required by the second STA to parse the first data field, and the SOMA signaling information required by the third STA to parse the first data field.

The SOMA signaling includes a common information field and a user-specific field. The common information field includes: a symbol MCS subfield and a SOMA indication subfield; the symbol MCS subfield is used to indicate a symbol MCS used by the first data field and/or the second data field; the SOMA indication subfield is used to indicate whether the first data field and the second data field use SOMA modulation.

The user specific field includes a user specific subfield corresponding to the first STA, a user specific subfield corresponding to the second STA, and a user specific subfield corresponding to the third STA; any user specific subfield includes a station identifier subfield, a bit MCS subfield, and a bit assignment subfield.

Specifically, in the user specific subfield corresponding to the first STA, the station identifier subfield is used to indicate an identifier of the first STA, the bit MCS is used to indicate a bit MCS of the bit carrying the first data information, and the bit assignment subfield is used to indicate reliability of the bit carrying the first data information;

in the user specific subfield corresponding to the second STA, the station identifier subfield is used to indicate an identifier of the second STA, the bit MCS is used to indicate a bit MCS of the bit carrying the second data information, and the bit assignment subfield is used to indicate reliability of the bit carrying the second data information;

in the user specific subfield corresponding to the third STA, the station identifier subfield is used to indicate an identifier of the third STA, the bit MCS is used to indicate a bit MCS of the bit carrying the third data information, and the bit assignment subfield is used to indicate reliability of the bit carrying the third data information.

Figure 9A:
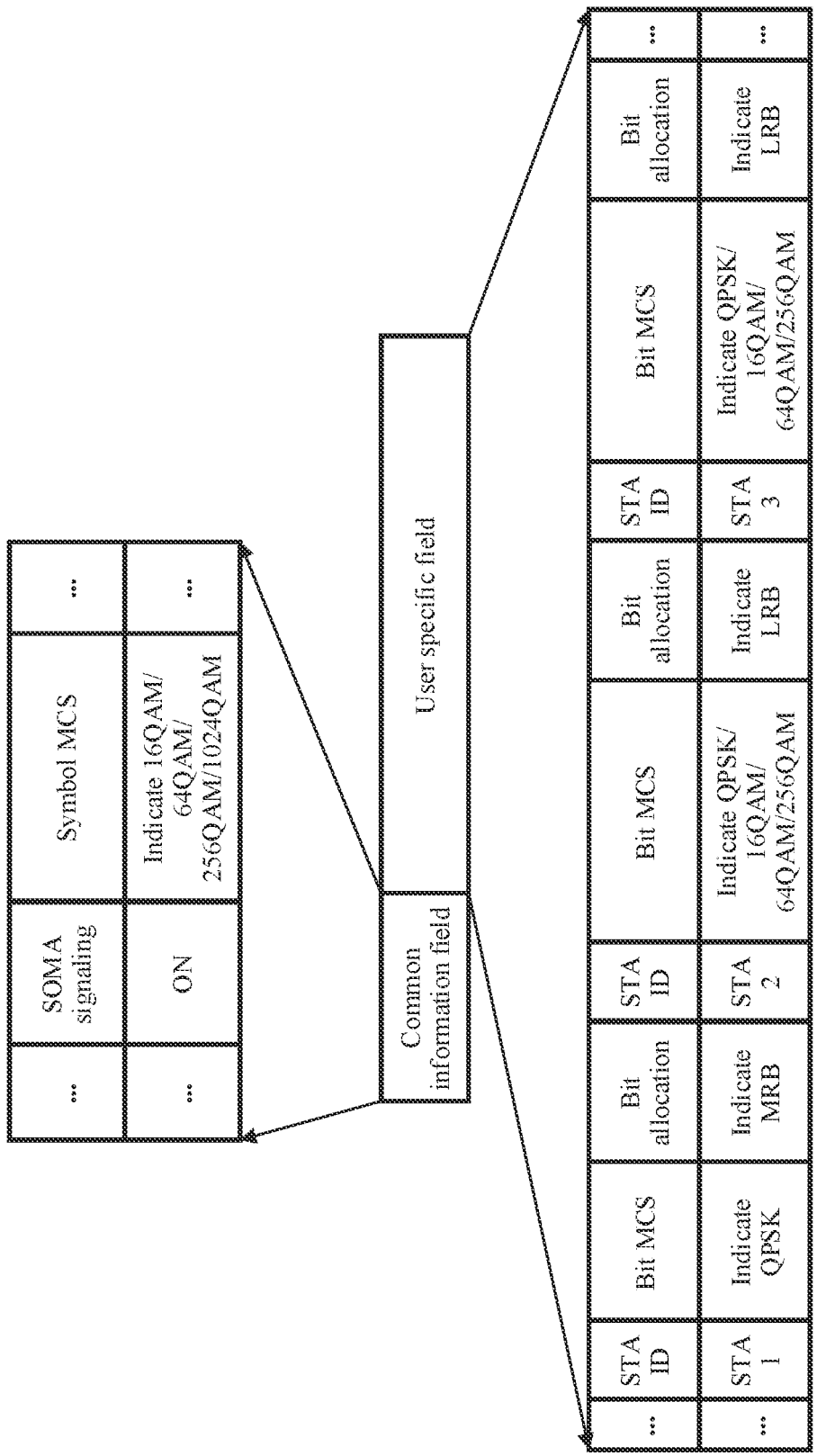
FIG. 9a and FIG. 9b show formats of SOMA signaling applicable to scenario 1 according to Embodiment 1 of this application.

FIG. 9a shows an example format of SOMA signaling applicable to scenario 1. As shown in FIG. 9a, SOMA signaling information is located in a common field and a user specific field.

The common field is used to indicate common information required by each STA, and the SOMA signaling information in this field can be read by all STAs. Specifically, the common field may include two SOMA-related subfields: SOMA indication subfield and symbol MCS subfield. Certainly, this field may further include other signaling information that is unrelated to SOMA. Details are not described again in the embodiment of this application. The SOMA indication subfield includes one bit, which is used to indicate whether the data payload part of the PPDU uses SOMA modulation. When a value of this subfield is 1, it indicates that the data payload part uses SOMA modulation. The symbol MCS subfield is used to indicate which MCS is to be used by a modulated symbol if SOMA modulation is used, for example, 16-quadrature amplitude modulation (QAM), 64 QAM, 256 QAM, and 1024 QAM.

The user specific field is used to separately indicate each STA. Information in this field for various STAs is generally different. Each STA only needs to read signaling information related to itself in this field. As shown in FIG. 9a, in the user specific field, any STA may include one item of SOMA signaling information. The SOMA signaling information may include three subfields: station identifier (STA ID), bit MCS, and bit assignment, and the three subfields are arranged consecutively. The STA ID subfield is used to instruct a specific STA to start reading the SOMA signaling information sent to the STA, that is, the content in the bit MCS subfield and the bit assignment subfield following the STA ID subfield. For example, if a value of a specific STA ID subfield is the first STA, the second STA and the third STA may ignore the bit MCS subfield and the bit assignment subfield following the STA ID subfield. The bit MCS subfield is used to indicate the modulation mode of the bits allocated by the AP to a specific STA, such as quadrature phase shift keying (QPSK), 16 QAM, 64 QAM, and 256 QAM. The bit assignment subfield is used to indicate the type of bits allocated to a specific STA, that is, the type of reliability of bits that should be extracted by the specific STA, such as MRB or LRB.

In scenario 1, the first AP can send data to the first STA and the second STA in parallel, and the second AP can send data to the first STA and the third STA in parallel. Therefore, the user specific field in the SOMA signaling shown in FIG. 9a includes SOMA signaling information of the first STA, the second STA, and the third STA. In addition, the SOMA signaling information of the first STA can be used to parse both the first data field and the second data field.

Figure 9B:
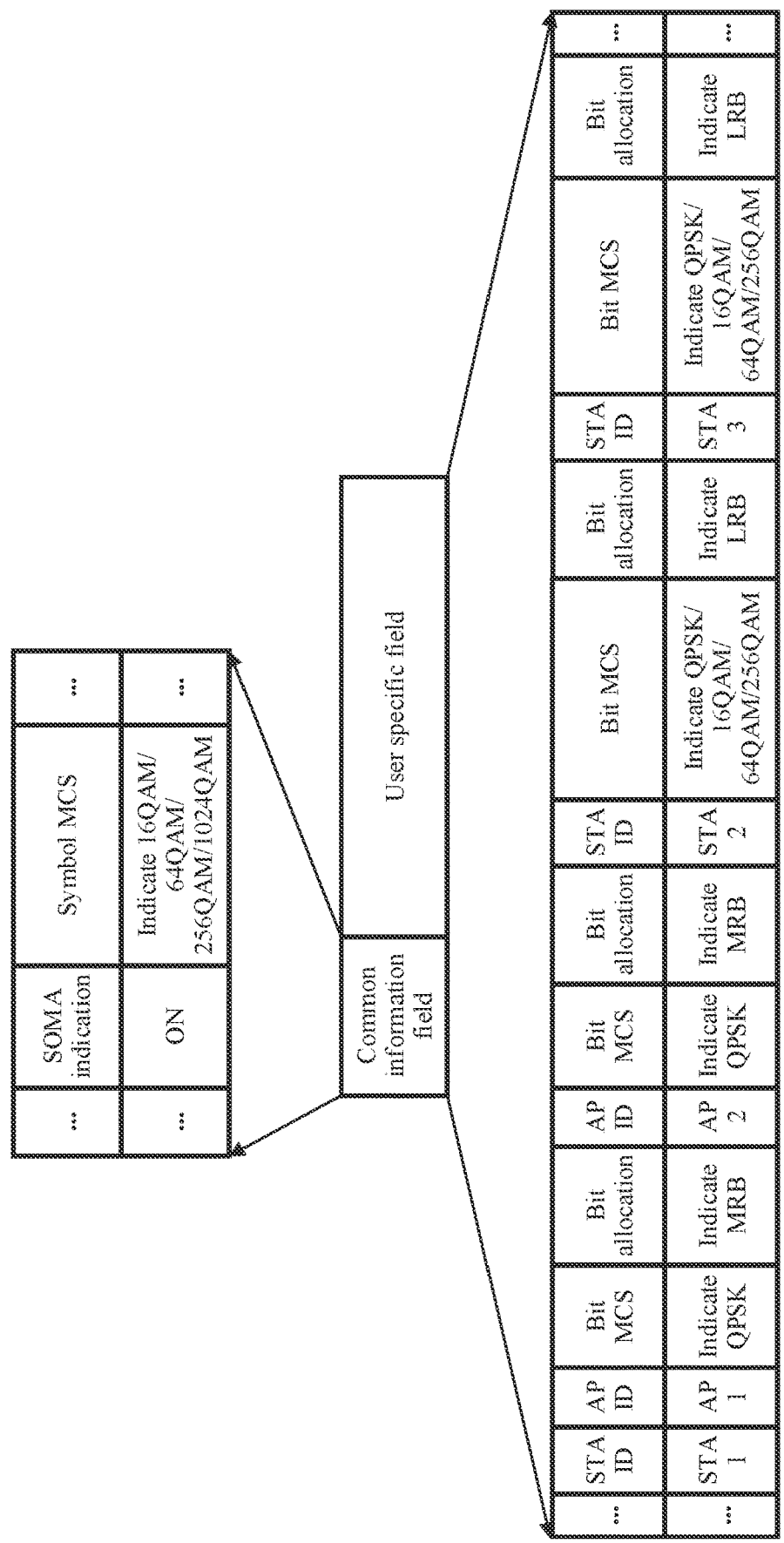

In another possible design, as shown in FIG. 9b, the first STA includes two items of SOMA signaling information. One item corresponds to the first AP and is used to parse the first data field. The other item corresponds to the second AP and is used to parse the second data field. The two items of SOMA signaling information are the same (that is, the content of the bit MCS subfield and the bit assignment subfield is the same).

It should be noted that, as an example, FIG. 9a and FIG. 9b show only bits of two types of reliability: MRB and LRB. It can be understood that a quantity of bits included in one modulation symbol varies based on the symbol MCS used by the AP. For example, when 16 QAM is used for symbol modulation, one modulation symbol may include four bits, and when 64 QAM is used for symbol modulation, one modulation symbol may include six bits. Therefore, in some symbol MCSs, the reliability of bits may have more reliability levels, such as high reliability bits, medium reliability bits, low reliability bits, and non-reliability bits. Then, bits of corresponding reliability levels should be identified in the bit assignment subfield in FIG. 9a or FIG. 9b. This is not specifically limited in the embodiment of this application.

Therefore, it can be understood that, based on different symbol modulation modes, there may be more than two reliability levels of bits included in one modulation symbol. For ease of description, the embodiment of this application is described by using bits of two types of reliability as an example. However, this does not constitute a limitation on the embodiment of this application.

From the perspective of the power domain, SOMA modulation can be regarded as a combination of a set of QPSK modulation and a set of lower-order symbol modulation under a specific power ratio, where QPSK modulation is the bit MCS of the STA occupying the MRB position, and the lower-order symbol modulation is the bit MCS of the STA occupying the LRB position. It can be learned that, considering that when performing SOMA modulation, the first AP allocates an MRB to the first STA, and regardless of which symbol MCS is used by the first AP, the bit MCS of the first STA may always be QPSK. However, the bit MCS of the second STA may be jointly determined based on the symbol MCS used by the first AP and the bit MCS of the first STA. Similarly, considering that the second AP also allocates an MRB to the first STA, after receiving the first indication information, the second AP can determine a symbol MCS used by the third STA jointly based on the symbol MCS used by the first AP and the bit MCS of the first STA.

For example, 16 QAM is equivalent to the combination of two sets of QPSK at a power ratio of 0.8:0.2. If the first AP uses 16 QAM for symbol modulation, bit MCSs of the first STA occupying the MRB position and the second STA occupying the LRB position are both QPSK, and using SOMA modulation to send data to the first STA and the second STA in parallel is equivalent to using 80% of the total transmit power to send QPSK modulation symbols to the first STA, and using 20% of the total transmit power to send QPSK modulation symbols to the second STA. In this case, the second AP also uses 16 QAM for symbol modulation. Bit MCSs of the first STA occupying the MRB position and the third STA occupying the LRB position are both QPSK, and using SOMA modulation to send data to the first STA, and the third STA in parallel is equivalent to using 80% of the total transmit power to send QPSK modulation symbols to the first STA, and using 20% of the total transmit power to send QPSK modulation symbols to the third STA.

For another example, 64 QAM is equivalent to the combination of one set of QPSK and one set of 16 QAM at a power ratio of 0.77:0.23. If the first AP uses 64 QAM for symbol modulation, a bit MCS of the first STA occupying the MRB position is QPSK and a bit MCS of the second STA occupying the LRB position is 16 QAM, and using SOMA modulation to send data to the first STA and the second STA in parallel is equivalent to using 77% of the total transmit power to send QPSK modulation symbols to the first STA, and using 23% of the total transmit power to send 16 QAM modulation symbols to the second STA. In this case, the second AP also uses 16 QAM for symbol modulation. A bit MCS of the first STA occupying the MRB position is QPSK and a bit MCS of the third STA occupying the LRB position is 16 QAM, and using SOMA modulation to send data to the first STA, and the third STA in parallel is equivalent to using 77% of the total transmit power to send QPSK modulation symbols to the first STA, and using 23% of the total transmit power to send 16 QAM modulation symbols to the third STA.

In step S705 and step S706, the first AP can send the first PPDU to the first STA and the second STA, the second AP can send the second PPDU to the first STA and the third STA, and the sending time of the first PPDU is the same as the sending time of the second PPDU, so that the first STA can receive the first PPDU and the second PPDU at the same time, and co-channel interference caused by asynchronous information reception in the PPDU receiving process can be avoided.

In the embodiment of this application, the first AP and the second AP may agree on the sending time of the corresponding PPDU advance. For example, the first AP may send the joint sending time to the second AP while sending the first indication information, so that the second AP can determine the sending time of the second PPDU. The joint sending time is the sending time of the first PPDU.

Figure 10:
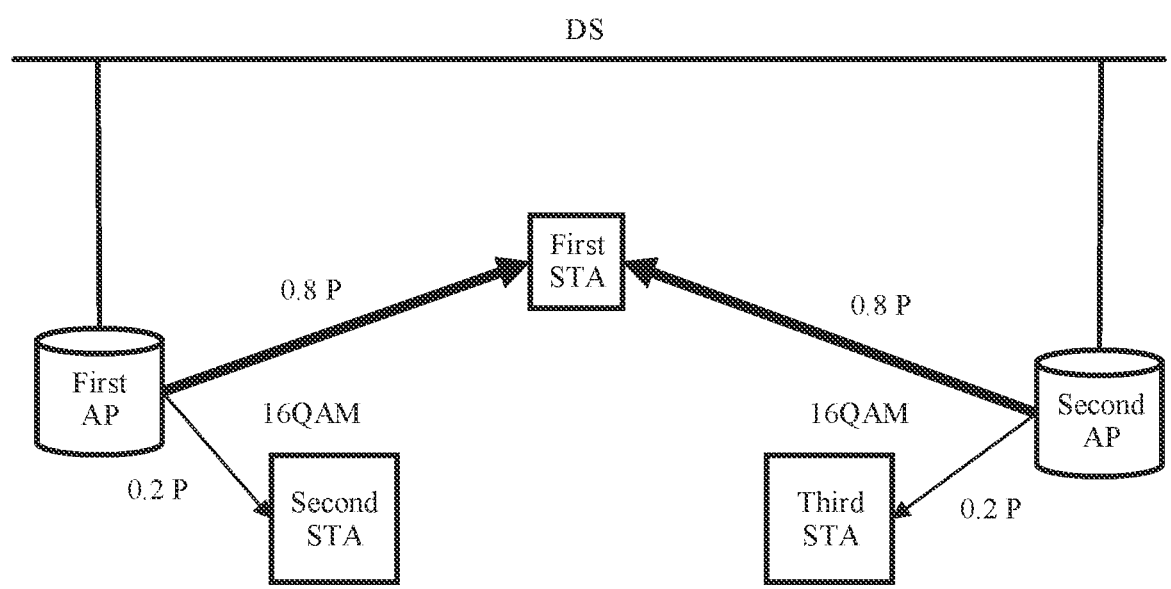
FIG. 10 is a schematic diagram of jointly sending data by a first AP and a second AP in scenario 1 according to Embodiment 1 of this application.
Figure 11:
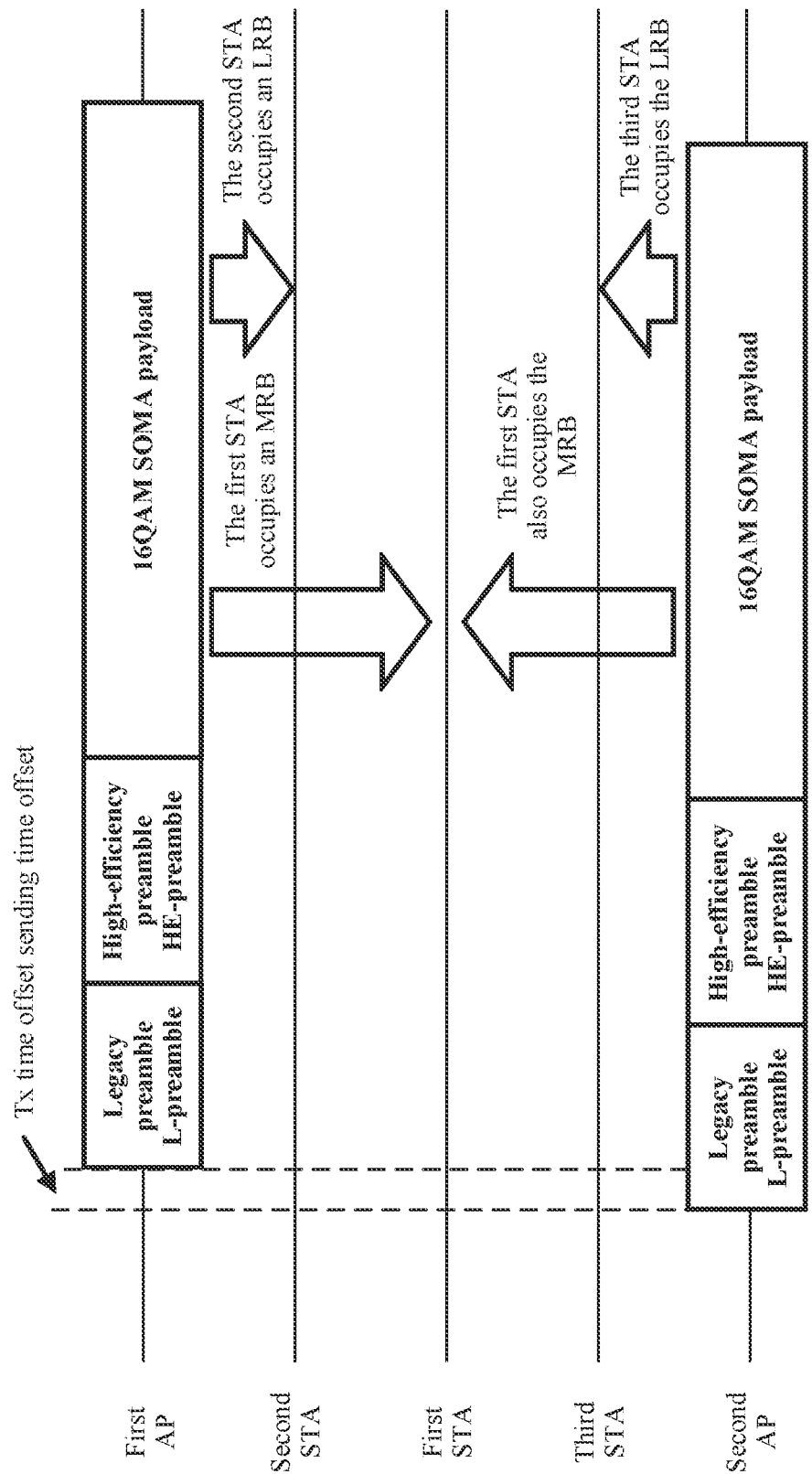
FIG. 11 is a schematic diagram of jointly sending a PPDU by a first AP and a second AP in scenario 1 according to Embodiment 1 of this application.

FIG. 10 and FIG. 11 are example schematic diagrams of jointly sending data by a first AP and a second AP in scenario 1. As shown in FIG. 10, as an example, the first AP uses 16 QAM for SOMA modulation and sends data to the first STA and the second STA in parallel, and the second AP uses the same symbol MCS for SOMA modulation and sends data to the first STA and the third STA in parallel. Because both the first AP and the second AP allocate an MRB to the first STA, it is equivalent to that the first AP uses 80% of the transmit power to send data to the first STA, and uses the remaining 20% of the transmit power to send data to the second STA; and the second AP uses 80% of the transmit power to send data to the first STA, and uses the remaining 20% of the transmit power to send data to the third STA. This can effectively increase the transmit power of the first data information, increase the signal-to-noise ratio of the signal that can be received by the first STA, and improve the signal reception quality of the first STA.

In scenario 1, the PPDUs sent by the first AP and the second AP may be shown in FIG. 11. In the embodiment of this application, the L-Preamble of the second PPDU is the same as the L-Preamble of the first PPDU, where the L-Preamble of the first PPDU may be independently generated by the first AP, and the L-Preamble of the second PPDU may be obtained by the second AP from the first indication information sent by the first AP. The HE-Preamble of the second PPDU is the same as the HE-Preamble of the first PPDU. The HE-Preamble is separately generated by the first AP and the second AP in the foregoing steps based on the SOMA signaling information of the receiving STAs of both parties. Details are not described herein again.

It can be learned that although the data payload parts of the first PPDU and the second PPDU are different, the MRBs of modulation symbols in the data payload part are the same, and each carry the first data information sent to the first STA. The difference lies only in the LRB. The LRB of the modulation symbol of the first PPDU carries the second data information sent to the second STA, and the LRB of the modulation symbol of the second PPDU carries the third data information sent to the third STA.

Figure 12:
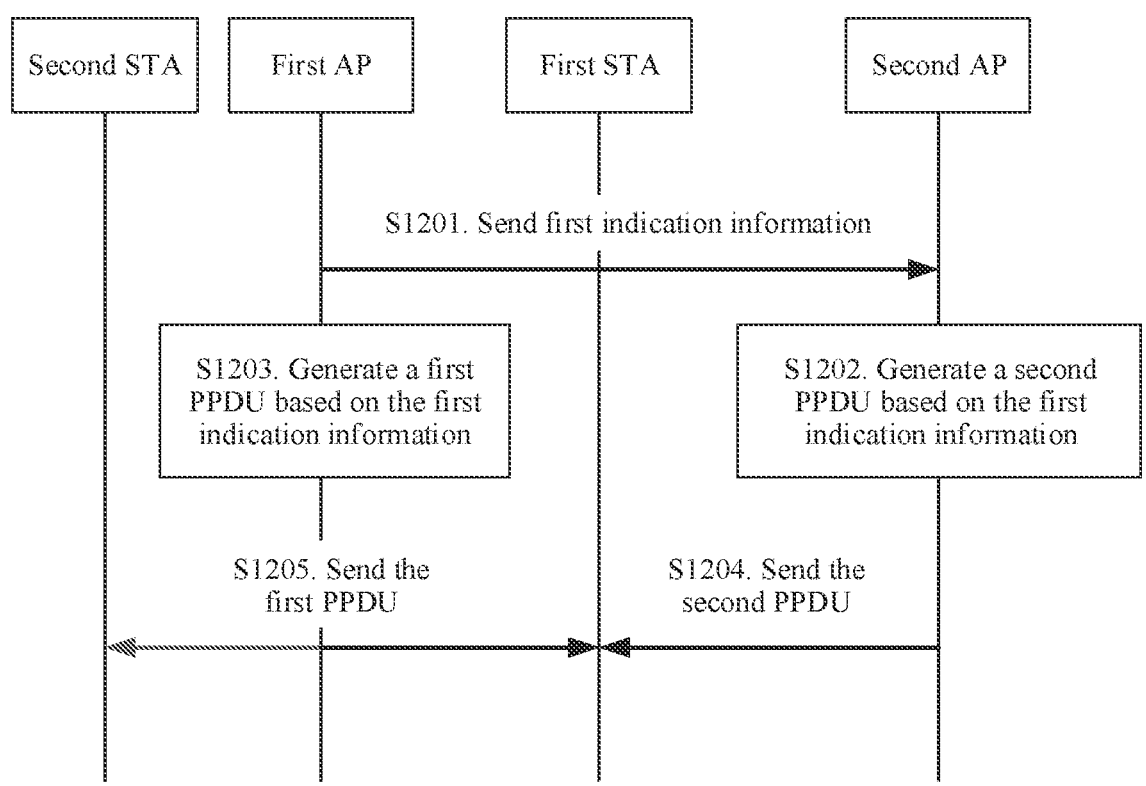
FIG. 12 is a schematic flowchart corresponding to a joint transmission method applicable to scenario 2 according to Embodiment 1 of this application.

It should be noted that in the embodiment of this application, the sending time of the first PPDU is the same as the sending time of the second PPDU, which does not mean the same in an absolute sense. There may be a slight difference between the two sending times. For example, the sending time of the second PPDU may be slightly earlier than the sending time of the first PPDU. As shown in FIG. 12, because the second AP is far away from the first STA, the second AP sends the second PPDU in advance by a tx time offset, where the tx time offset is a sending time offset.

Generally, each STA should be associated with the AP closest to the STA to ensure signal quality. Therefore, it can be considered that the first STA is closer to the first AP than to the second AP. When the second AP is farther away from the first STA, even if the second AP and the first AP send the same information at the same time, due to different distances, times for a wireless signal to reach the first STA are different, causing a multipath effect. The multipath effect may cause inter-symbol interference and reduce communication quality. To reduce the multi path effect, AP 2 should send the second PPDU appropriately in advance to ensure that the second PPDU and the first PPDU sent by the first AP are received by the first STA at the same time as far as possible, or to ensure that a difference between the times for the signals sent by the first AP and the second AP to reach the first STA is within a cyclic prefix (CP) length of one OFDM symbol, thereby eliminating the impact of the multipath effect.

It can be learned from the foregoing description that when the second AP does not interfere with the second STA for which the first AP performs parallel transmission, the second AP can send data to the third STA in parallel while sending data to the first STA, thereby improving the spectrum utilization efficiency, and further increasing the overall network throughput.

Further, although the second AP also sends data to the third STA associated with the second AP in parallel while sending data to the first STA, the first AP and the second AP can learn, through the information exchange in step S701 to step S703, the SOMA signaling information required by each receiving STA of the data packet of the other party to parse the corresponding data field, and jointly generate a preamble field based on the SOMA signaling information required by all the receiving STAs of the PPDUs of both parties to parse the corresponding data field. Therefore, although the data information carried in the data field parts of the first PPDU and the second PPDU is different, the first data packet and the second data packet still have the same preamble field, so that the first AP and the second AP can send the first PPDU and the second PPDU at the same time, thereby effectively avoiding the problem of co-channel interference that may be caused by inconsistent preamble fields of the PPDUs.

Scenario 2: The second AP sends data to the first STA only without performing parallel transmission.

FIG. 12 shows an example of a joint transmission method applicable to scenario 2 according to an embodiment of this application. As shown in FIG. 12, the method may include the following steps:

Step S1201: A first AP sends first indication information to a second AP, where the first indication information includes SOMA signaling information required by a first STA and a second STA to parse a first data field; the first data field carries first data information sent to the first STA, and second data information sent to the second STA.

Step S1202: The second AP receives the first indication information sent by the first AP, and generates a second PPDU based on the first indication information.

Step S1203: The first AP generates a first PPDU based on the first indication information.

Step S1204: The second AP sends the second PPDU to the first STA.

Step S1205: The first AP sends the first PPDU to the first STA and the second STA. Specifically, the specific implementation of step S1201 in scenario 2 is the same as the specific implementation of step S701 in scenario 1, and details are not described herein again in the embodiment of this application.

In step S1202, in the case in which the second AP interferes with the second STA, to reduce the complexity of the joint transmission, the second AP may send data to the first STA only without sending data to another STA in parallel. Because there is no third STA for which parallel transmission is performed, the second AP does not send the second indication information to the first AP. After receiving the first indication information, the second AP can directly generate the second PPDU based on the first indication information.

In the embodiment of this application, after receiving the first indication information, the second AP can determine, based on the SOMA signaling information that is required by the second STA to parse the first data field and that is included in the first indication information, that the first AP sends data to the second STA in parallel while sending data to the first STA, and then determine whether the second AP interferes with the second STA. Alternatively, before receiving the first indication information, the second AP can also learn through other means that the first AP further performs parallel transmission for the second STA in parallel while sending data to the first STA, and then determine whether the second AP interferes with the second STA. This is not specifically limited in this application.

Like scenario 1, in scenario 2, the first STA is a STA associated with the first AP, not a STA associated with the second AP. Therefore, before the second AP generates the second PPDU, the embodiment of this application may further include the step in which the second AP receives the first data information sent by the first AP.

In a possible design, the first AP can send the first data information to the second AP while sending the first indication information, thereby simplifying the interaction process between APs and improving the efficiency of joint transmission; alternatively, the first AP can separately send the first indication information and the first data information. This is not specifically limited in the embodiment of this application.

Similarly, the first indication information may also be an initial preamble field sent by the first AP. The initial preamble field includes two parts: the L-Preamble and the HE-Preamble, where the HE-Preamble part includes the SOMA signaling information required by the first STA and the second STA to parse the first data field. When the second AP generates the second PPDU, if the second AP determines not to send the second PPDU, the second AP can directly generate the second PPDU based on the first data information and the initial preamble field that serves as a second preamble field.

Correspondingly, in step S1203, the first AP can also generate a first PPDU based on the first indication information. The preamble field of the first PPDU is the same as the preamble field of the second PPDU, and certainly is also the same as the initial preamble field described above. However, the data field of the first PPDU is generated by the first AP by performing SOMA modulation on the first data information and the second data information, and the data field of the second PPDU is generated by the second AP by performing symbol modulation on the first data information only.

In the embodiment of this application, a possible design may be that after the first AP sends the first indication information, if the second AP determines to send data to the third STA in parallel, the second AP can send the second indication information to the first AP. Otherwise, if the second AP does not perform parallel transmission, nothing is sent. Therefore, the first AP can determine, based on whether the first AP receives the second indication information sent by the second AP before the sending time of the first PPDU arrives, whether the second AP sends data to another STA in parallel while sending data to the first STA. If the first AP has not received the second indication information before the sending time of the first PPDU arrives, it can be determined that the second AP does not send data to another STA in parallel.

Another possible design may be that after the first AP sends the first indication information to the second AP, if the second AP successfully receives the first indication information, the second AP may return an acknowledgment (ACK) to the first AP, so as to inform the first AP that the second AP has successfully received the first indication information. In other words, when the second AP chooses to send data to the third STA in parallel while sending data to the first STA, the second AP sends the second indication information together with the ACK to the first AP. On the contrary, when the second AP chooses not to send data to another STA associated with the second AP in parallel, the second AP may send only the ACK to the first AP. Therefore, in the embodiment of this application, if the second AP does not send data to another STA in parallel, the first AP can determine, when receiving the ACK sent by the second AP but failing to receive the second indication information sent together, that the second AP does not send data to another STA in parallel. This avoids the problem of waiting for arrival of the sending time of the first PPDU when the second AP does not perform parallel transmission, and then generating the first PPDU, and improves the efficiency of joint transmission.

In the embodiment of this application, the first AP may also use another method to learn, in advance before sending the first indication information to the second AP, whether the second AP sends data to another associated STA in parallel while sending data to the first STA. This is described in detail in Embodiment 2 of this application.

It should be noted that, in the embodiment of this application, the execution sequence of step S1202 and step S1203 is not specifically limited, that is, the first PPDU and the second PPDU may be generated at the same time or at different times, provided that the first PPDU and the second PPDU can be sent at the same time.

In the embodiment of this application, when generating corresponding PPDUs, the first AP and the second AP can integrate the SOMA signaling information required by the first STA to parse the first data field and the second data field, and the SOMA signaling information required by the second STA to parse the first data field into the HE-Preamble of the PPDU to form SOMA signaling.

In other words, in scenario 2, the SOMA signaling is used to carry the SOMA signaling information required by the first STA to parse the first data field and the second data field, and the SOMA signaling information required by the second STA to parse the first data field.

Similarly, the SOMA signaling may include a common information field and a user specific field. The common information field includes: a symbol MCS subfield and an SOMA indication subfield; the symbol MCS subfield is used to indicate a symbol MCS used by the first data field and/or the second data field; the SOMA indication subfield is used to indicate whether the first data field and the second data field use SOMA modulation.

The user specific field includes a user specific subfield corresponding to the first STA and a user specific subfield corresponding to the second STA; any user specific subfield includes a station identifier subfield, a bit MCS subfield, and a bit assignment subfield.

Specifically, in the user specific subfield corresponding to the first STA, the station identifier subfield is used to indicate an identifier of the first STA, the bit MCS is used to indicate a bit MCS of the bit carrying the first data information, and the bit assignment subfield is used to indicate reliability of the bit carrying the first data information; and in the user specific subfield corresponding to the second STA, the station identifier subfield is used to indicate an identifier of the second STA, the bit MCS is used to indicate a bit MCS of the bit carrying the second data information, and the bit assignment subfield is used to indicate reliability of the bit carrying the second data information.

Figure 13A:
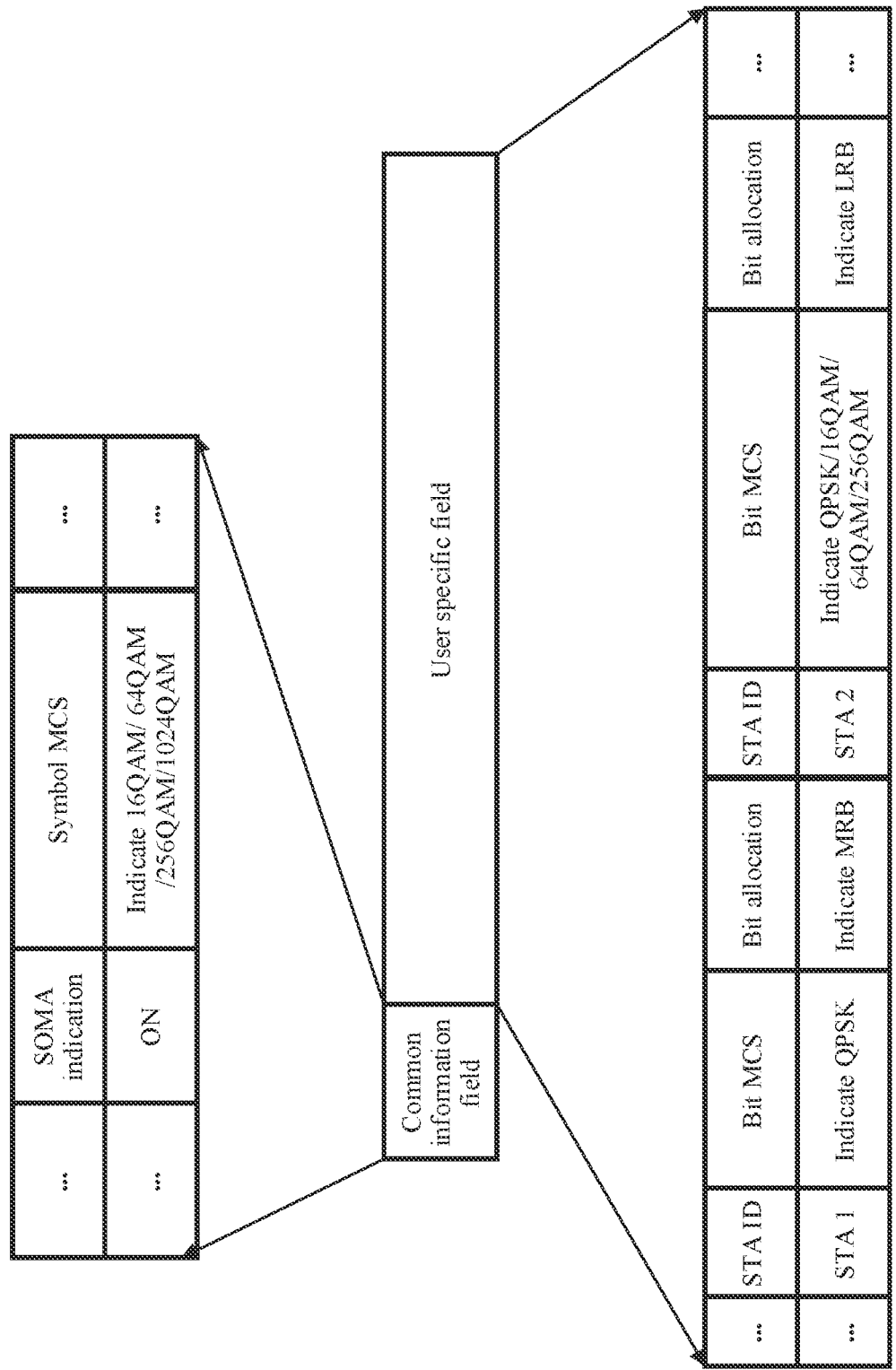
FIG. 13a and FIG. 13b show formats of SOMA signaling applicable to scenario 2 according to Embodiment 1 of this application.

FIG. 13a shows an example format of SOMA signaling applicable to scenario 2. As shown in FIG. 13a, the common field of the SOMA signaling is similar to that in scenario 1. Because the first AP sends data to the first STA and the second STA in parallel, and the second AP sends data to the first STA only, the user specific field includes only SOMA signaling information of the first STA and the second STA. The SOMA signaling information of the first STA can be used to parse both the first data field and the second data field.

Figure 13B:
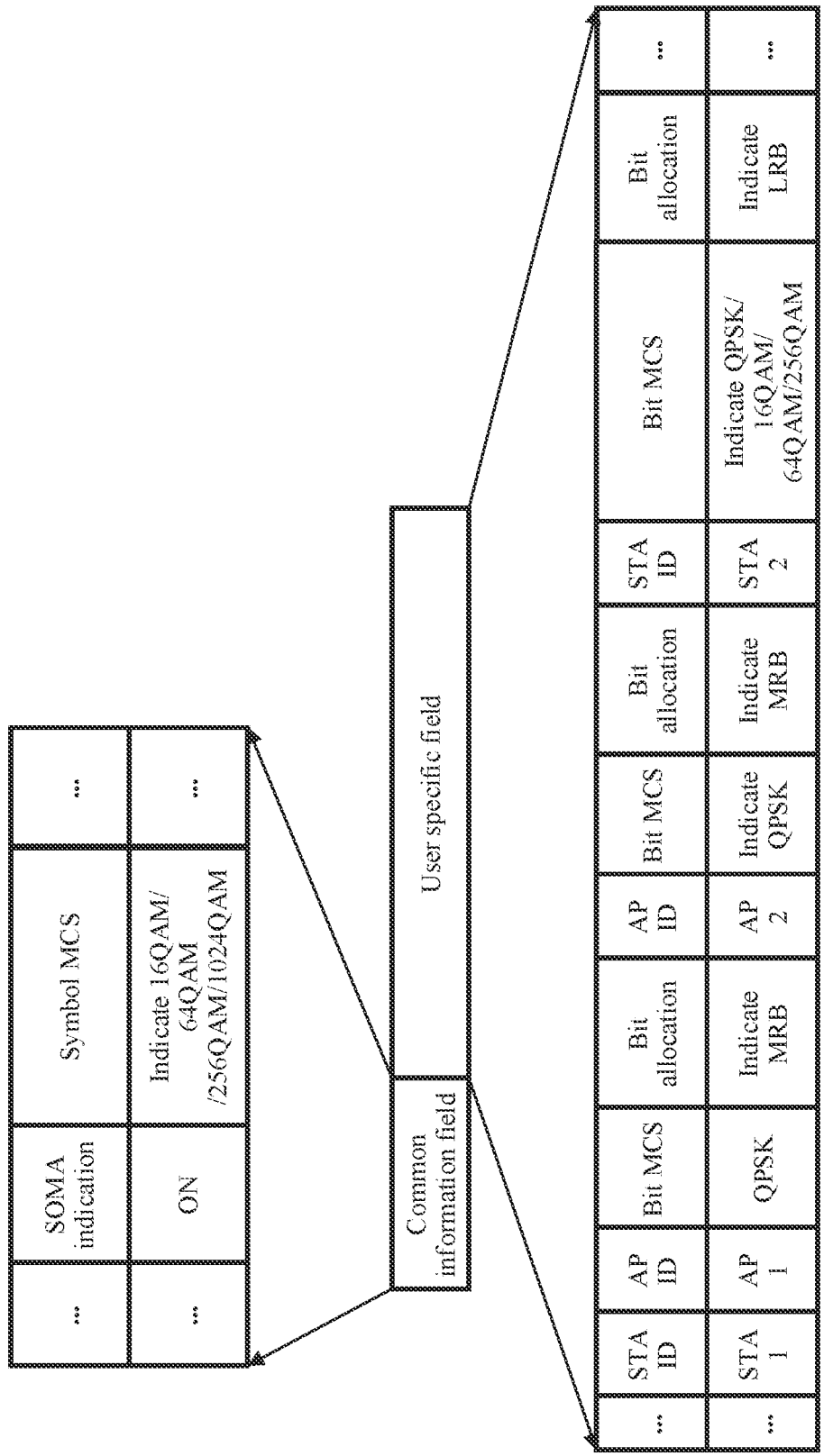

Similarly, in another possible design, as shown in FIG. 13b, the first STA may also include two items of SOMA signaling information. One item corresponds to the first AP and is used to parse the first data field. The other item corresponds to the second AP and is used to parse the second data field. The two items of SOMA signaling information are the same. Details are not described again in the embodiment of this application.

Considering that the signal-to-noise ratio or channel quality of the first STA is low, when performing SOMA modulation, the first AP may allocate an MRB to the first STA and allocate an LRB to the second STA. In addition, regardless of which symbol MCS is used by the first AP to perform SOMA modulation, the bit MCS of the first STA may always be QPSK. However, the bit MCS of the second STA may be jointly determined based on the symbol MCS used by the first AP and the bit MCS of the first STA. Because the second AP does not send data to its associated STA in parallel, the second AP does not need to perform SOMA modulation, and can only perform QPSK modulation on the first data information based on the bit MCS of the first STA.

Figure 14:
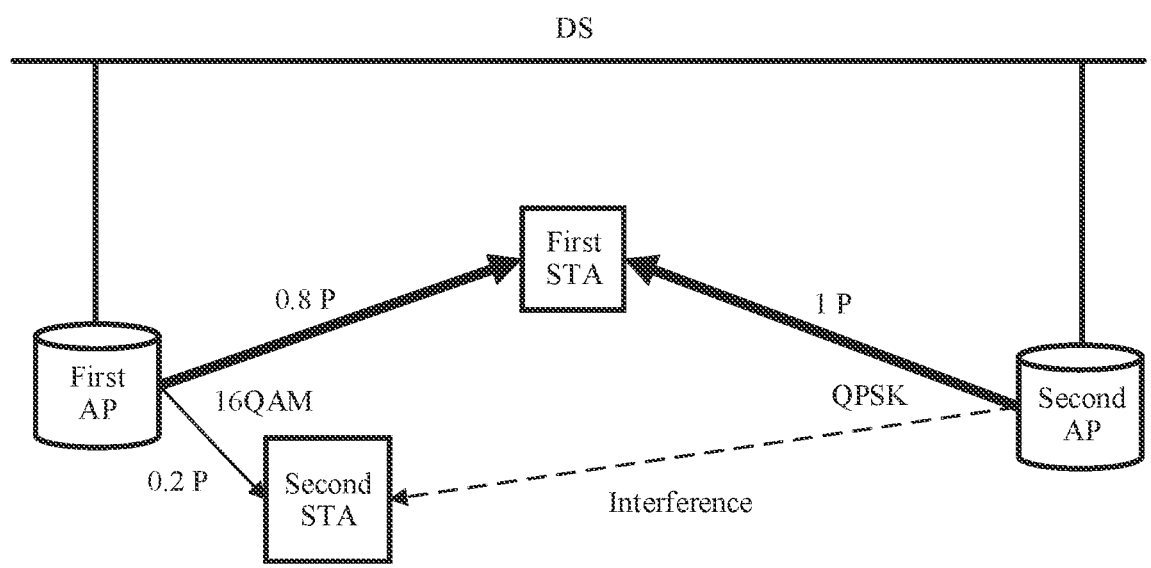
FIG. 14 is a schematic diagram of jointly sending data by a first AP and a second AP in scenario 2 according to Embodiment 1 of this application.
Figure 15:
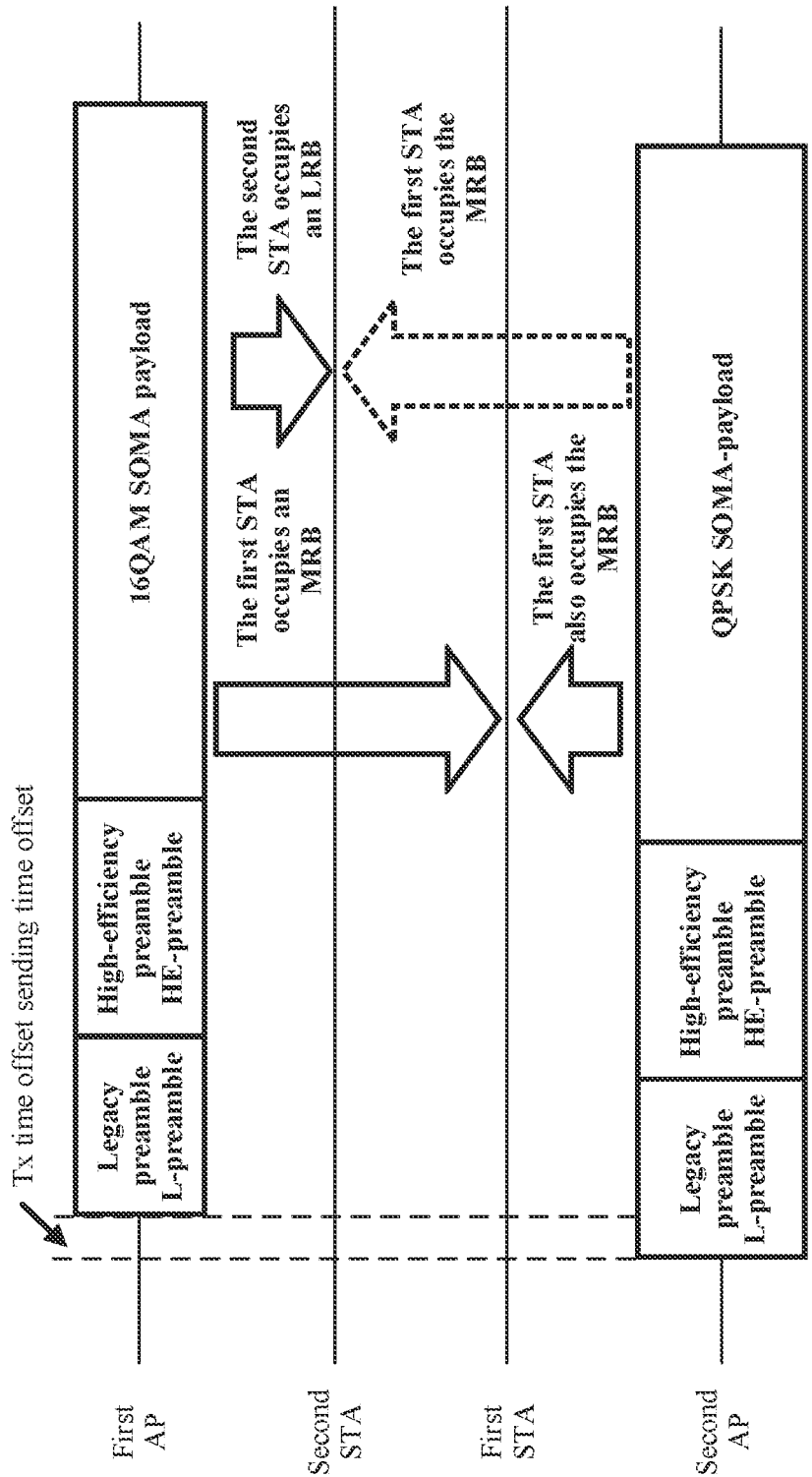
FIG. 15 is a schematic diagram of jointly sending a PPDU by a first AP and a second AP in scenario 2 according to Embodiment 1 of this application.

FIG. 14 and FIG. 15 are example schematic diagrams of jointly sending data by a first AP and a second AP in scenario 2. As shown in FIG. 14 and FIG. 15, as an example, the first AP uses 16 QAM for SOMA modulation, and allocates an MRB to the first STA, and allocates an LRB to the second STA. The second AP no longer sends data to the associated STA in parallel, but can use all the transmit power to assist the first STA in data transmission.

In scenario 2, the PPDUs sent by the first AP and the second AP may be shown in FIG. 15. In the embodiment of this application, the L-Preamble and the HE-Preamble of the second PPDU are the same as the L-Preamble and the HE-Preamble of the first PPDU. This part of the L-Preamble and the HE-Preamble can be obtained by the second AP from the first indication information sent by the first AP.

In this scenario, the second AP no longer performs SOMA modulation and does not need to send 16 QAM modulation symbols. Instead, the second AP can only perform QPSK modulation, and each modulation symbol sent to the first STA includes only two bits of QPSK symbols. However, because the data carried in the second PPDU and the data carried in the MRB of the first PPDU still use the same bit MCS, after receiving the second PPDU, the first STA can still obtain, through correct parsing based on the SOMA signaling information in the HE-Preamble, the first data information sent by the second AP.

In addition, in this scenario, because the second AP is far away from the first STA, the second AP can also send the second data packet in advance by a tx time offset.

When the second AP interferes with the second STA, if the second AP still uses the parallel transmission mode in scenario 1, although the data payload part of the second PPDU does not include the data information sent to the second STA, this data payload part can still be received by the second STA and interfere with the second STA. Consequently, the second STA cannot obtain, through correct parsing, the data information sent to the second STA. Therefore, in the embodiment of this application, the second AP can apply the beamforming (BF) technology to send a directional signal to the first STA. In this way, the interference to the second STA during joint transmission can be effectively reduced. Ideally, the second STA is completely not affected by the second AP.

Figure 16:
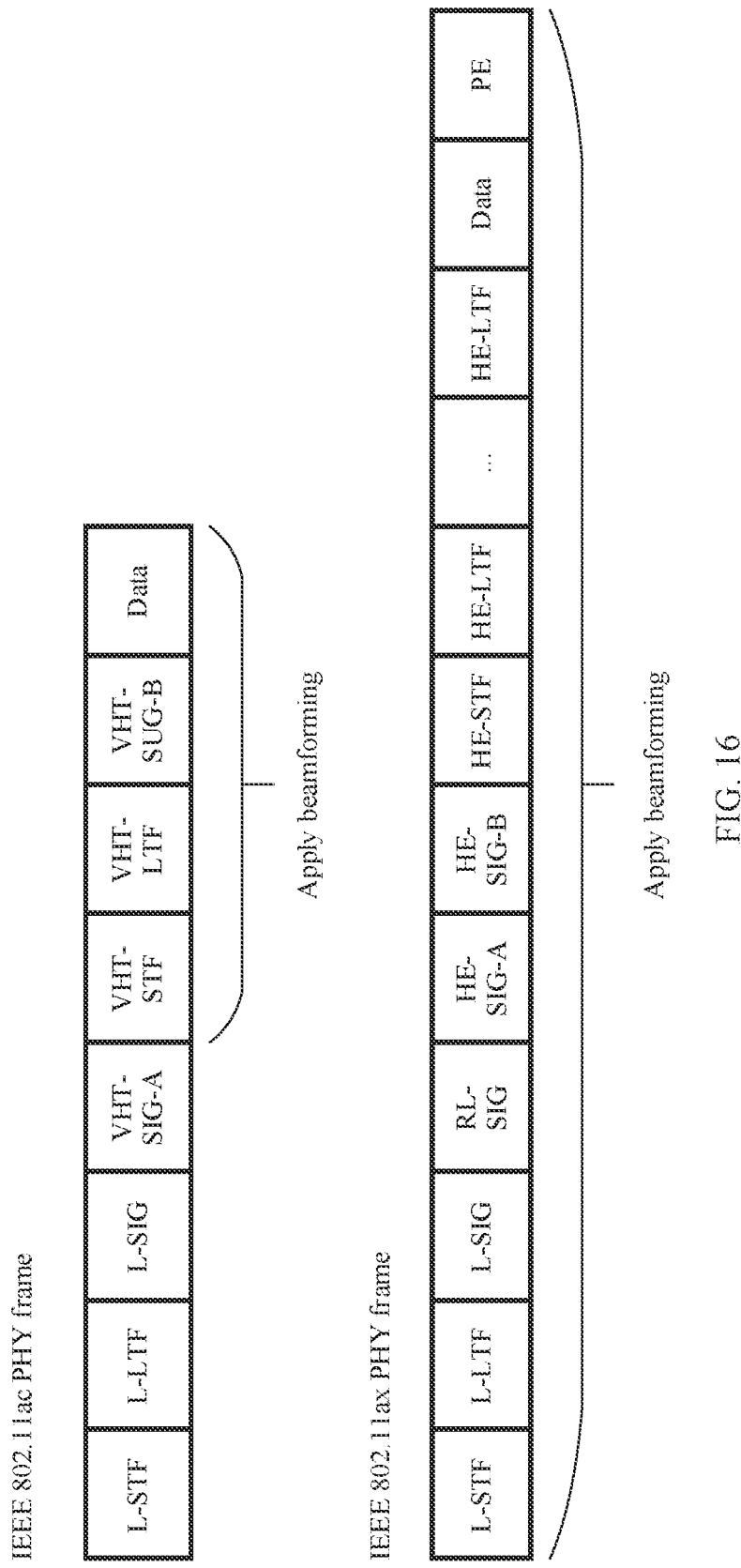
FIG. 16 is a schematic diagram of a field applying beamforming in a PPDU fora second AP in scenario 2 according to Embodiment 1 of this application.

As shown in FIG. 16, the second AP can send the non-conventional modulation part of the second PPDU in the BF mode. For example, when the PPDU is a physical frame defined based on the IEEE 802.11ac protocol, the fields applying BF may include a very high throughput short training field (VHT-STF), a very high throughput short training field (VHT-LTF), very high throughput signaling B (VHT-SIG-B), data payload, and other fields.

When the PPDU is a physical frame defined based on the IEEE 802.11ax protocol, the fields applying BF may include a legacy short training field (L-STF), a legacy long training field (L-LTF), legacy signaling (legacy signaling, L-SIG), repeated legacy signaling (RL-SIG), high efficiency signaling A (HE-SIG-A), high-efficiency signaling B (HE-SIG-B), a high-efficiency short training field (HE-STF), a high-efficiency long training field (HE-LTF), and a data payload part.

Embodiment 2

In the embodiment of this application, the second AP is any AP that can assist the first AP in sending data to the first STA. Based on the foregoing description of Embodiment 1, it can be learned that, in Embodiment 1, the first AP has determined the identity of the second AP providing transmission assistance, and can directly exchange SOMA signaling information with the second AP, so as to obtain a consistent preamble field when generating the PPDU. In an actual application scenario, when the first AP determines that it needs assistance in sending data to the first STA, the first AP may not directly send the first indication information. Instead, the first AP may negotiate with the second AP to determine the joint transmission mode before sending the first indication information, so as to exchange SOMA signaling information of both parties.

Therefore, the embodiment of this application further provides another joint transmission method based on Embodiment 1. Referring to FIG. 16, the joint transmission method may include the following steps.

Step S1701: The first AP sends a joint transmission request, where the joint transmission request includes the identifier of the first STA, the identifier of the second STA, and third indication information the third indication information is used to indicate that the first STA needs to be assisted.

Step S1702: The second AP sends a joint transmission response to the first AP based on the identifier of the first STA and the identifier of the second STA.

Step S1703: The first AP receives the joint transmission response sent by the second AP, and sends the first indication information, the first data information, and a joint sending time to the second AP.

Figure 17:
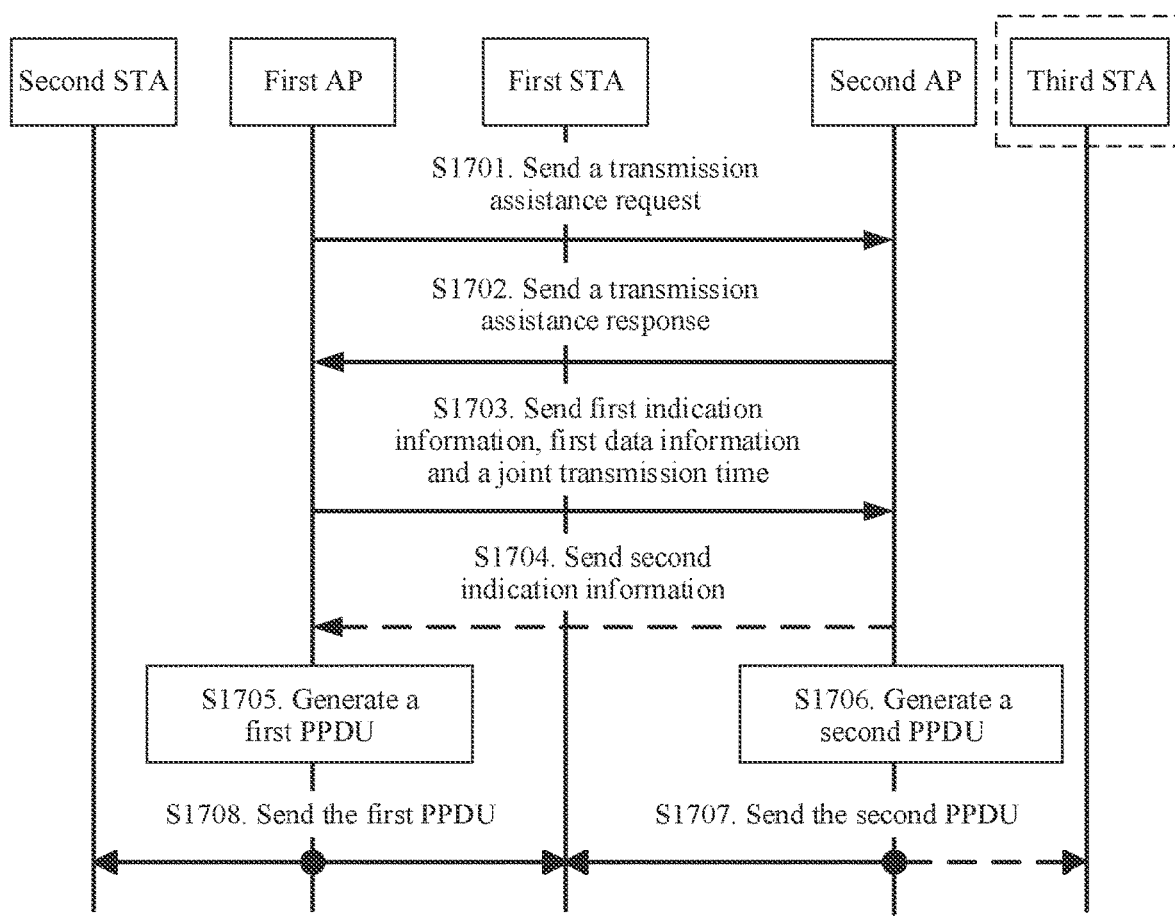
FIG. 17 is a schematic flowchart corresponding to a joint transmission method according to Embodiment 2 of this application.

It should be noted that, as shown in FIG. 17, after step S1703, the content and specific implementations of the remaining steps may be consistent with the descriptions of scenario 1 or scenario 2 in Embodiment 1. Details are not described again in the embodiment of this application.

Specifically, in step S1701, the first AP may send a transmission assistance request to the second AP through the DS when the signal-to-noise ratio (or channel quality) of the first STA is lower than a specific specified threshold. The transmission assistance request includes the identifier of the first STA, the identifier of the second STA, and the third indication information used to indicate that the first STA needs to be assisted, so as to indicate to the second AP that the first AP is going to send data to the first STA and the second STA in parallel, but the first STA needs to be assisted.

In the embodiment of this application, the transmission assistance request may further include fourth indication information to indicate an air interface transmission coverage area of the first AP, so that the second AP can determine, based on the air interface transmission coverage area of the first AP, the third STA for which parallel transmission is performed with the first STA.

In a possible design, the air interface transmission coverage area of any AP can be expressed in the form of a STA list. Specifically, in the early communication, each AP can record the STA identifiers in another basic service set (BSS) perceived by the air interface to form a list of impacted STAs, that is, the list of impacted STAs in other BSS, which is used to indicate which STAs that are not included in this BSS are interfered by this AP. In other words, the list of impacted STAs records STAs that are not included in this BSS, and the AP has historically received uplink data sent by these STAs. Although there are differences in uplink and downlink signals, the AP still considers that the downlink data sent by the AP may cause interference to these STAs.

In step S1702, after receiving the joint transmission request, the second AP can determine, based on the identifier of the first STA, the identifier of the second STA, and its own air interface transmission coverage area, whether it can provide transmission assistance. If the second AP can provide transmission assistance, the second AP sends a transmission assistance response to the first AP.

Specifically, if the second AP determines that the first STA is located within the air interface transmission coverage area of the second AP, the second AP can determine that it can provide transmission assistance. As described above, in the embodiment of this application, the air interface transmission coverage area of the second AP can also be indicated by the list of impacted STAs corresponding to the second AP. In this case, if the first STA is located within the air interface transmission coverage area of the second AP, it means that the identifier of the first STA is located in the list of impacted STAs corresponding to the second AP.

In a possible design, the transmission assistance response may include only one ACK to indicate that the second AP can provide assistance.

In another possible design, the transmission assistance response may further include a transmission assistance mode used by the second AP. The transmission assistance mode may include whether the second AP sends data to another associated STA in parallel while sending data to the first STA, and if the second AP sends data to another STA in parallel, which STA is the specific STA for which parallel transmission is performed, and similar content.

In the embodiment of this application, the transmission assistance mode is determined by the second AP based on the interference caused by the second AP to the second STA. If the second STA is located in the air interface transmission coverage area of the second AP, it means that if the second AP sends a second PPDU to the first AP, the second PPM can also be received by the second STA. This causes the sending of the second PPDU to interfere with the receiving of the first PPM by the second STA. Therefore, when the second AP interferes with the second STA, to avoid excessive complexity of the joint transmission, the second AP can choose not to send data to its associated STA in parallel, and use all the transmit power to assist the first STA in data transmission.

If the second STA is located outside the air interface transmission coverage area of the second AP the second AP does not interfere with the second STA, and the second AP can send data to its associated STA in parallel while sending data to the first STA. Furthermore, the second AP can determine the third STA for parallel transmission based on the STA associated with the second AP and the air interface transmission coverage area of the first AP. Similarly, the third STA is a STA that is located outside the air interface transmission coverage area of the first AP, that is, not interfered by the first AP.

It can be learned that, on the one hand, by adding the identifier of the second STA to the transmission assistance request, the second AP can determine, when determining that it does not interfere with the second STA, the third STA for parallel transmission and arrange third data information to be sent to the third STA. There is no need to wait until the first indication information sent by the first AP is received, and then determine whether to send data to the third STA in parallel, and which STA is the third STA.

On the other hand, the first AP can learn the joint transmission mode used by the second AP based on the transmission assistance response sent by the second AP. If the second AP sends data to the first STA only and does not perform parallel transmission, after sending the first indication information, the first AP can learn that the second AP does not perform parallel transmission without a need to wait until the sending time of the first PPDU arrives without receiving the second indication information. Instead, the first AP can directly generate the first PPDU based on the first indication information, thereby effectively improving the efficiency of joint transmission.

In step S1703, after receiving the joint transmission response sent by the second AP, the first AP can send the first indication information, the first data information, and a joint sending time to the second AP.

In the embodiment of this application, the first AP simultaneously sends the first indication information, the first data information, and the joint sending time to the second AP, thereby effectively simplifying the negotiation process between APs and improving the efficiency of joint transmission. Specific implementations of the first indication information, the first data information, and the joint sending time are the same as those in Embodiment 1. Details are not described herein again.

It should be noted that in the embodiment of this application, the first AP may learn in advance the identity of the second AP providing transmission assistance before sending the joint transmission request. For example, the second AP may be an AP that provides transmission assistance for the first AP by default, or an AP that has a bound one-way or two-way transmission assistance relationship with the first AP.

In another possible design, when the first AP determines that assistance is needed to send data to the first STA, the first AP may not know which AP is the second AP. Therefore, the first AP can broadcast the transmission assistance request, and then determine the second AP that provides transmission assistance from the surrounding available APs.

Based on this, the above step S1701 may also be that the first AP broadcasts the transmission assistance request to surrounding APs through the DS. In step S1702, a plurality of APs, including the second AP, can receive the transmission assistance request. In addition, any AP that receives the transmission assistance request can determine whether the AP can provide transmission assistance and how to provide transmission assistance according to the method described in step S1702, and when the AP can provide transmission assistance, send a joint transmission response to the first AP.

Furthermore, in step S1703, the first AP may receive transmission assistance responses sent by a plurality of APs. If the first AP determines that the second AP provides transmission assistance, the first AP may send the first indication information, the first data information, and a joint sending time to the second AP.

In a possible design, the transmission assistance response sent by each AP may further include a quality of a communication link between the AP and the first STA, such as a received signal strength indicator (RSSI). The first AP may use the AP with the best communication link quality (such as the AP with the largest RSSI) among the APs that send the transmission assistance response as the second AP that provides assistance.

Embodiment 3

In Embodiment 1 and Embodiment 2 described above, at least one of the first AP and the second AP uses SOMA modulation to send data to two STAs in parallel. For example, the first AP sends data to the first STA and the second STA in parallel. In an actual application scenario, the data length of the first data information of the first STA and the data length of the second data information of the second STA may be unequal. In this case, when SOMA modulation is performed on the first data information and the second data information, it is necessary to use padding (padding) to match the inconsistency between the two data lengths.

Figure 18:
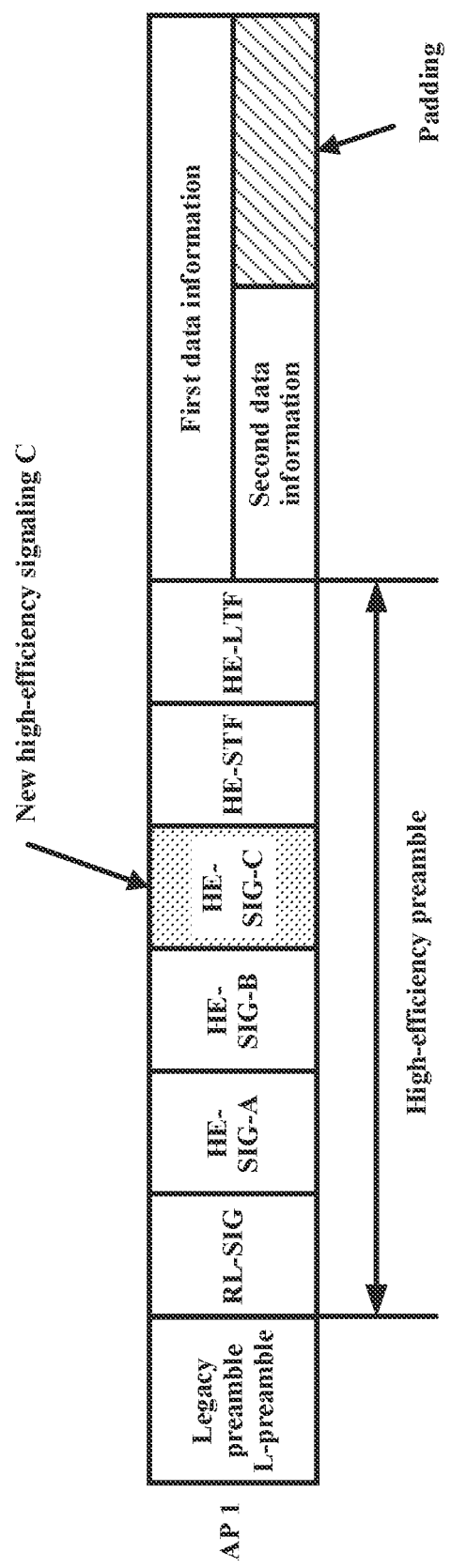
FIG. 18 is a schematic diagram of padding in a first PPDU according to Embodiment 1 and Embodiment 2 of this application.

FIG. 18 shows an example of padding in the first PPDU provided in Embodiment 1 and Embodiment 2. As shown in FIG. 18, if the data length of the first data information is greater than the data length of the second data information, the insufficient part of the second data information needs to be padded. The length of this padding mainly depends on the difference between the data lengths of the first data information and the second data information.

Based on this, to effectively reduce the padding redundancy in the data field, according to the joint transmission method provided in the embodiment of this application, segmentation processing can be further performed on the data field when the first PPDU and/or the second PPDU are/is generated.

Specifically, in Embodiment 3 of this application, the first data field may include at least one data segment, and any data segment can be used to carry the first data information and/or the second data information. Similarly, the second data field may also include at least one data segment. If the second AP sends data to the third STA in parallel when sending data to the first STA, each data segment can be used to carry the first data information and/or the third data information; otherwise, if the second AP does not perform parallel transmission, each data segment can be used only to carry the first data information.

It should be noted that the symbol MCSs used in any two data segments included in the first data field may be the same or different, which is not specifically limited in the embodiment of this application. For example, the first data segment in the first data field may use 16 QAM for SOMA modulation, and the second data segment may use 64 QAM for SOMA modulation, thereby effectively increasing the flexibility of joint transmission.

In addition, in the embodiment of this application, the quantities of data segments of the first data field and the second data field are the same, and any data field of the first data field matches the corresponding data segment of the second data field, that is, the length information and symbol MCSs of the $N^{th}$ data segment of the first data field and the $N^{th}$ data segment of the second data field are the same, where N is greater than or equal to 1.

Therefore, to ensure that each STA can obtain, through correct parsing, the data information sent by the AP to the STA, the first preamble field may include the SOMA signaling information required by the first STA and the second STA to parse each data segment in the first data field, and length information and a symbol MCS of each data segment in the first data field. Considering that the first preamble field and the second preamble field are the same, when the second AP sends data to the third STA in parallel while sending data to the first STA, the first preamble field may further include SOMA signaling information required by the third STA to parse each data segment in the second data field.

Similarly, the second preamble field may include SOMA signaling information required by the first STA to parse each data segment in the second data field, SOMA signaling information required by the second STA to parse each data segment in the first data field, and length information and a symbol MCS of each data segment in the second data field. When the second AP sends data to the third STA in parallel while sending data to the first STA, the second preamble field may further include SOMA signaling information required by the third STA to parse each data segment in the second data field.

In the embodiment of this application, the length information of each data segment in the first data field and the second data field may be the SOMA segment length in units of orthogonal frequency division multiplexing (OFDM) symbols, that is, length in OFDM symbol, or a data length measured in another manner. This is not specifically limited in this application.

It should be noted that the lengths of the data information of the two STAs for which parallel transmission is performed in the embodiment of this application may be inconsistent. The first data information and the second data information carried in the first data field are used as an example. If the length of the first data information is greater than the length of the second data information, there may be a specific data segment in the first data field that carries only the first data information, but does not carry the second data information. Assuming that the data segment is the $N^{th}$ data segment in the first data field, the first preamble field may include the SOMA signaling information required by the first STA to parse the $N^{th}$ data segment in the first data field. Because the $N^{th}$ data segment does not carry the second data information, the first preamble field may not include the SOMA signaling information required by the second STA to parse the $N^{th}$ data segment. Correspondingly, the second preamble field may include SOMA signaling information required by the first STA to parse the $N^{th}$ data segment in the second data field, and SOMA signaling information required by the third STA to parse the $N^{th}$ data segment in the second data field, but does not include SOMA signaling information required by the second STA to parse the $N^{th}$ data segment in the first data field.

For example, if the first data segment includes three data segments, the first data segment and the second data segment each carries the first data information and the second data information, but because the length of the second data segment is less than the length of the first data information, there is partial padding in the second data segment, and the third data segment carries only the first data information. Correspondingly, the second data field also includes three data segments. These three data segments each can carry the first data information and the third data information, but because the length of the third data information is less than the length of the first data information, there may be partial padding in the third data segment.

Therefore, the first preamble field may include SOMA signaling information required by the first STA to parse the three data segments of the first data field, SOMA signaling information required by the second STA to parse the first data segment, and the second data segment in the first data field, and the SOMA signaling information required by the third STA to parse the three data segments in the second data field. The second preamble field is the same as the first preamble field.

In the embodiment of this application, the first AP and the second AP can integrate the SOMA signaling information required by the first STA and the second STA to parse each data segment of the first data field, and the SOMA signaling information required by the third STA to parse each data segment of the second data field into SOMA signaling, and add the SOMA signaling to the first preamble field and the second preamble field. The SOMA signaling may be located in the newly defined signaling field C in the HE-Preamble of the PPDU. The signaling field C may be referred to as the HE-SIG-C field, or may be referred to as a next-generation information field, new signaling field, or another name, which is not specifically limited in the embodiment of this application.

Specifically, if the data field of the first PPDU includes N data segments, the signaling field C may include N SOMA signaling (that is, SOMA-SIG). Optionally, the signaling field C may further include a quantity indicator for SOMA signaling to indicate a quantity of SOMA signaling.

Each SOMA-SIG is used to indicate a corresponding data segment (SOMA segment), and the signaling content of each SOMA-SIG includes two parts of information, one part is referred to as the common field, and the other part is referred to as the user specific field. The common information included in the common field mainly includes information such as the symbol MCS of the data segment, the length information of the data segment, cyclic check bits, and tail bits. The specific information of each STA included in the user specific field is mainly SOMA segment resource allocation indication information such as a station identifier (ID), a bit MCS, bit assignment, a cyclic check bit, and a tail bit of the STA.

Figure 19:
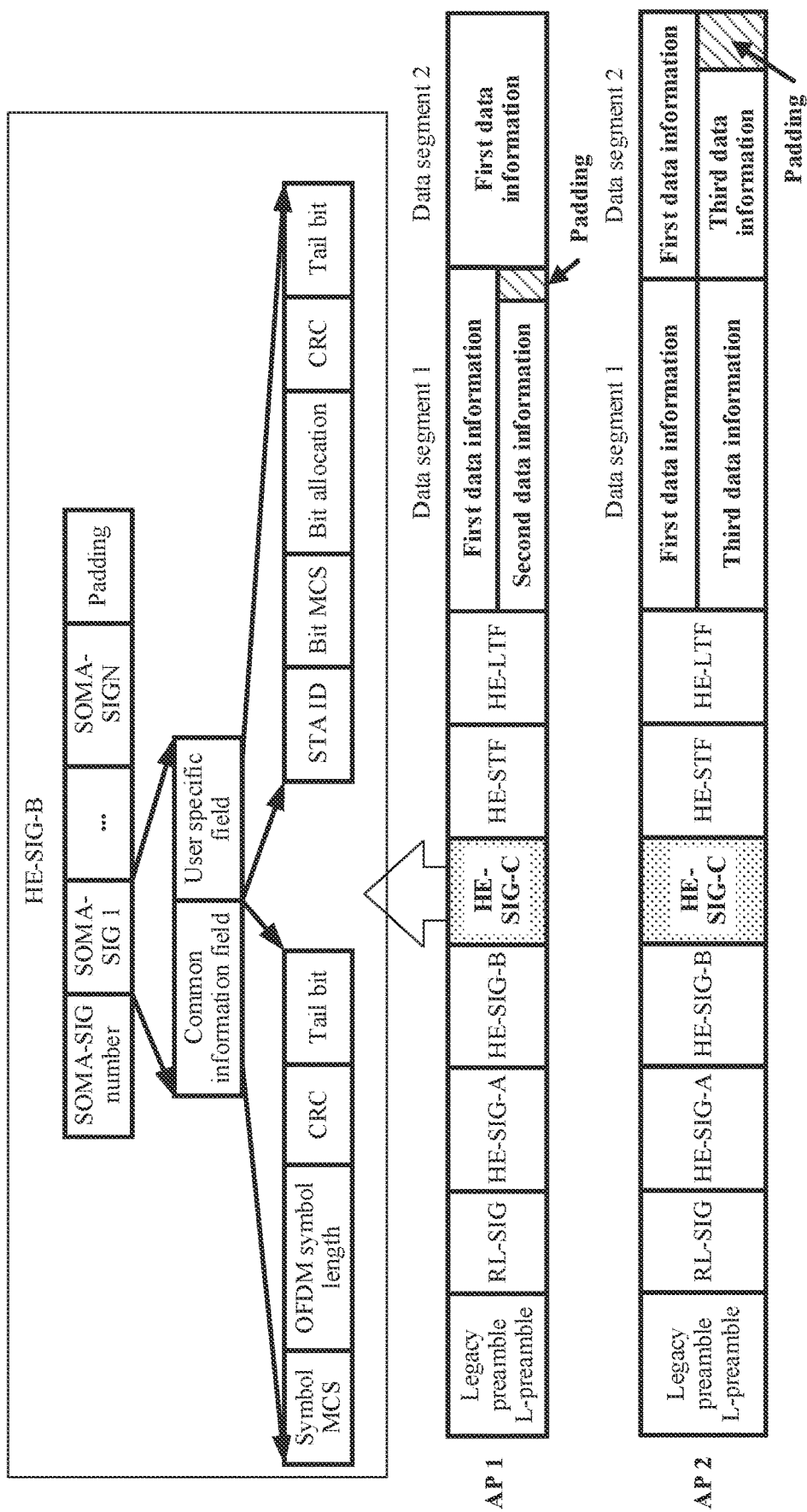
FIG. 19 shows at least one data segment in a first PPDU and a second PPDU in scenario 1 according to Embodiment 3 of this application.
Figure 20:
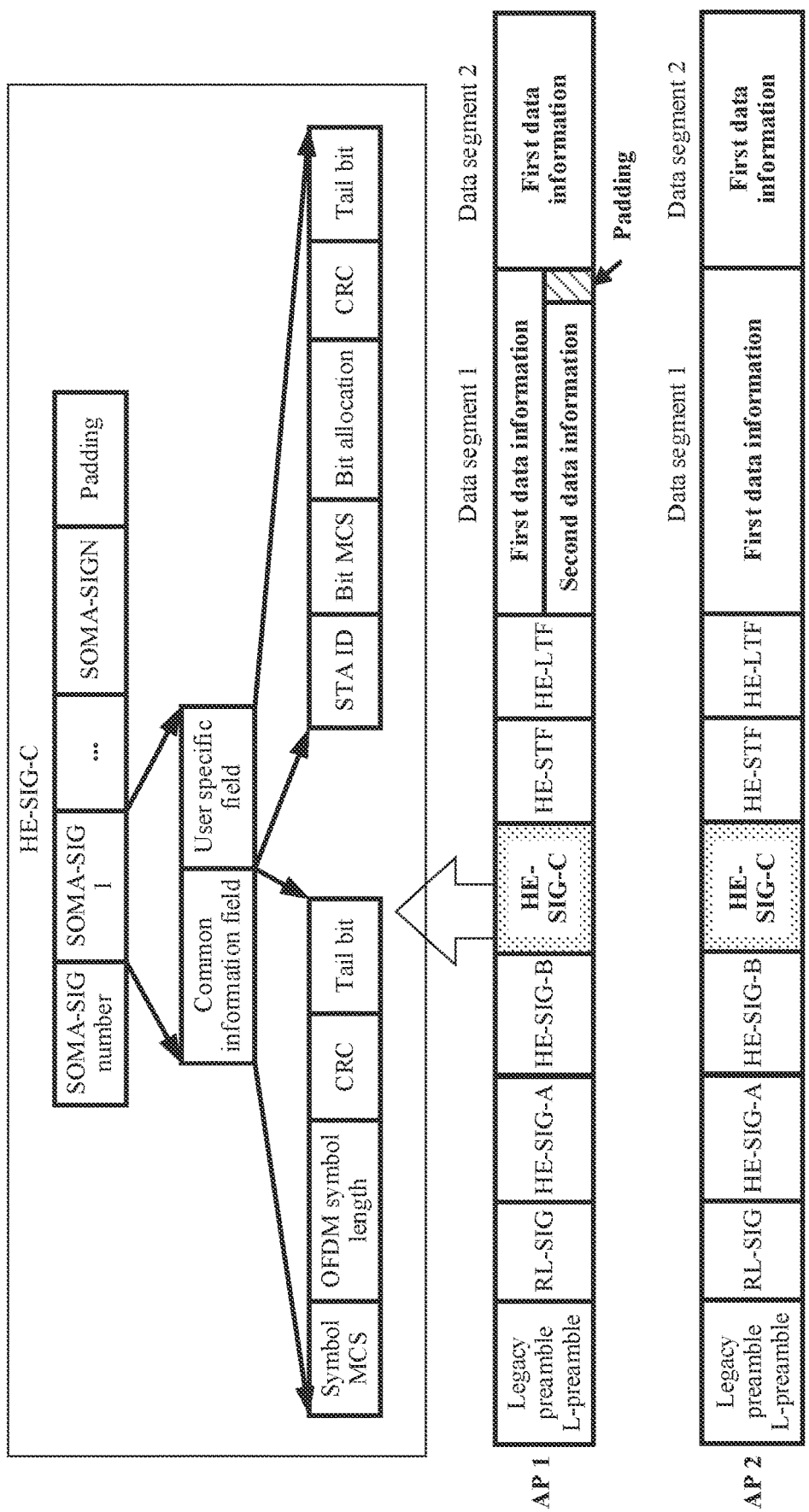
FIG. 20 shows at least one data segment in a first PPDU and a second PPDU in scenario 2 according to Embodiment 3 of this application.

The first PPDU is used as an example. FIG. 19 and FIG. 20 shows an example of SOMA signaling provided in Embodiment 3 of this application. As an example, only two data segments are shown in FIG. 19 and FIG. 20, but it should be understood that the embodiment of this application does not specifically impose a limitation on a quantity of data segments in the data field of the PPDU.

As shown in FIG. 19, in a possible design, the signaling field C may include the SOMA signaling corresponding to each data segment, so as to separately indicate the SOMA signaling information required by the first STA and the second STA to parse each data segment.

The case shows in FIG. 19 is used as an example. The first PPDU carries the first data information of the first STA and the second data information of the second STA. The second PPDU carries the first data information of the first STA and the third data information of the third STA. The first PPDU and the second PPDU each include two data segments. Therefore, the signaling field C of the preamble field of the first PPDU and the second PPDU may include two pieces of SOMA signaling, where the first piece of SOMA signaling includes signaling information for parsing data segment 1, and the second piece of SOMA signaling includes signaling information for parsing data segment 2.

Specifically, the first SOMA signaling includes three user specific fields. The user specific field 1 may include the identifier of the first STA, the bit MCS of the first STA, and the bit position (bit reliability level) occupied by the first STA in data segment 1 of the first PPDU. The bit reliability level occupied by the first STA in data segment 1 of the first PPDU is the same as the bit reliability level occupied by the first STA in data segment 1 of the second PPDU. The user specific field 2 may include the identifier of the second STA, the bit MCS of the second STA, and the bit position (bit reliability level) occupied by the second STA in data segment 1 of the first PPDU. The user specific field 3 may include the identifier of the third STA, the bit MCS of the third STA, and the bit position (bit reliability level) occupied by the third STA in data segment 1 of the second PPDU. The second SOMA signaling includes two user specific fields. The user specific field 1 includes the identifier of the first STA, the bit MCS of the first STA, and the bit position (bit reliability level) occupied by the first STA in data segment 2 of the first PPDU and the second PPDU. The user specific field 2 includes the identifier of the third STA, the bit MCS of the third STA, and the bit position (bit reliability level) occupied by the third STA in data segment 2 of the second PPDU.

The case shown in FIG. 20 is used as an example. The first PPDU carries the first data information of the first STA and the second data information of the second STA. The second PPDU carries only the first data information of the first STA and does not carry the third data information of the third STA. The first PPDU and the second PPDU each include two data segments. Therefore, the signaling field C in the preamble field of the first PPDU and the second PPDU may include two SOMA signaling fields. The first piece of SOMA signaling includes signaling information for parsing data segment 1, and the second piece of SOMA signaling includes signaling information for parsing data segment 2.

Specifically, the first SOMA signaling includes two user specific fields. One user specific field may include the identifier of the first STA, the bit MCS of the first STA, and the bit position (bit reliability level) occupied by the first STA in data segment 1. The other user specific field may include the identifier of the second STA, the bit MCS of the second STA, and the bit position (bit reliability level) occupied by the second STA in data segment 1. The second SOMA signaling includes one user specific field. The user specific field includes the identifier of the first STA, the bit MCS of the first STA, and the bit position (bit reliability level) occupied by the first STA in data segment 2.

Figure 21:
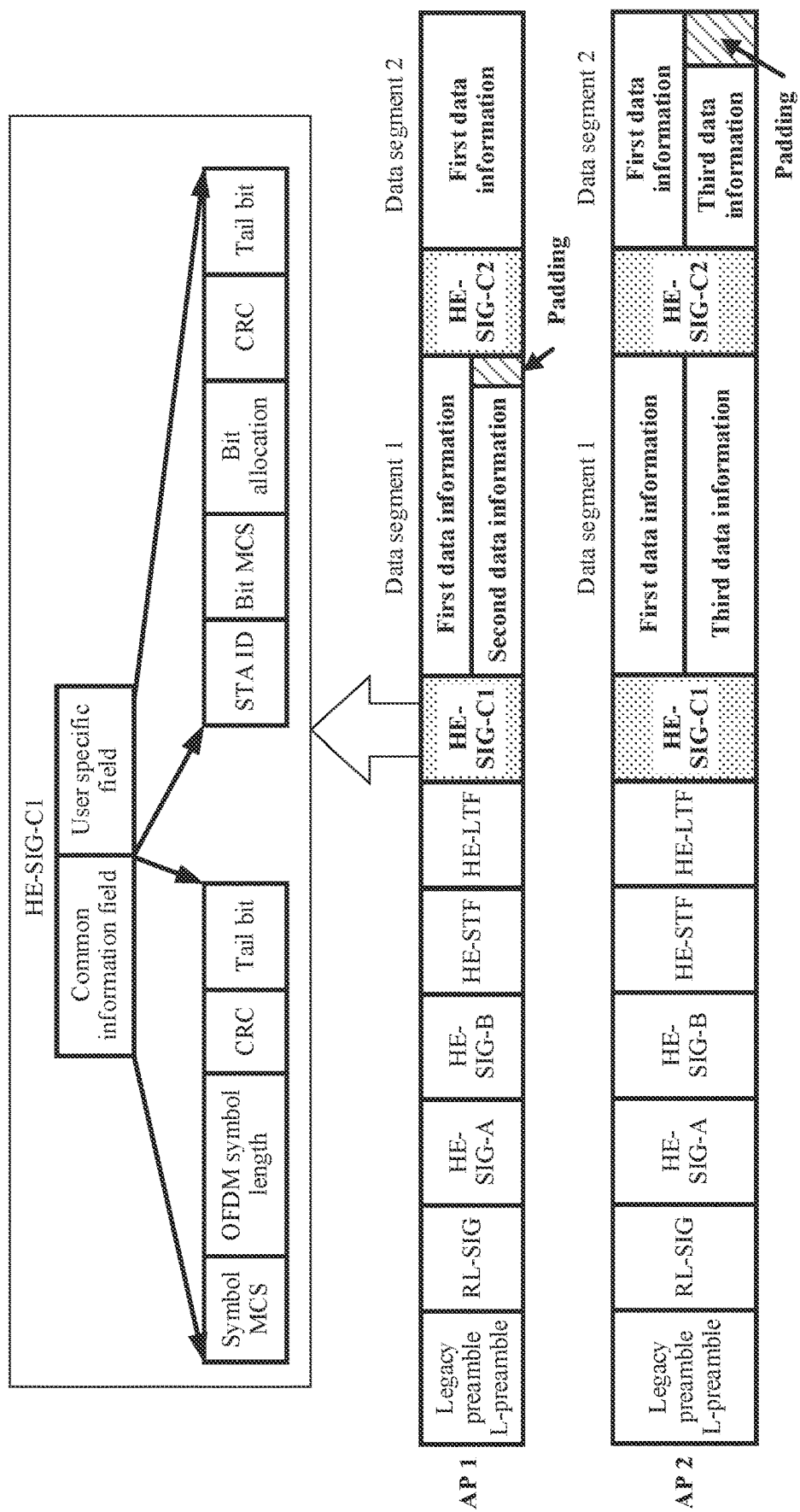
FIG. 21 shows a type of SOMA signaling according to Embodiment 3 of this application.
Figure 22:
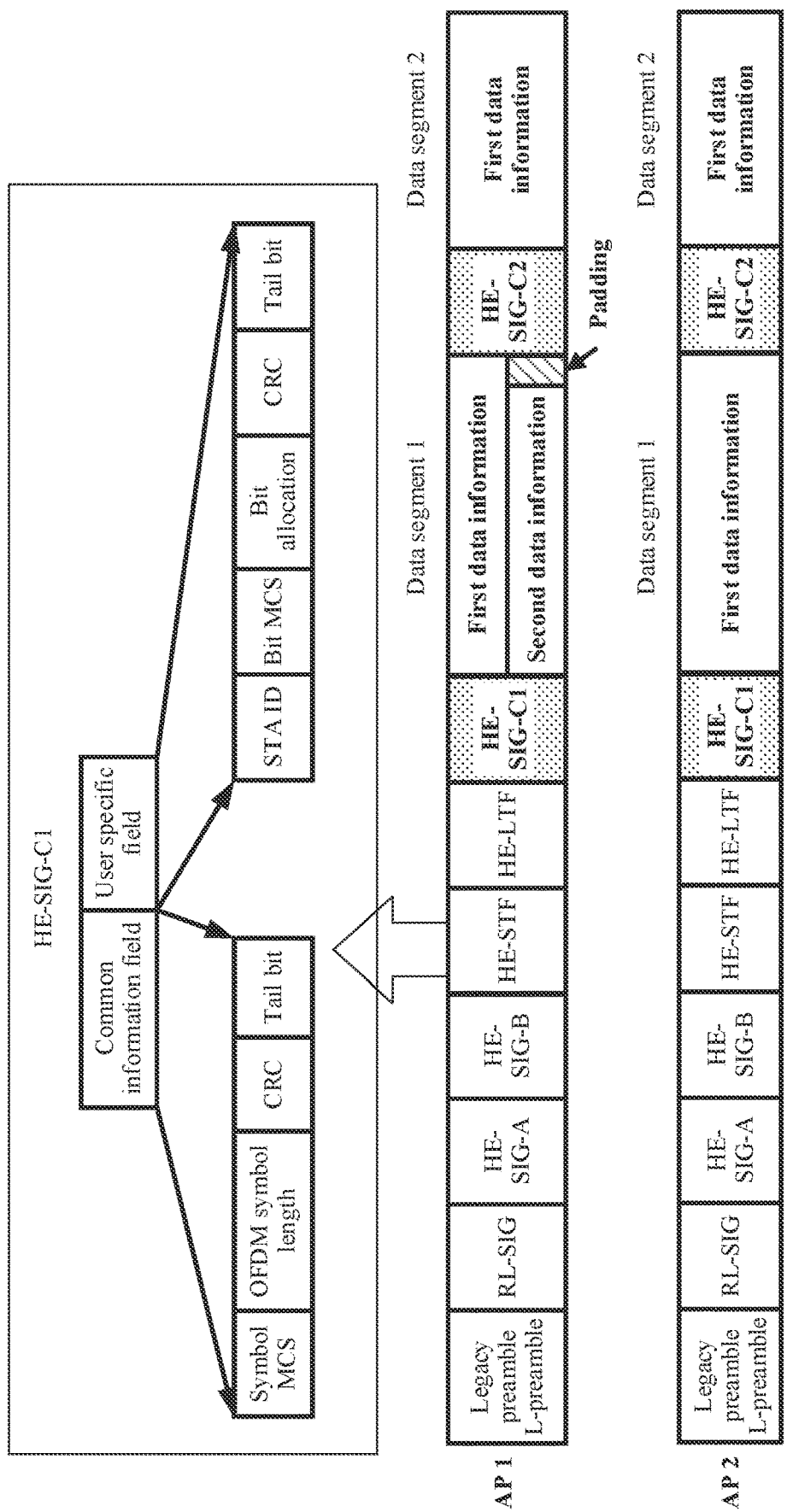
FIG. 22 shows another type of SOMA signaling according to Embodiment 3 of this application.

In another possible design, as shown in FIG. 21 and FIG. 22, the signaling field C may include a plurality of signaling subfields, and each signaling subfield may be located in front of the corresponding data segment. One signaling subfield is one SOMA-SIG, which is used to indicate the SOMA signaling information required to parse the data segment corresponding to the SOMA-SIG. The signaling content of the SOMA-SIG is the same as that shown in FIG. 19 and FIG. 20. Details are not described herein again.

In addition, in the embodiment of this application, SOMA transmission indication information can be further added to HE-SIG-A or HE-SIG-B to indicate whether the signaling field C exists. The AP may further indicate in each data segment the length of the data information or the length of the padding carried in the data segment.

Similar to Embodiment 1 and Embodiment 2, to make the first PPDU and the second PPDU have the same preamble field, the first indication information provided in Embodiment 3 of this application may include SOMA signaling information required by the first STA and the second STA to parse each data segment of the first data field. The SOMA signaling information includes at least the length information of each data segment, the symbol MCS used in each data segment, and the bit position (bit reliability level), and the bit MCS occupied by the first STA and the second STA in each data segment.

In this way, when generating the first PPDU, the first AP can fuse the first data information and the second data information based on the length information of each data segment and the symbol MCS of each data segment to obtain the at least one data segment, and then perform constellation mapping for the at least one data segment one by one based on the corresponding symbol MCS.

Correspondingly, when generating the second PPDU, the second AP also performs segmentation on the second data field based on the length information of each data segment in the first indication information and the symbol MCS of each data segment. Specifically, if the second AP sends data to the third STA in parallel while sending data to the first STA, as shown in FIG. 19, the second AP can fuse the first data information and the third data information based on the length information of each data segment in the first indication information, and the symbol MCS of each data segment to obtain at least one data segment, and then perform constellation mapping for each data segment one by one based on the corresponding symbol MCS. If the second AP does not perform parallel transmission while sending data to the first STA, as shown in FIG. 20, the second AP can perform segmentation on the first data information based on the length information of the at least one data segment to obtain at least one data segment, and then perform constellation modulation for each data segment by using QPSK.

Because the second AP can perform segmentation on the second data field in the same way as the first AP, the second indication information sent by the second AP further includes: SOMA signaling information required by the third STA to parse each data segment of the second data field, that is, for any data segment of the second data field, the bit position (bit reliability level) and bit MCS occupied by the third STA in the data segment.

It can be learned from Embodiment 3 that each AP can perform reasonable segmentation on the data information based on the actual length of the data information to be sent to the STA, and perform segmentation indication for the SOMA signaling of each data segment, thereby effectively reducing the padding redundancy caused by the inconsistent lengths of the data information of the STAs for which parallel transmission is performed.

Based on the same technical concept, an embodiment of this application further provides an apparatus 2300 applied to the side of the first access point, so as to implement the functions performed by the first access point AP in the foregoing method embodiment.

Figure 23:
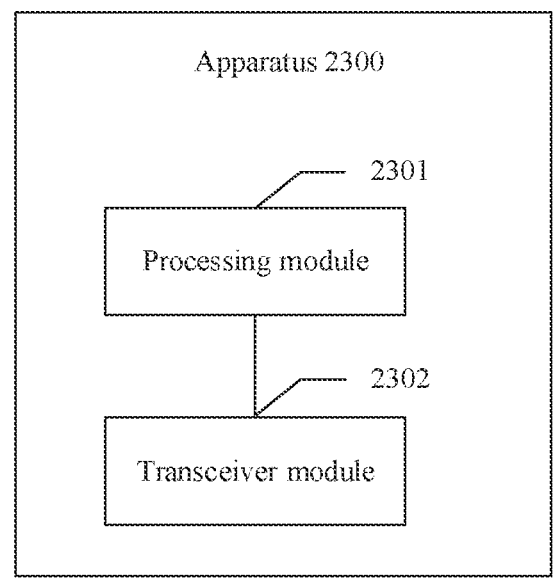
FIG. 23 is a schematic structural diagram of an apparatus on a first AP side according to an embodiment of this application.

In an implementation, as shown in FIG. 23, the apparatus 2300 may include a processing module 2301 and a transceiver module 2302.

The processing module 2301 is configured to generate a first PPDU; the first PPDU includes a first preamble field and a first data field.

The transceiver module 2302 is configured to send the first PPDU to the first STA and the second STA; the sending time of the first PPDU is the same as the sending time of sending the second PPDU by the second AP; the second PPDU includes the second preamble field and the second data field.

The first preamble field includes semi-orthogonal multiple access SOMA signaling information required by the first STA to parse the first data field and the second data field, and the SOMA signaling information required by the second STA to parse the first data field, where the first preamble field is the same as the second preamble field.

The first data field carries first data information sent to the first STA and second data information sent to the second STA, the first data field is obtained by the first AP by performing SOMA modulation on the first data information and the second data information, and a bit carrying the first data information and a bit carrying the second data information in the first data field have different reliability; the second data field carries the first data information; both the first STA and the second STA are STAs associated with the access point.

For the specific processing procedures of the processing module 2301 and the transceiver module 2302, refer to the descriptions in the method embodiments shown in FIG. 5, FIG. 7, and FIG. 8a to FIG. 8c, FIG. 12, and FIG. 17. Details are not described herein again.

Figure 24:
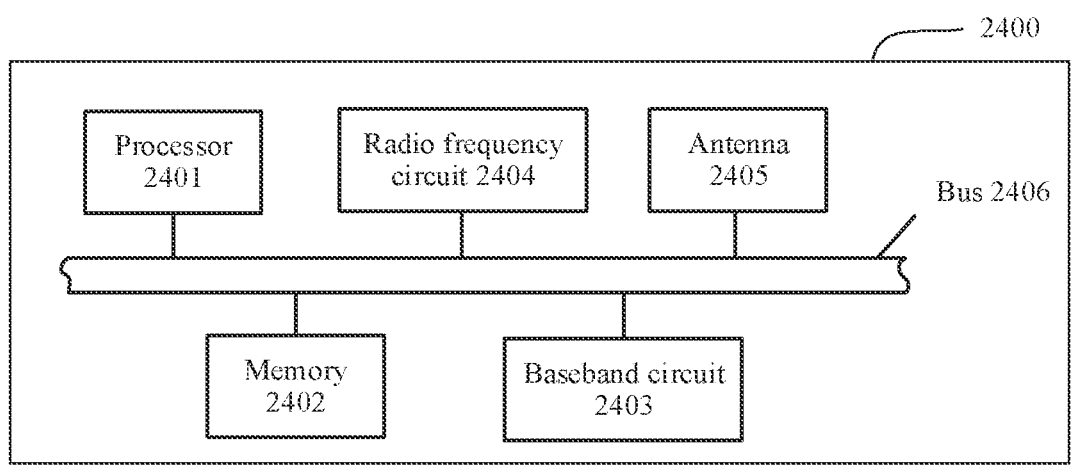
FIG. 24 is a schematic structural diagram of another apparatus on a first AP side according to an embodiment of this application.

In another implementation, the apparatus may be the first access point. As shown in FIG. 24, the apparatus 2400 may include a processor 2401, a memory 2402, a baseband circuit 2403, a radio frequency circuit 2404, and an antenna 2405. The processor 2401 is configured to control functions of various circuit components, so as to support the first access point AP in performing the corresponding functions in the foregoing method; the memory 2402 is configured to store a program instruction and data necessary for the first access point; and the baseband circuit 2403 is configured to generate various types of signaling and messages, for example, generate a first PPDU that includes SOMA signaling. The signaling and messages are processed by the radio frequency circuit, for example, analog conversion, filtering, amplification, and up-conversion, and then are sent by the antenna 2405 to the first STA.

The apparatus 2400 may further have other implementations. For example, in an implementation, the apparatus may be a chip in the first access point. The chip includes a processing module and a transceiver module. For example, the processing module may be a processor, and the processor is configured to generate various types of messages and signaling, and encapsulate the various types of messages according to a protocol and then process the messages, for example, coding, modulation, and amplification. The processor can be further configured to perform demodulation, decoding, and decapsulation to obtain signaling and messages. The transceiver module may be, for example, an input/output interface, a pin, or a circuit on the chip. The processing module can execute a computer executable instruction stored in a storage unit, to support the first access point AP in performing a corresponding function in the foregoing method. Optionally, the storage unit may be a storage unit inside the chip, for example, a register or a buffer. The storage unit may be alternatively a storage unit located outside the chip and in the first access point AP, for example, a read-only memory (ROM), or a static storage device of another type that can store static information and an instruction, or a random access memory (RAM).

In another possible implementation, the apparatus may include a processor and a modem, and the processor can be configured to run an instruction or an operating system to control the functions of the first access point. The modem can encapsulate, encode, decode, modulate, demodulate, and equalize data according to a protocol to generate a radio frame, so as to support the first access point AP in performing a corresponding function in either of the first aspect and the third aspect.

In still another possible implementation, the apparatus includes a processor, and the processor is configured to be coupled to a memory, read an instruction in the memory, and perform the method in either of the first aspect and the third aspect according to the instruction. The memory may be located inside or outside the processor.

Any one of the foregoing processors may be a general-purpose central processing unit (CPU), a microprocessor, an application-specific integrated circuit (ASIC), or one or more integrated circuits configured to control program execution in the joint transmission method according to the foregoing aspects.

Based on the same technical concept, an embodiment of this application further provides another apparatus applied to the side of the second access point, so as to implement the functions performed by the second access point AP in the foregoing method embodiment.

Figure 25:
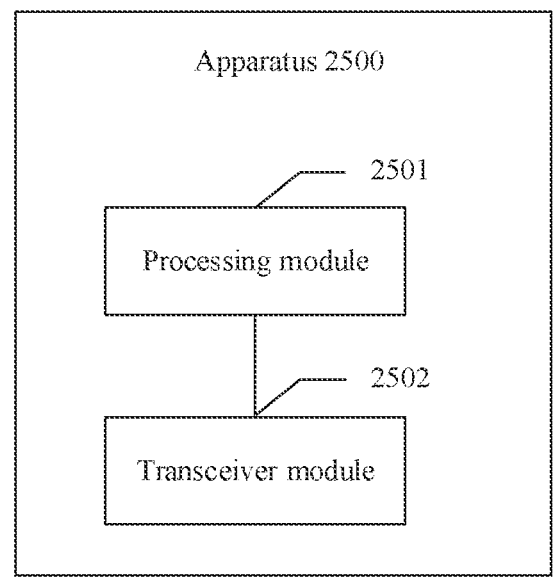
FIG. 25 is a schematic structural diagram of an apparatus on a second AP side according to an embodiment of this application.

In an implementation, as shown in FIG. 25, the apparatus 2500 may include a processing module 2501 and a transceiver module 2502.

The processing module 2501 is configured to generate a second PPDU; the second PPDU includes a second preamble field and a second data field.

The transceiver module 2502 is configured to send the second PPDU to the first STA; the sending time of the second PPDU is the same as the sending time of sending the first PPDU by the first AP; the first PPDU includes the first preamble field and the first data field.

The second preamble field includes semi-orthogonal multiple access SOMA signaling information required by the first STA to parse the first data field and the second data field, and the SOMA signaling information required by the second STA to parse the first data field, where the first preamble field is the same as the second preamble field.

The second data field carries first data information sent to the first STA; the first data field carries the first data information, and second data information sent to the second STA, the first data field is obtained by the first AP by performing SOMA modulation on the first data information and the second data information, and a bit carrying the first data information and a bit carrying the second data information in the first data field have different reliability; and both the first STA and the second STA are STAs associated with the first AP.

For the specific processing procedures of the processing module 2501 and the transceiver module 2502, refer to the descriptions in the method embodiments shown in FIG. 5, FIG. 7, and FIG. 8*a* to FIG. 8*c*, FIG. 12, and FIG. 17. Details are not described herein again.

Figure 26:
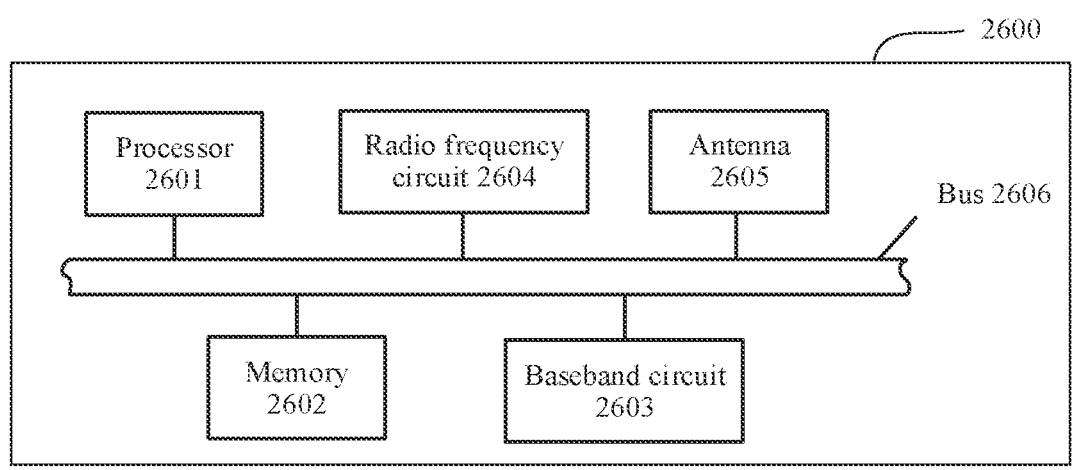
FIG. 26 is a schematic structural diagram of another apparatus on a second AP side according to an embodiment of this application.

In another implementation, the apparatus may be the second access point. As shown in FIG. 26, the apparatus 2600 may include a processor 2601, a memory 2602, a baseband circuit 2603, a radio frequency circuit 2604, and an antenna 2605. The processor 2601 is configured to control functions of various circuit components, so as to support the second access point AP in performing the corresponding functions in the foregoing method; the memory 2602 is configured to store a program instruction and data necessary for the second access point; and the baseband circuit 2603 is configured to generate various types of signaling and messages, for example, generate a second PPDU that includes SOMA signaling. The signaling and messages are processed by the radio frequency circuit, for example, analog conversion, filtering, amplification, and up-conversion, and then are sent by the antenna 2605 to the first STA.

The apparatus 2600 may further have other implementations. For example, in an implementation, the apparatus may be a chip in the first access point. The chip includes a processing module and a transceiver module. For example, the processing module may be a processor, and the processor is configured to generate various types of messages and signaling, and encapsulate the various types of messages according to a protocol and then process the messages, for example, coding, modulation, and amplification. The processor can be further configured to perform demodulation, decoding, and decapsulation to obtain signaling and messages. The transceiver module may be, for example, an input/output interface, a pin, or a circuit on the chip. The processing module can execute a computer executable instruction stored in a storage unit, to support the first access point AP in performing a corresponding function in the foregoing method. Optionally, the storage unit may be a storage unit inside the chip, for example, a register or a buffer. The storage unit may be alternatively a storage unit located outside the chip and in the first access point AP, for example, a read-only memory (ROM), or a static storage device of another type that can store static information and an instruction, or a random access memory (RAM).

In another possible implementation, the apparatus may include a processor and a modem, and the processor can be configured to run an instruction or an operating system to control the functions of the first access point. The modem can encapsulate, encode, decode, modulate, demodulate, and equalize data according to a protocol to generate a radio frame, so as to support the first access point AP in performing a corresponding function in either of the first aspect and the third aspect.

In still another possible implementation, the apparatus includes a processor, and the processor is configured to be coupled to a memory, read an instruction in the memory, and perform the method in either of the first aspect and the third aspect according to the instruction. The memory may be located inside or outside the processor.

Any one of the foregoing processors may be a general-purpose central processing unit (CPU), a microprocessor, an application-specific integrated circuit (ASIC), or one or more integrated circuits configured to control program execution in the joint transmission method according to the foregoing aspects.

Based on the same technical concept, an embodiment of this application provides a computer readable storage medium, and the computer readable storage medium stores a computer instruction. When the instruction runs on a computer, the computer is enabled to perform the joint transmission method on the side of the first access point in the foregoing method embodiment.

An embodiment of this application provides a computer readable storage medium, and the computer readable storage medium stores a computer instruction. When the instruction runs on a computer, the computer is enabled to perform the joint transmission method on the side of the second access point in the foregoing method embodiment.

An embodiment of this application provides a computer program product including an instruction, and when the computer program product runs on a computer, the computer is enabled to perform the method embodiment in either of the first aspect and the third aspect or any possible implementation thereof.

An embodiment of this application provides a computer program product including an instruction, where when the computer program product runs on a computer, the computer is enabled to perform the method embodiment in either of the second aspect and the fourth aspect or any possible implementation thereof.

An embodiment of this application further provides a chip system. The chip system includes a processor configured to support the first access point AP in implementing the foregoing joint transmission method, for example, generating or processing data and/or information in the foregoing aspects. In a possible design, the chip system further includes a memory, where the memory is configured to store a program instruction and data that are necessary for a data sending device. The chip system may include a chip, or may include a chip and other discrete components.

An embodiment of this application further provides a chip system. The chip system includes a processor configured to support a second access point AP in implementing the functions in the second aspect and the fourth aspect, for example, generating or processing data and/or information in the foregoing aspects. In a possible design, the chip system further includes a memory, where the memory is configured to store a program instruction and data that are necessary for a data sending device. The chip system may include a chip, or may include a chip and other discrete components.

An embodiment of this application further provides a wireless communications system. The system includes at least one first access point, at least one second access point, and at least one first STA used in the foregoing aspects.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, an optical memory, or the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to this application without departing from the scope of this application. This application is intended to cover these modifications and variations of this application, provided that they fall within the scope of protection defined by the following claims and their equivalent technologies.

The invention claimed is:

1. A joint transmission method, comprising:
sending, by a first access point (AP), a first physical layer protocol data unit (PPDU) to a first station (STA) and a second STA,
wherein both of the first STA and the second STA are associated with the first AP,
wherein a sending time of sending the first PPDU by the first AP is same as a sending time of sending a second PPDU by a second AP,
wherein the first PPDU comprises a first preamble field and a first data field, and the second PPDU comprises a second preamble field and a second data field, wherein the first preamble field comprises first semi-orthogonal multiple access (SOMA) signaling information required by the first STA to parse the first data field and the second data field, and second SOMA signaling information required by the second STA to parse the first data field, wherein the second preamble field is same as the first preamble field, wherein the first data field carries first data information sent to the first STA and second data information sent to the second STA, the first data field is obtained by the first AP by performing SOMA modulation on the first data information and the second data information, wherein each of a bit carrying the first data information and a bit carrying the second data information in the first data field has a different reliability, and wherein the second data field carries the first data information.

2. The method according to claim 1, wherein the bit carrying the first data information in the first data field has a same reliability as a bit carrying the first data information in the second data field, and wherein a bit modulation and coding scheme (MCS) of the bit carrying the first data information in the first data field is same as a bit MCS of the bit carrying the first data information in the second data field.

3. The method according to claim 2, wherein, before the sending, by the first AP, the first PPDU to the first STA and the second STA, the method further comprises:

sending, by the first AP, first indication information to the second AP, wherein the first indication information comprises the first SOMA signaling information required by the first STA and the second SOMA signaling information required by the second STA to parse the first data field;

receiving, by the first AP, second indication information sent by the second AP, wherein the second indication information comprises third SOMA signaling information required by a third STA to parse the second data field, and the second data field comprises third data information sent to the third STA, and the third STA is a STA associated with the second AP; and generating, by the first AP, the first PPDU based on the first indication information and the second indication information, wherein the first preamble field further comprises the third SOMA signaling information required by the third STA to parse the second data field.

4. The method according to claim 3, wherein a symbol MCS of the first data field is same as a symbol MCS of the second data field.

5. The method according to claim 3, wherein the first data field further comprises at least one data segment, and the first preamble field further comprises length information of the at least one data segment and a symbol MCS of the at least one data segment.

6. The method according to claim 5, wherein, before the generating, by the first AP, the first PPDU, the method further comprises:

sending, by the first AP, a transmission assistance request, wherein the transmission assistance request comprises an identifier of the first STA, an identifier of the second STA, and third indication information indicating that the first STA needs to be assisted; and receiving, by the first AP, a transmission assistance response sent by the second AP, and sending the first data information to the second AP.

7. The method according to claim 6, wherein the transmission assistance request further comprises fourth indication information indicating an air interface transmission coverage area of the first AP.

8. The method according to claim 2, wherein, before the sending, by the first AP, the first PPDU to the first STA and the second STA, the method comprises:

sending, by the first AP, first indication information to the second AP, wherein the first indication information comprises the first SOMA signaling information required by the first STA and the second SOMA signaling information required by the second STA to parse the first data field; and generating, by the first AP, the first PPDU based on the first indication information.

9. A joint transmission method, comprising:

sending, by a second access point (AP), a second physical layer protocol data unit (PPDU) to a first station (STA), wherein a sending time of the second PPDU is same as a sending time of sending a first PPDU by a first AP, wherein the second PPDU comprises a second preamble field and a second data field, and the first PPDU comprises a first preamble field and a first data field, wherein the second preamble field comprises first semi-orthogonal multiple access (SOMA) signaling information required by the first STA to parse the first data field and the second data field, and second SOMA signaling information required by a second STA to parse the first data field, and wherein the first preamble field is same as the second preamble field, wherein the second data field carries first data information sent to the first STA, wherein the first data field carries the first data information and second data information sent to the second STA, the first data field is obtained by the first AP by performing SOMA modulation on the first data information and the second data information, wherein a bit carrying the first data information and a bit carrying the second data information in the first data field have different reliability, and wherein both the first STA and the second STA are STAs associated with the first AP.

10. The method according to claim 9, wherein the bit carrying the first data information in the first data field has a same reliability as a bit carrying the first data information in the second data field, and wherein a bit modulation and coding scheme (MCS) of the bit carrying the first data information in the first data field is same as a bit MCS of the bit carrying the first data information in the second data field.

11. The method according to claim 10, wherein, before the sending, by the second AP, the second PPDU to the first STA, the method further comprises:

receiving, by the second AP, first indication information sent by the first AP, wherein the first indication information comprises the first SOMA signaling information required by the first STA and the second SOMA signaling information required by the second STA to parse the first data field;

sending, by the second AP, second indication information to the first AP, wherein the second indication information comprises third SOMA signaling information required by a third STA to parse the second data field, and the second data field further comprises third data information sent to the third STA, and the third STA is an STA associated with the second AP; and generating, by the second AP, the second PPDU based on the first indication information and the second indication information, wherein the second preamble field comprises the SOMA signaling information required by the third STA to parse the second data field, and the second data field is obtained by the second AP by performing SOMA modulation on the first data information and the third data information, and the bit carrying the first data information and the bit carrying the third data information in the second data field have different reliabilities; and wherein the sending, by the second AP, the second PPDU to the first STA comprises:
sending, by the second AP, the second PPDU to the first STA and the third STA.

12. The method according to claim 11, wherein a symbol MCS of the second data field is same as a symbol MCS of the first data field.

13. The method according to claim 11, wherein the second data field further comprises at least one data segment, and the second preamble field further comprises length information of the at least one data segment and a symbol MCS of the at least one data segment.

14. The method according to claim 13, wherein, before the sending, by the second AP, the second PPDU to the first STA, the method further comprises:
receiving, by the second AP, a transmission assistance request sent by the first AP, wherein the transmission assistance request comprises an identifier of the first STA, an identifier of the second STA, and third indication information indicating that the first STA needs to be assisted; and
sending, by the second AP, a transmission assistance response to the first AP based on the identifier of the first STA and the identifier of the second STA, and
receiving, by the second AP, the first data information sent by the first AP.

15. The method according to claim 14, wherein the transmission assistance request further comprises fourth indication information, and the fourth indication information is used to indicate an air interface transmission coverage area of the first AP; and
wherein the method further comprises:
determining, by the second AP, the third STA based on the air interface transmission coverage area of the first AP.

16. The method according to claim 10, wherein before the sending, by the second AP, the second PPDU to the first STA, the method further comprises:
receiving, by the second AP, first indication information sent by the first AP, wherein the first indication information comprises the first SOMA signaling information required by the first STA and the second SOMA signaling information required by the second STA to parse the first data field; and
generating, by the second AP, the second PPDU based on the first indication information.

17. A joint transmission method, comprising:
sending, by a first access point (AP), a first physical layer protocol data unit (PPDU) to a first station (STA) and a second STA; and
sending, by a second access point (AP), a second physical layer protocol data unit (PPDU) to the first STA,
wherein both of the first STA and the second STA are STAs associated with the first AP, wherein a sending time of sending the first PPDU by the first AP is same as a sending of sending the second PPDU by the second AP,
wherein the first PPDU comprises a first preamble field and a first data field, and the second PPDU comprises a second preamble field and a second data field,
wherein the first preamble field comprises first semi-orthogonal multiple access (SOMA) signaling information required by the first STA to parse the first data field and the second data field, and second SOMA signaling information required by the second STA to parse the first data field,
wherein the second preamble field is same as the first preamble field,
wherein the first data field carries first data information sent to the first STA and second data information sent to the second STA, the first data field is obtained by the first AP by performing SOMA modulation on the first data information and the second data information,
wherein a bit carrying the first data information and a bit carrying the second data information in the first data field have different reliabilities, and
wherein the second data field carries the first data information.

18. The method according to claim 17, wherein the bit carrying the first data information in the first data field has a same reliability as a bit carrying the first data information in the second data field, and
wherein a bit modulation and coding scheme (MCS) of the bit carrying the first data information in the first data field is same as a bit MCS of the bit carrying the first data information in the second data field.

19. The method according to claim 18, wherein, before the sending, by the first AP, the first PPDU to the first STA and the second STA, the method further comprises:
sending, by the first AP, first indication information to the second AP, wherein the first indication information comprises the first SOMA signaling information required by the first STA and the second SOMA signaling information required by the second STA to parse the first data field;
receiving, by the first AP, second indication information sent by the second AP, wherein the second indication information comprises third SOMA signaling information required by a third STA to parse the second data field, and the second data field comprises third data information sent to the third STA, and the third STA is an STA associated with the second AP; and
generating, by the first AP, the first PPDU based on the first indication information and the second indication information, wherein the first preamble field further comprises the third SOMA signaling information required by the third STA to parse the second data field.

20. The method according to claim 18, wherein, before the sending, by the second AP, the second PPDU to the first STA, the method further comprises:
receiving, by the second AP, first indication information sent by the first AP, wherein the first indication information comprises the first SOMA signaling information required by the first STA and the second SOMA signaling information required by the second STA to parse the first data field;
sending, by the second AP, second indication information to the first AP, wherein the second indication information comprises third SOMA signaling information required by a third STA to parse the second data field, and the second data field further comprises third data information sent to the third STA, and the third STA is an STA associated with the second AP; and generating, by the second AP, the second PPDU based on the first indication information and the second indication information, wherein the second preamble field comprises the SOMA signaling information required by the third STA to parse the second data field, and the second data field is obtained by the second AP by performing SOMA modulation on the first data information and the third data information, and the bit carrying the first data information and the bit carrying the third data information in the second data field have different reliabilities; and wherein the sending, by the second AP, the second PPDU to the first STA comprises:

sending, by the second AP, the second PPDU to the first STA and the third STA.

* * * * *